US012798197B2

(12) United States Patent
Kitagawa et al.

(10) Patent No.: US 12,798,197 B2
(45) Date of Patent: Nov. 17, 2026

(54) ELECTROFUSION JOINT AND FUSION METHOD

(71) Applicant: SEKISUI CHEMICAL CO., LTD., Osaka (JP)

(72) Inventors: Ayaka Kitagawa, Kyoto (JP); Amiko Sakamoto, Kyoto (JP); Hiroaki Kondou, Kyoto (JP); Kouzou Makino, Kyoto (JP); Tsuyoshi Katou, Kyoto (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 162 days.

(21) Appl. No.: 18/802,068

(22) Filed: Aug. 13, 2024

(65) Prior Publication Data

US 2024/0399670 A1 Dec. 5, 2024

Related U.S. Application Data

(62) Division of application No. 17/794,068, filed as application No. PCT/JP2021/002489 on Jan. 25, 2021, now Pat. No. 12,459,212.

(30) Foreign Application Priority Data

Jan. 24, 2020 (JP) ................................ 2020-010025
Dec. 28, 2020 (JP) ................................ 2020-219395
Dec. 28, 2020 (JP) ................................ 2020-219396

(51) Int. Cl.
*B29C 65/34* (2006.01)
*B29C 65/00* (2006.01)

(52) U.S. Cl.
CPC ...... *B29C 65/3432* (2013.01); *B29C 65/3468* (2013.01); *B29C 65/348* (2013.01); *B29C 66/5221* (2013.01); *B29C 66/71* (2013.01)

(58) Field of Classification Search
CPC ............ B29C 65/3432; B29C 65/3468; B29C 66/5221
See application file for complete search history.

(56) References Cited

U.S. PATENT DOCUMENTS 5,921,587 A 7/1999 Lueghamer
6,036,795 A * 3/2000 Sauron .............. B29C 66/02241 156/304.6

(Continued)

FOREIGN PATENT DOCUMENTS

CA 2136753 C * 10/2004 ......... B29C 66/9192
CN 103862670 6/2014

(Continued)

OTHER PUBLICATIONS

Non-Final Office Action issued Oct. 4, 2024 in related U.S. Appl. No. 17/794,068.

(Continued)

*Primary Examiner* — Philip C Tucker
*Assistant Examiner* — John Blades
(74) *Attorney, Agent, or Firm* — Wenderoth, Lind & Ponack, L.L.P.

(57) ABSTRACT

A connection method is for connecting an electrofusion joint and a pipe. Each of the electrofusion joint and the pipe contains a thermoplastic resin. The electrofusion joint includes a main body having a tubular shape and including a joint receiving portion into which the pipe can be inserted, a stopper portion projecting inward on an inner surface of the main body so as to regulate a position of an end of the pipe, and a stopper heat generating section including a heating wire arranged in the stopper portion and including an insulator. The connection method includes an insertion step of inserting the pipe inside the joint receiving portion of the electrofusion joint, a heating step of energizing the heating wire of the stopper heat generating section, and a (Continued)

pressurizing step of applying an external force to the pipe toward the stopper portion in the heating step.

11 Claims, 55 Drawing Sheets

(56) References Cited

U.S. PATENT DOCUMENTS

| | | | |
|---|---|---|---|
| 6,156,144 | A | 12/2000 | Lueghamer |
| 6,428,054 | B1 | 8/2002 | Zappa et al. |
| 12,259,076 | B2 | 3/2025 | Kitagawa et al. |

FOREIGN PATENT DOCUMENTS

| | | | |
|---|---|---|---|
| JP | 2-60730 | 3/1990 | |
| JP | 5-157190 | 6/1993 | |
| JP | 05-318596 | * 12/1993 | ......... B29C 66/1224 |
| JP | 7-91583 | 4/1995 | |
| JP | 7-151289 | 6/1995 | |
| JP | 8-52805 | 2/1996 | |
| JP | 8-156018 | 6/1996 | |
| JP | 10-61868 | 3/1998 | |
| JP | 10-220676 | 8/1998 | |
| JP | 10-281383 | 10/1998 | |
| JP | 11-51279 | 2/1999 | |
| JP | 11-141787 | 5/1999 | |
| JP | 2001-193890 | 7/2001 | |
| JP | 2016-194340 | 11/2016 | |
| JP | 2020-91004 | 6/2020 | |
| JP | 2020-143713 | 9/2020 | |
| TW | 266185 | 12/1995 | |
| WO | 97/13996 | 4/1997 | |

OTHER PUBLICATIONS

International Search Report issued Apr. 6, 2021 in International (PCT) Application No. PCT/JP2021/002489.
Written Opinion of the International Searching Authority issued Apr. 6, 2021 in International (PCT) Application No. PCT/JP2021/002489.
International Preliminary Report on Patentability (Chapter I) for the corresponding PCT application No. PCT/JP2021/002489 issued on Jul. 26, 2022 together with its English translation.
Notice of Reasons for Refusal issued Jul. 18, 2023 in corresponding Japanese Patent Application No. 2021-572833, with English language translation.
Office Action issued Nov. 20, 2023 in Korean Application No. 10-2022-7024379, with Machine Translation.
Office Action issued Oct. 4, 2024 for Taiwanese Application No. 110102749, with Machine Translation.
Office Action dated Apr. 8, 2025 in U.S. Appl. No. 17/794,068.

* cited by examiner

ELECTROFUSION JOINT AND FUSION METHOD

CROSS REFERENCE TO RELATED APPLICATIONS

The present application is the divisional of U.S. application Ser. No. 17/794,068, filed on Jul. 20, 2022, which is a U.S. National Phase under 35 U.S.C. § 371 of International Application No. PCT/JP2021/002489, filed on Jan. 25, 2021, which claims the benefit of priority of Japanese Patent Application No. 2020-219396, filed on Dec. 28, 2020, Japanese Patent Application No. 2020-219395, filed on Dec. 28, 2020, and Japanese Patent Application No. 2020-010025, filed on Jan. 24, 2020, the entire contents of which are incorporated herein by reference.

TECHNICAL FIELD

The present disclosure relates to an electrofusion joint and a fusion method.

DESCRIPTION OF THE RELATED ART

Electrofusion joints are often used when connecting resin pipes or pipes in which a resin is used, such as a metal-reinforced composite pipe having a resin layer and a metal reinforcing layer (see, for example, Patent Literature 1, Patent Literature 2).

For example, the electrofusion joint shown in Patent Literature 1 has a joint body that is made of a thermoplastic resin and in both ends of which are formed the joint receiving portions into which the pipes to be connected are inserted, and a heating wire that is embedded on the inner peripheral surface side of the joint body. Also, a stopper portion that protrudes inward so as to restrict the position of the pipe body is provided on the inner peripheral surface of the joint body.

A heating element is made to generate heat in a state in which the pipes to be connected have been inserted into the insertion openings of the electrofusion joint, the result being that the resin on the inner peripheral part of the insertion openings and the resin on the outer peripheral part of the pipe are fused around the heating element, and the pipes are connected to each other via this electrofusion joint.

Patent Literature 2 discloses an electrofusion joint having a structure in which a heating wire is provided in the stopper portion in order to reduce the occurrence of clevis between the resin pipe and the stopper portion.

CITATION LIST

Patent Literature

Patent Literature 1: JP-A 2016-194340
Patent Literature 2: JP-A H5-318596

SUMMARY OF THE INVENTION

However, according to the examination by the inventors, when electrofusion joint in which a resin pipe is inserted into the insertion opening part is used for the pipe in the plant, it has been found that some water and chemical solution retains in the pipe due to turbulent flow generated by the flow of water or the flow of chemical solution hitting the gap (clevis) between the stopper portion of the electrofusion joint and the end surface of the resin pipe or hitting a convex portion (wrinkle) generated on the inner surface of the resin pipe due to heat during electrical fusion Microorganisms propagate in the water and the chemical solution that have retained in this way, causing deterioration of water quality, and deterioration of the chemical solution causes deterioration of purity. Therefore, in semiconductor manufacturing pipes and the like, product yield may deteriorate.

Further, in the electrofusion joint shown in Patent Literature 2, since only one line of the heating wire is provided in the stopper portion, when the stopper portion is thin, the amount of resin is insufficient, and the stopper portion is deformed by the force of abutting the resin pipe and a convex portion (wrinkle) is generated. On the other hand, when the stopper portion is thick, the heating with the heating wire is insufficient, the resin is not sufficiently melted, and clevis is generated.

It is an object of the present disclosure to provide an electrofusion joint which is capable of suppressing the occurrence of a clevis or a convex portion (wrinkle) on the inner surface.

Means for Solving Problem

In order to achieve the stated object, the electrofusion joint according to the first disclosure includes a main body, a stopper portion, a first heat generating section, and a second heat generating section. The main body includes a tubular shape and includes a joint receiving portion in which a pipe containing a thermoplastic resin can be inserted inside. The stopper portion is provided so as to project inward on an inner surface of the main body, and is configured to regulate an insertion position of an end of the pipe when the pipe is inserted inside the joint receiving portion. The first heat generating section includes a heating wire that is wound and arranged at the joint receiving portion. The second heat generating section includes a heating wire is wound so that wound parts are adjacent to each other and the heating wire is disposed in the stopper portion. The first heat generating section includes one or a plurality of heat generating portions in which the heating wire is wound so that the wound parts are adjacent to each other. A number of adjacent turns of the heating wire in the second heat generating section is equal to or less than a number of adjacent turns of the heating wire in the heat generating portion adjacent to the second heat generating section.

In this way, by setting the number of adjacent turns of the heating wire in the second heat generating section to be equal to or less than the number of adjacent turns of the heating wire in the heat generating portion adjacent to the second heating portion, it is possible to prevent the temperature of the joint receiving portion from rising earlier than that of the stopper portion when the electrofusion joint is connected to the pipe. When the temperature of the joint receiving portion rises earlier than that of the stopper portion, fusion occurs earlier on the side surface than the end surface of the pipe, so a large force is required to press the pipe against the stopper portion and wrinkles and clevis may occur.

However, in the present disclosure, when the electrofusion joint is connected to the pipe, it is possible to prevent the temperature of the joint receiving portion from rising earlier than that of the stopper portion, so that no fusion occur earlier on the side surface of the pipe than the end surface of the pipe and it is possible to reduce the force for pressing the pipe against the stopper portion, and to suppress the occurrence of wrinkle.

The electrofusion joint according to the second disclosure is the electrofusion joint according to the first disclosure, and a heating wire density in the first heat generating section is smaller than a heating wire density in the second heat generating section.

By making the heating wire density in the first heat generating section smaller than the heating wire density in the second heating portion in this way, when the pipe is inserted into the joint receiving portion and pressed against the stopper portion to be heated, the portion between the end surface of the pipe and the stopper portion is fused faster than the portion between the outer peripheral surface of the pipe and the inner peripheral surface of the joint receiving portion. Therefore it is possible to fill the seam and suppress the occurrence of clevis.

Further, by reducing the heating wire density at the joint receiving portion, the pipe is not heated too much, so that the occurrence of convex portions (wrinkles) on the inner surface of the pipe can be suppressed.

The electrofusion joint according to the third disclosure is the electrofusion joint according to the second disclosure, and the heating wire density in the first heat generating section is 0.55 times or less the heating wire density in the second heat generating section.

By making a difference in the heating wire density between the first heat generating section and the second heat generating section in this way, it is possible to effectively suppress the occurrence of the clevis and the convex portion on the inner surface.

The electrofusion joint according to the fourth disclosure is the electrofusion joint according to the first or second disclosure, and in the first heat generating section, a predetermined interval is provided for each heat generating portion in which the heating wire is wound a predetermined number of turns in an insertion direction of the pipe. All wound heating wire portions in the second heat generating section are in contact with an adjacent wound heating wire portions.

As a result, the inner surface of the joint receiving portion can be heated widely rather than locally, so that the pipe can be easily slid toward the stopper portion, and the occurrence of convex portions (wrinkles) on the inner surface of the pipe can be suppressed.

The electrofusion joint according to the fifth disclosure is the electrofusion joint according to any one of the first to fourth disclosures, and the second heat generating section includes three or more turns of the heating wire.

As described above, the stopper portion needs to have a thickness in which the heating wire having three or more turns is provided, and the deformation of the stopper portion due to the force of abutting the resin pipe is suppressed. Further, since the heating wire having three or more turns is provided, heating can be sufficiently performed and the resin can be sufficiently melted.

The electrofusion joint according to the sixth disclosure is the electrofusion joint according to the first disclosure, and the first heating section includes one heat generating portion. Adjacent heating wire portions in the second heat generating section are in contact with each other. Wound parts of the heating wire in the second heating section are in contact with each other.

As a result, the number of turns of the heating wire in the joint receiving portion is set to be equal to or less than the number of turns of the heating wire in the stopper portion, so that the force when the pipe is pressed against the stopper portion can be reduced, and it is possible to suppress the occurrence of convex parts (wrinkles).

The electrofusion joint according to the seventh disclosure is the electrofusion joint according to the first disclosure, and a distance from the stopper portion to the first heat generating section in the direction along an axis of the main body is set as L, an inner diameter of the joint receiving portion is set as d. When an outer diameter of the pipe is 25 mm or less, d/L is set to 2.5 or less. When the outer diameter of the pipe is 32 mm or more and 50 mm or less, d/L is 3.5 or less. When the outer diameter of the pipe is 63 mm or more and 90 mm or less, d/Lis 4.0 or less. When the outer diameter of the pipe is 110 mm or more and 160 mm or less, d/Lis 5.5 or less. When the outer diameter of the pipe is 225 mm or more, d/L is 6.5 or less.

The inventors of the present invention considered to provide a heat generating portion not only in the joint receiving portion but also in the stopper portion in order to suppress the occurrence of a gap between the stopper portion and the end surface of the pipe. However, we have found the problem that the size and shape of the bead may not be stable simply by providing the heat generating portion. When the size and shape of the bead are not stable, the amount of water will not be stable and dead water will be generated depending on the shape of the bead. Further, when the height of the bead is not uniform in the circumferential direction, a strong pressure is applied to the non-uniform portion (swelling portion), and the swelling portion may be removed and flow out. It is also conceivable that cracks will occur in the joint starting from the swelling portion and dead water will occur.

Then, the inventors of the present invention have clarified that the reason why the size and shape of a bead become unstable is as follows. When a pipe is inserted into an electrofusion joint, air is present in the clearance between the inner surface of the joint and the outer surface of the pipe in the part (cold zone) between the heat generating portion of the stopper portion and the heat generating portion of the joint receiving portion. When the fusion is started, the fusion between the stopper portion provided with the heat generating portion and the end of the pipe and the fusion between the inner surface of the portion provided with the heat generating portion of the joint receiving portion and the outer surface of the pipe proceed at the same time. Therefore, the air in the clearance expands due to heat in a state of being trapped between both of the fused portions, expanded air pushes up the molten resin in the process of forming the bead. This changes the size and shape of the bead. This phenomenon may occur due to variations in the dimensional accuracy when molding pipes and joints, the amount of scraping during construction (the thickness cut in the process of cutting the outer surface of the pipe before fusion), and the degree of insertion of the pipe.

Therefore, in the electrofusion joint of the present disclosure, when the outer diameter of the pipe is 25 mm or less, d/L is set to 2.5 or less. When the outer diameter of the pipe is 32 mm or more and 50 mm or less, d/L is 3.5 or less. When the outer diameter of the pipe is 63 mm or more and 90 mm or less, the d/L is set to 4.0 or less. When the outer diameter of the pipe is 110 mm or more and 160 mm or less, the d/L is 5.5 or less. When the outer diameter of the pipe is 225 mm or more, d/L is set to 6.5 or less.

As a result, air is less likely to be trapped in the clearance between the inner surface of the joint and the outer surface of the pipe between the second heat generating section of the stopper portion and the first heat generating section of the joint receiving portion, and it is possible to form the bead which has a stable shape and size, and it is possible to suppress the occurrence of a gap between the electrofusion joint and the pipe.

The electrofusion joint according to the eighth disclosure is the electrofusion joint according to the first disclosure, and when a distance from the stopper portion to the first heat generating section in a direction along an axis of the main body is set as L, the distance L is set to zero, and the first heat generating section is arranged adjacent to the stopper portion in the direction along the axis of the main body.

For the reason described above, the closer the position of the first heat generating section is to the stopper portion, the smaller the clearance and the less likely it is that air expansion occurs. Therefore, by setting L to zero, it is possible to form a bead with a stable shape and size.

The electrofusion joint according to the ninth disclosure is the electrofusion joint according to the seventh or eighth disclosure, and the first heating section includes two or more turns of the heating wire. As a result, it is possible to more reliably fuse in the first heat generating section.

The electrofusion joint according to the tenth disclosure is the electrofusion joint according to any one of the first to ninth disclosures, and the heating wire in the second heat generating section is provided with an insulator.

This makes it possible to prevent short circuits between the portions of the heating wire when the pipe is pressed against the stopper portion and fusion is performed.

The electrofusion joint according to the eleventh disclosure is the electrofusion joint according to the first disclosure, and the main body includes a through hole formed through from an inner surface to an outer surface between the second heat generation portion and the heat generation portion adjacent to the second heat generation portion.

As a result, the air between the fused portion between the end surface of the pipe and the stopper portion and the fused portion between the side surface of the pipe and the joint receiving portion is discharged from the through hole, so that it is possible to suppress the ejection of the bead R due to the expansion of the air and to suppress the occurrence of depression due to the bursting of air bubbles mixed in the bead.

The method for manufacturing an electrofusion joint according to the twelfth disclosure, the heating wire of the first heat generating section and the heating wire of the second heating section are connected to each other. The method includes a step of arranging the heating wire on a winding core including a first arrangement portion formed in a step shape in which the heating wire of the first heat generation section is arranged and a second arrangement portion in which the heating wire of the second heat generation section is arranged, and a step of inserting the winding core in which the heating wire is arranged into a mold so that the second arrangement portion faces a gate and a step of injecting resin from the gate to perform molding.

By providing the stepped portion in this way, the position of the heating wire at the time of resin injection is stabilized, and the quality stability can be improved.

The connection method according to the thirteenth disclosure is a connection method for connecting an electrofusion joint and a pipe and includes an inserting step, a heating step, and a pressurizing step. The electrofusion joint contains a thermoplastic resin and includes a main body having a tubular shape and having a joint receiving portion into which a pipe containing a thermoplastic resin can be inserted inside, and a stopper portion providing so as to project inward on an inner surface of the main body and configured to regulate a position of an end of the pipe when the pipe is inserted inside the joint receiving portion, and a heat generating section including a heating wire provided with an insulator and disposed on the stopper portion. In the inserting step, the pipe is inserted inside the joint receiving portion of the electrofusion joint. In the heating step, the heating wire of the heat generating section is energized. In the pressurizing step, an external force is applied to the pipe toward the stopper portion in the heating step.

By pressurizing from the middle of the heating step in this way, the pressurization is performed in a state where uneven heating is suppressed, so that the occurrence of bead disorder can be reduced.

The connection method according to the fourteenth disclosure is the connection method according to the thirteenth disclosure, and in the pressurizing step, the external force is started to be applied to the pipe after the temperature of the thermoplastic resin exceeds 160° C.

As a result, pressurization can be performed while suppressing uneven heating.

Effects of the Invention

According to the present disclosure, it is possible to provide an electrofusion joint capable of suppressing the occurrence of a clevis and convex portions (wrinkles) on the inner surface, and a fusion method.

DETAILED DESCRIPTION OF THE INVENTION

Hereinafter, embodiments according to the present disclosure will be described with reference to the drawings.

Embodiment 1

The electrofusion joint 1 according to the embodiment 1 according to the present disclosure will be described.

Embodiment 1a

The electrofusion joint 1 according to the embodiment 1a will be described below.

<Structure>

(Overview of Electrofusion Joint 1)

Figure 1:
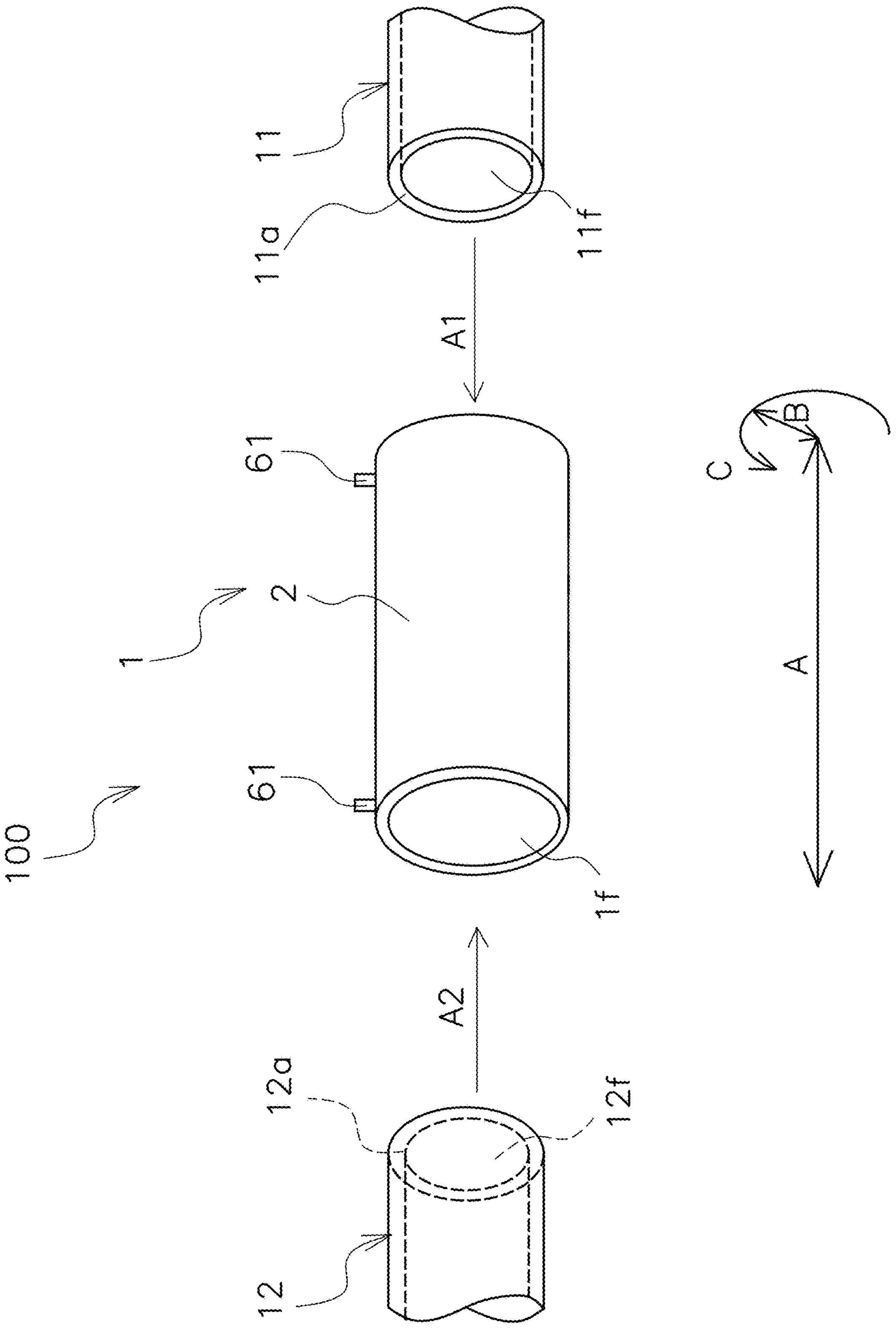
FIG. 1 is an external view showing a resin pipe and a resin pipe connected to an electrofusion joint and the electrofusion joint according to the embodiment 1a of the present disclosure.

FIG. 1 is a view showing an electrofusion joint 1 according to an embodiment of the present invention, and a resin pipe 11 (an example of a pipe containing thermoplastic resin) and a resin pipe 12 (an example of a pipe containing thermoplastic resin) that are connected by the electrofusion joint 1. FIG. 1 could also be called an exploded view of a piping structure 100. The piping structure 100 includes, for example, the electrofusion joint 1, the resin pipe 11, and the resin pipe 12.

As shown in the figure, the electrofusion joint 1 is fused to the resin pipe 11 and the resin pipe 12, thereby connecting the resin pipe 11 and the resin pipe 12.

The resin pipe 11 and the resin pipe 12 are each made of a thermoplastic resin.

Flow paths 11*f* and 12*f* including a circular cross section extend through the inside of the resin pipe 11 and the resin pipe 12. A flow path If including a circular cross section extends through the inside of the electrofusion joint 1. In a state in which the resin pipe 11 and the resin pipe 12 are connected by the electrofusion joint 1, the axes of the respective flow paths of the resin pipe 11, the resin pipe 12, and the electrofusion joint 1 all fall along the same straight line.

The direction in which each axis extends in the flow paths of the electrofusion joint 1, the resin pipe 11, and the resin pipe 12 is defined as the axial direction A. Also, the direction, which is orthogonal to the axes, of moving toward and away from the axes in the electrofusion joint 1, the first resin pipe 11, and the second resin pipe 12 is defined as the radial direction B, and the direction around each axis is defined as the circumferential direction C.

The resin pipe 11 is connected to the electrofusion joint 1 by being moved in the direction of the arrow A1 relative to the electrofusion joint 1. Also, the resin pipe 12 is connected to the electrofusion joint 1 by being moved in the direction of the arrow A2 relative to the electrofusion joint 1. A state in which the first resin pipe 11 and the second resin pipe 12 have been connected by the electrofusion joint 1 constitutes the piping structure 100.

Figure 2:
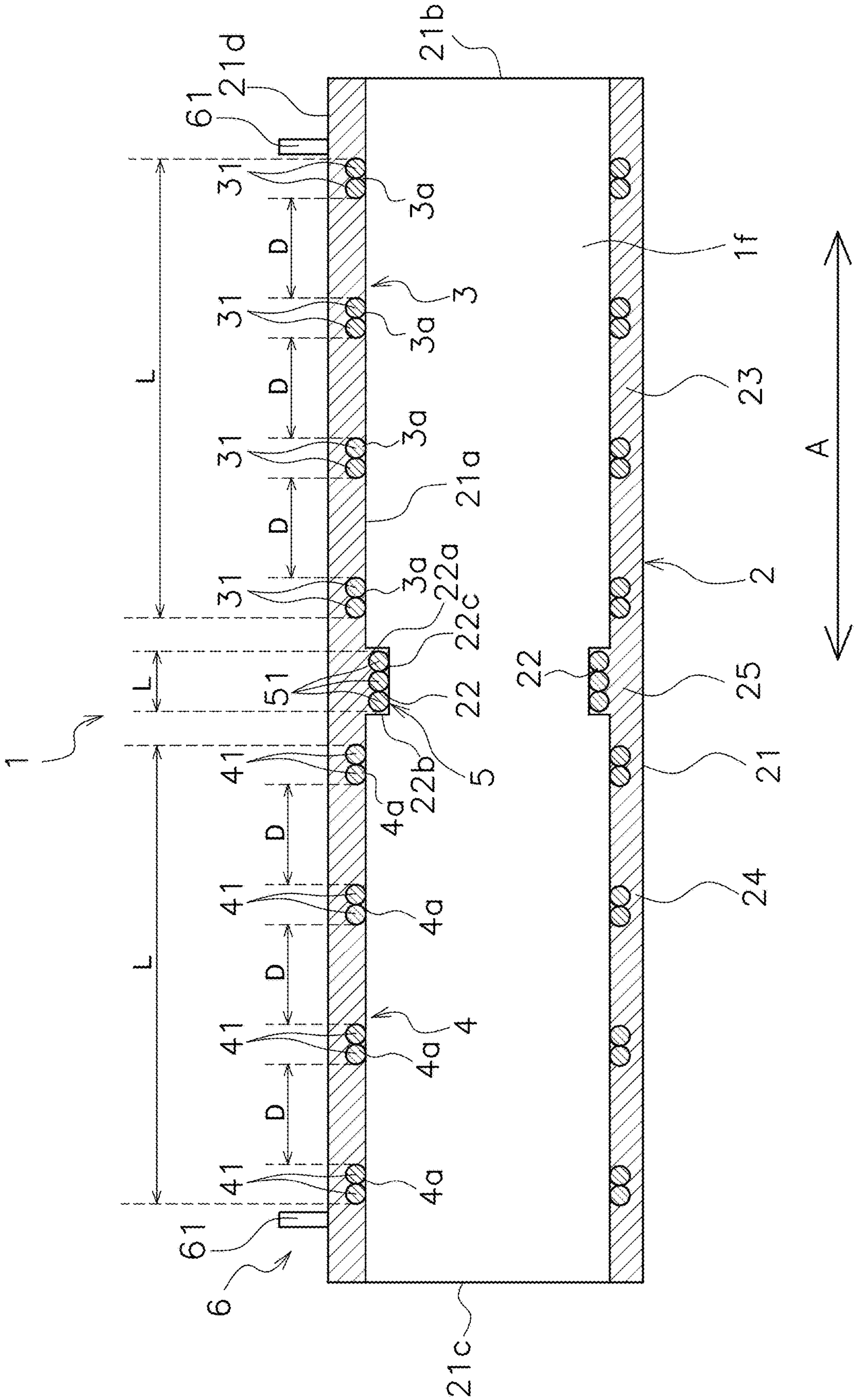
FIG. 2 is a cross-sectional configuration view showing an electrofusion joint of FIG. 1.

FIG. 2 is a view showing the cross-sectional configuration of the electrofusion joint 1.

As shown in FIGS. 1 and 2, the electrofusion joint 1 includes a main body 2, a first heat generating section 3, a first heat generating section 4, a second heat generating section 5, and a connector attachment portion 6.

(Main Body 2)

The main body 2 is formed from a thermoplastic resin and includes a tubular portion 21 and a stopper portion 22, as shown in FIG. 2. The tubular portion 21 is tubular and includes a joint receiving portion 23, a joint receiving portion 24, and a continuous portion 25. The resin pipe 11 is inserted into the joint receiving portion 23. The resin pipe 12 is inserted into the joint receiving portion 24.

There are no particular restrictions on the thermoplastic resin used in the main body 2, but a resin having a melting point of less than 230° C. is preferable.

Figure 3:
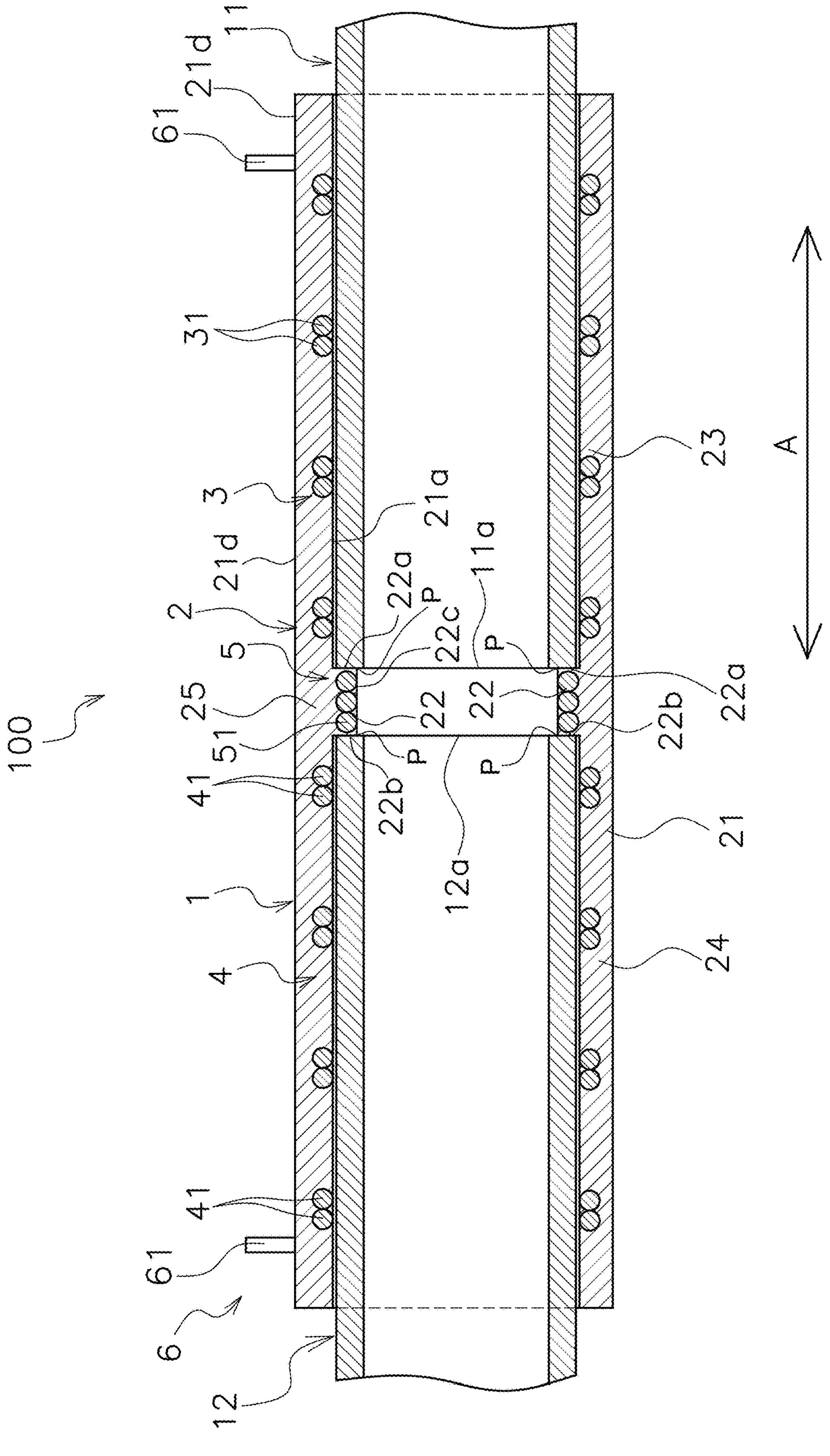
FIG. 3 is a cross-sectional configuration view showing a state in which the resin pipe and the resin pipe are inserted into the electrofusion joint of FIG. 1.

FIG. 3 is a cross-sectional configuration view showing a state in which the resin pipe 11 has been inserted into the joint receiving portion 23 of the electrofusion joint 1 and the resin pipe 12 has been inserted into the joint receiving portion 24.

The inside diameter of the joint receiving portion 23 equal to or larger than the outside diameter of the resin pipe 11. The inside diameter of the joint receiving portion 24 is equal to or larger than the outside diameter of the resin pipe 12.

As shown in FIG. 2, the continuous portion 25 is continuous with the joint receiving portion 23 and the joint receiving portion 24, and connects the joint receiving portion 23 and the joint receiving portion 24. The continuous portion 25 is a portion that spans the joint receiving portion 23 and the joint receiving portion 24, and a stopper portion 22 (discussed below) is provided inside the continuous portion 25 in the radial direction B.

(Stopper Portion 22)

The stopper portion 22 is a portion having the shape of a circular ring. The stopper portion 22 is formed on the inner surface 21*a* of the tubular portion 21, as a rib going all the way around in the circumferential direction C. The stopper portion 22 also contains a thermoplastic resin, and is preferably formed from the same thermoplastic resin as that used in the tubular portion 21.

The stopper portion 22 is formed so as to protrude inward in the radial direction from the inner surface 21*a* of the tubular portion 21. Also, the stopper portion 22 is disposed inside the continuous portion 25 of the tubular portion 21 in the radial direction B. The stopper portion 22 may be formed as a single member with the tubular portion 21, or may be formed as a separate member apart from the tubular portion 21.

The stopper portion 22 includes a first side surface 22*a*, a second side surface 22*b*, and a peripheral surface 22*c*. The peripheral surface 22*c* is the end surface on the inner side of the stopper portion 22 in the radial direction.

The first side surface 22*a* is formed substantially perpendicular to the axial direction A, inward in the radial direction B from the inner surface 21*a* of the tubular portion 21.

The second side surface 22*b* is formed substantially perpendicular to the axial direction A, inward in the radial direction B from the inner surface 21*a* of the tubular portion 21.

The peripheral surface 22*c* connects the end on the inside in the radial direction of the first side surface 22*a* to the end on the inside in the radial direction of the second side surface 22*b*. The peripheral surface 22*c* is formed substantially parallel to the inner surface 21*a* of the tubular portion 21.

When the resin pipe 11 is inserted into the joint receiving portion 23, as shown in FIG. 3, the pipe end 11*a* of the resin pipe 11 comes into contact with the first side surface 22*a* of the stopper portion 22, which restricts the insertion position of the pipe end 11*a*. The concept of the pipe end 11*a* coming into contact with the first side surface 22*a* encompasses both when the pipe end 11*a* comes into direct contact with the first side surface 22*a*, and when the pipe end 11*a* comes into contact with the side surface 22*a* indirectly via the heating wire 51 (discussed below) of the second heat generating section 5.

When the resin pipe 12 is inserted into the joint receiving portion 24, as shown in FIG. 3, the pipe end 12*a* of the resin pipe 12 comes into contact with the second side surface 22*b* of the stopper portion 22, and insertion position of the pipe end 12*a* is restricted. The concept that the pipe end 12*a* comes into contact with the second side surface 22*b* encompasses both when the pipe end 12*a* comes into direct contact with the second side surface 22*b*, and when the pipe end 12*a* comes into indirect contact with the side surface 22*b* via the heating wire 51 (discussed below) of the second heat generating section 5.

In this embodiment, the occurrence of clevis is suppressed between the pipe end 11*a* and the first side surface 22*a* and between the pipe end 12*a* and the second side surface 22*b* (see position P).

(First Heat Generating Sections 3 and 4)

The first heat generating sections 3 and 4 are provided in the joint receiving portions 23 and 24.

As shown in FIG. 2, the first heat generating section 3 includes a heating wire 31 embedded in the inner surface 21*a* on the joint receiving portion 23 which is one end of the tubular portion 21.

The heating wire 31 is disposed so as to be wound in the circumferential direction along the inner surface 21*a*. The heating wire 31 is disposed in the vicinity of the inner surface 21*a*. The heating wire 31 may be embedded in the tubular portion 21 so that a part thereof is exposed on the flow path If side or may be completely embedded.

As shown in FIG. 2, the first heat generating section 4 includes a heating wire 41 embedded in the inner surface 21*a* of the joint receiving portion 24 which is the other end of the tubular portion 21.

The heating wire 41 is disposed so as to be wound in the circumferential direction along the inner surface 21*a*. The heating wire 41 is disposed in the vicinity of the inner surface 21*a*. The heating wire 41 may be embedded in the tubular portion 21 so that a part thereof is exposed on the flow path If side or may be completely embedded.

The heating wires 31 and 41 may include, for example, a conducting wire and an insulating film. As the conducting wire, for example, a nichrome wire, an iron chromium type 2 wire, an iron chromium type 1 wire, a nickel chromium wire, or the like can be used. The insulating film is provided so as to cover the periphery of the conducting wire. The insulating film has a melting point of 230° C. or higher. It is preferable that this is set to a temperature at which the insulating film does not melt even at a temperature at which the thermoplastic resin melts (for example, in the case of polyethylene, the heating wire is heated to 220° C.) in the present embodiment. The insulating film can be formed of, for example, a fluorine-based resin or an imide-based resin, but it is more preferable to form the insulating film with a polyimide-based resin. For example, the thickness of the conducting wire may be set to 0.1 mm or more and 10 mm or less.

The arrangement of the heating wires 31 and 41 in the first heat generating sections 3 and 4 will be described. Since the first heat generating section 4 is provided symmetrically with the first heat generating section 3 with respect to the stopper portion 22, the arrangement of the heating wire will be described using the first heat generating section 3.

The heating wire 31 is disposed so that the heating wire density in the first heat generating section 3 is smaller than the heating wire density in the second heat generating section 5 described later.

In the first heat generating section 3, the heating wire 31 is wound around twice so that the wound parts of the heating wire come into contact with each other, and a predetermined interval D is provided along the axial direction A, and the heating wire 31 is wound around twice so that the wound parts of the heating wire come into contact with each other. Such a configuration is repeated. In the present embodiment, the heating wire 31 is wound around eight turns. The portion wound around twice so that the wound part of the heating wire 31 comes into contact with each other is referred to as a heat generating portion 3*a*. It can be said that the first heat generating section 3 includes a plurality of heat generating portions 3*a*, and the heat generating portions 3*a* are disposed along the axial direction A with a predetermined interval D.

Further, defining that the length of the region where the heating wire 31 is arranged along the axial direction A as L, in FIG. 2, which is a cross-sectional view, in the present embodiment, eight lines of the heating wire 31 are arranged in the length L. The length L can be said to be the length of the first heat generating section 3 along the axial direction A or the length of the heating wire 31 along the axial direction A.

Here, assuming that the outer diameter of the heating wire 31 is 1 mm and the predetermined interval D is 5 mm, since there are eight lines of the heating wire at L=23 mm, the heating wire density in the first heat generating section 3 is 0.35 (lines/mm)≈8 (lines)/23 (mm).

In this way, the heating wire density is defined as the number of lines of the heating wire per unit length (for example, 1 mm). The heating wire density can be obtained as a value obtained by dividing the number of lines of the heating wire 31 disposed at the length L along the axial direction A of the region where the heating wire 31 is disposed by the length L.

As in the case of the first heat generating section 3, the first heat generating section 4 also includes eight lines of the heating wire 41 disposed in a length of 23 mm, so that the heating wire density is set to 0.35 (lines/mm)≈8 (lines)/23 (mm). The portion wound around twice so that the wound parts of the heating wire 41 comes into contact with each other is referred to as a heat generating portion 4*a*. It can be said that the first heat generating section 4 includes a plurality of heat generating portions 4*a*, and the heat generating portions 4*a* are disposed along the axial direction A with a predetermined interval D.

(Second heat generating section 5)

The second heat generating section 5 is provided on the stopper portion 22. The second heat generating section 5 includes a heating wire 51. The heating wire 51 is provided in the stopper portion 22 so as to be wound in the circumferential direction C along the axial direction A. In the present embodiment, the heating wire 51 is wound around, for example, three times in the stopper portion 22. In the second heat generating section 5 of the present embodiment, the adjacent wound parts of the heating wire 51 are all in contact with each other.

The heating wire 51 includes the same configuration as the heating wires 31 and 41.

In the second heat generating section 5, the heating wire 51 is wound three times so that the wound parts of the heating wire 51 come into contact with each other. Therefore, three lines of heating wire 51 are disposed in the length L (which can be said to be the length of the second heat generating section 5) along the axial direction A of the region where the heating wire 51 is disposed.

The diameter of the wound heating wire 51 in the second heat generating section 5 is set to be smaller than the diameter of the wound heating wires 31 and 41 in the first heat generating sections 3 and 4.

Further, the diameter of the wound heating wire 51 in the second heat generating section 5 is set so that the position of the heating wire 51 is within the pipe wall thickness of the resin pipes 11 and 12 inserted.

As described above, assuming that the diameter of the heating wire is 1 mm, the heating wire density in the second heat generating section 5 is set to 1 (lines/mm)=3 (lines)/3 (mm).

As described above, the heating wire density in the first heat generating sections 3 and 4 is about 0.35. Therefore, in the present embodiment, the heating wire density in the first heat generating sections 3 and 4 is set smaller than the heat wire density in the second heat generating section 5.

The operation of winding the heating wire 51 three times in the stopper portion 22 will be described below.

For example, when there is only one line of the heating wire disposed in the stopper portion in the axis A direction, it may be pushed by the resin during injection and the position of the winding wire may shift, which may lead to the occurrence of clevis. In addition, if one winding wire is wound in a circular shape, a confluence portion of the winding wire is generated, but even if the confluence is fixed, a gap will be formed at the winding confluence, so this part is harder to heat than the other parts, and clevis may be generated and stable joint may be difficult. Further, since the stopper portion is long in the circumferential direction and long in the axial direction, it is necessary to increase the pressing force, and there is a possibility that a bead that obstructs the flow path due to an excessive amount of resin may be formed.

Further, when the number of lines of the heating wire disposed in the stopper portion is two in the axis A direction, a confluence portion of the winding wire is generated, but by crushing the confluence portion, the gap becomes inconspicuous and more stable than in the case of one line of wire. However, in the stopper portion in which two lines of the heating wire are disposed, the amount of resin may be insufficient to fill the gap in the confluence portion. This is because it is preferable to prevent the position of the heating wire from shifting during resin injection by filling the heating wire without gaps in the stopper portion, so the stopper dimensions are set to multiplying the height of the winding wire, the width of the winding wire and number of lines of winding wire.

On the other hand, as in the present embodiment, by disposing three lines of the heating wires 51 in the stopper portion 22 in the axis A direction, the amount of resin required to fill the gap of the confluence portion can be supplied, and the number of lines of the heating wire is larger than the case of two lines of the heating wire so the resin is likely to melt. Further, although there are the two confluence portions of the heating wire 51, the heating wire is wound once between them, and the influence of the confluence portion is smaller than that in the case where two lines of the heating wire is disposed.

The heating wire density in the first heat generating sections 3 and 4 described above is not limited to the configuration shown in FIG. 2. Different examples will be described in the following embodiments 1b and 1c.

(Connector Attachment Portion 6)

The connector attachment portion 6 includes two pins 61, as shown in FIG. 2. The two pins 61 are provided so as to protrude outward in the radial direction from the outer surface 21*d* of the tubular portion 21. As shown in FIG. 2, one of the pins 61 is disposed in the vicinity of the end 21*b* of the tubular portion 21, and the other pin 61 is disposed in the vicinity of the end 21*c*. Although not depicted in the figures, the two pins 61 are connected to the heating wires 31, 41, and 51 of the heat generating sections 3, 4, and 5. When the connectors of the electrofusion device are attached to the pin 61 and power is switched on, the heating wires 31, 41, and 51 generate heat.

<Fusion Method>

Figure 4:
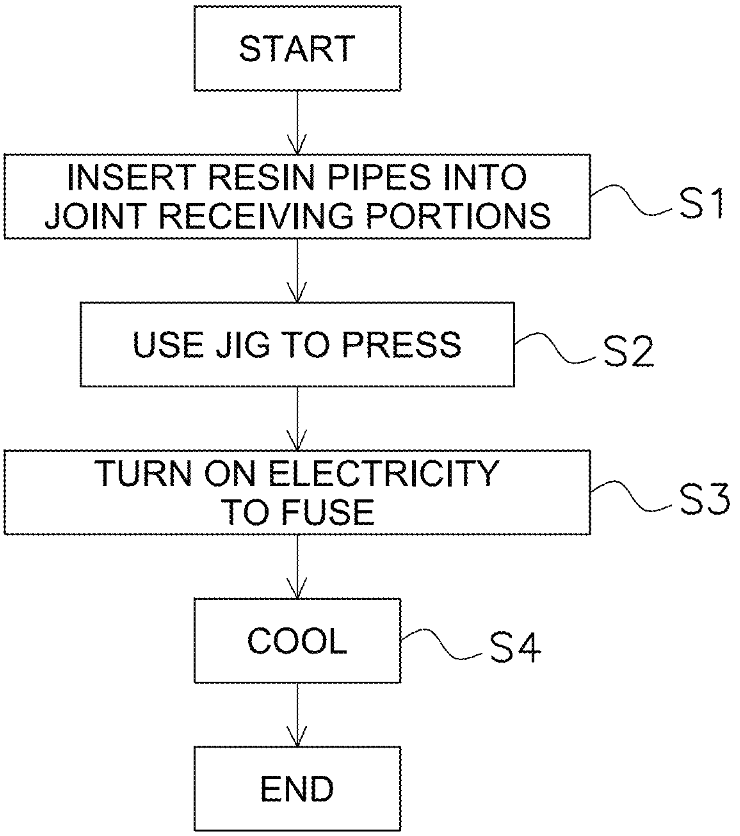
FIG. 4 is a flow chart for explaining a fusion method using the electrofusion joint of FIG. 1.

Next, the fusion method in an embodiment according to the present disclosure will be described. FIG. 4 is a flowchart illustrating the fusion method in this embodiment.

First, in step S1, the resin pipe 11 is inserted into the joint receiving portion 23 of the electrofusion joint 1 until the stopper portion 22 restricts the relative movement of the pipe end 11*a* of the resin pipe 11.

Also, the resin pipe 12 is inserted into the joint receiving portion 24 of the electrofusion joint 1 until the stopper portion 22 restricts the relative movement of the pipe end 12*a* of the second resin pipe 12. FIG. 3 shows a state in which the resin pipe 11 and the resin pipe 12 have been inserted into the electrofusion joint 1.

Next, in step S2, the resin pipe 11 is pressed in the direction of the stopper portion 22 (the direction of arrow A1 shown in FIG. 3) so as to press the pipe end 11*a* against the first side surface 22*a* of the stopper portion 22. Also, the resin pipe 12 is pressed in the direction of the stopper portion 22 (the direction of arrow A2 shown in FIG. 3) so as to press the pipe end 12*a* against the second side surface 22*b* of the stopper portion 22.

Figure 5:
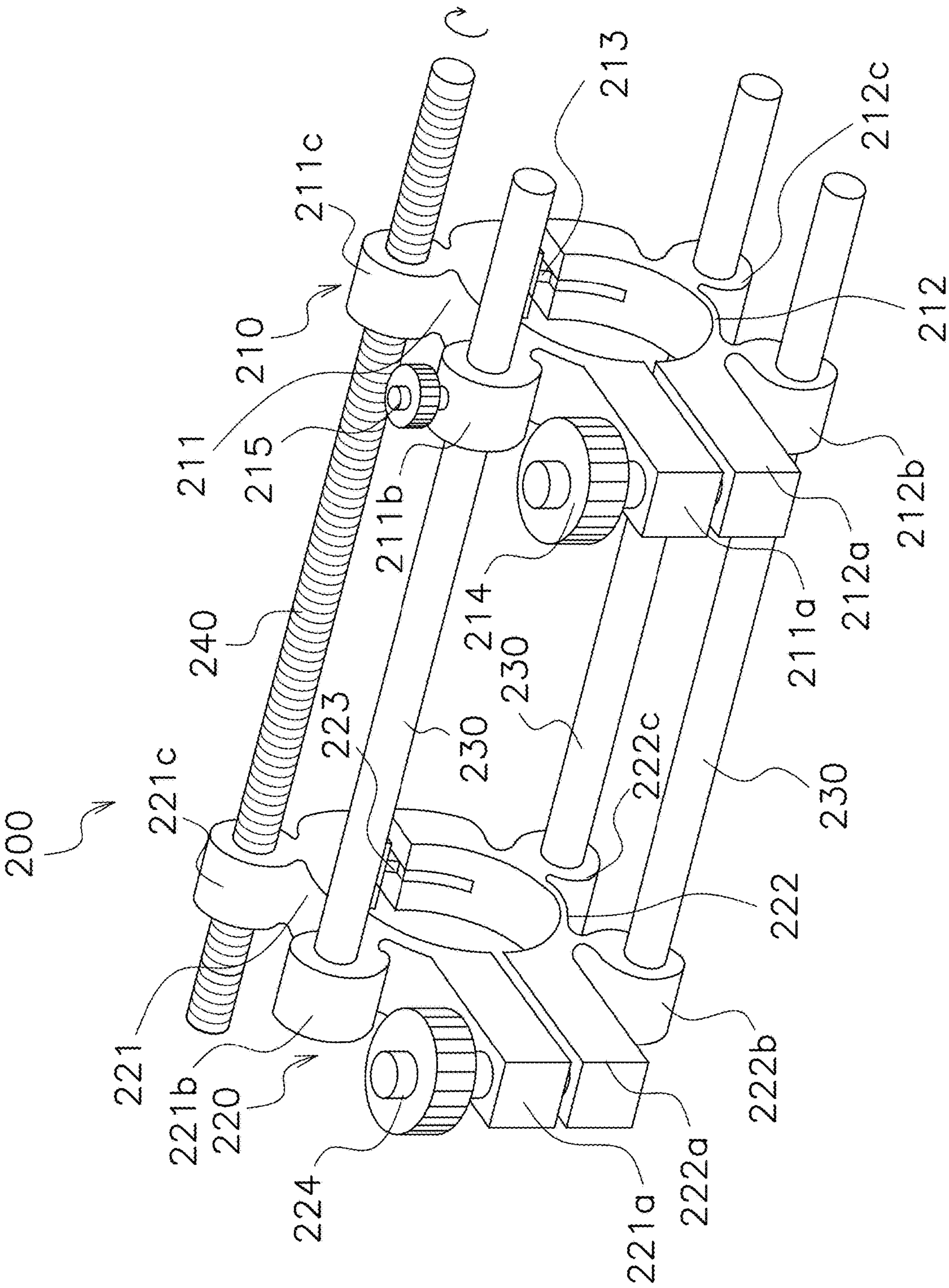
FIG. 5 is a perspective view showing a pressure jig used in the fusion method of FIG. 4.
Figure 6:
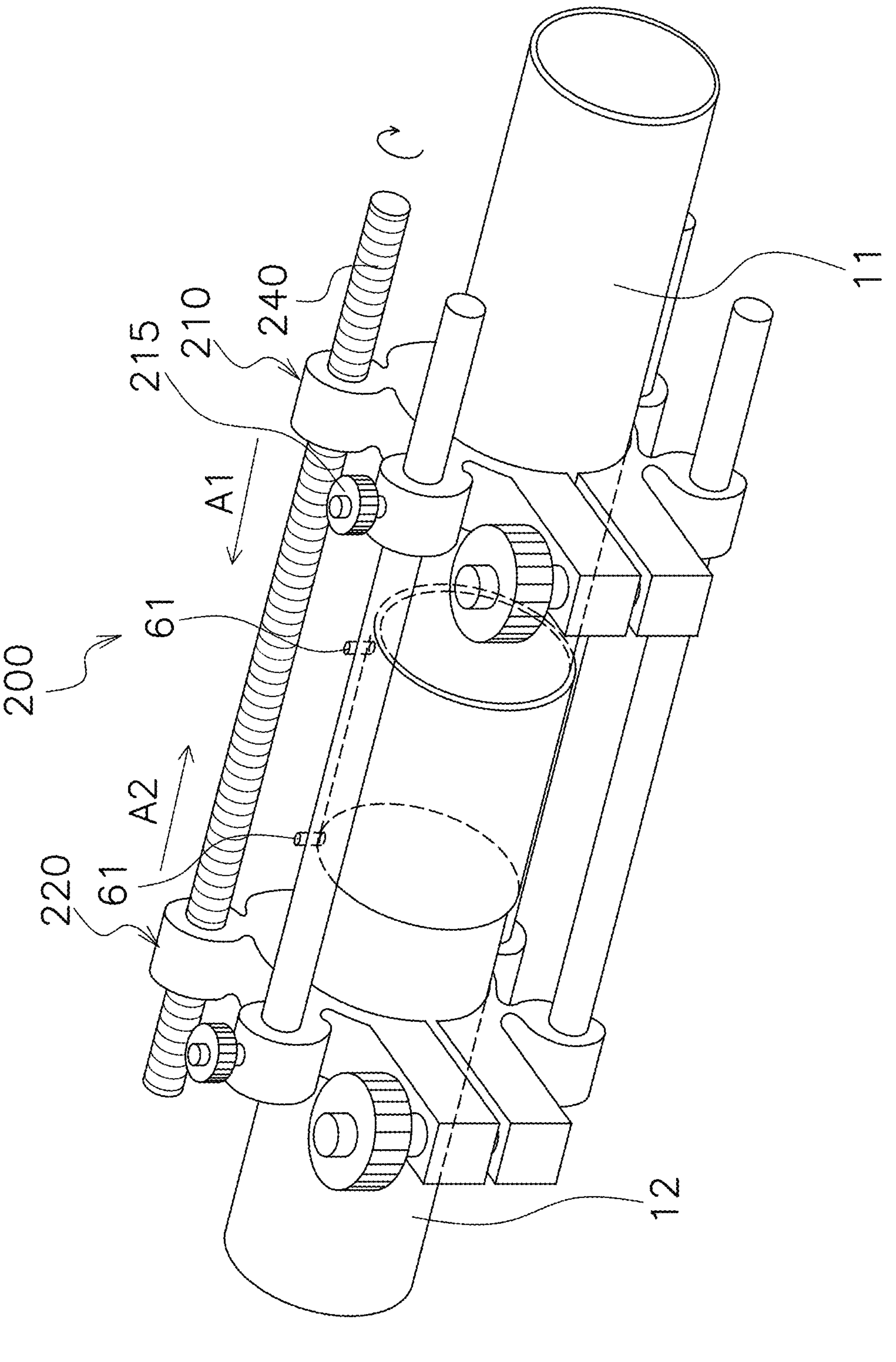
FIG. 6 is a view showing a state in which the resin pipe, the electrofusion joint, and the resin pipe are attached to the pressure jig of FIG. 5.

A jig used for the pressing will now be described. FIG. 5 is a view showing a jig 200. FIG. 6 is a view showing a state in which the resin pipe 11, the electrofusion joint 1, and the resin pipe 12 have been attached to the jig 200.

The jig 200 includes a first clamp portion 210, a second clamp portion 220, three guide members 230, and a threaded pressing member 240.

The first clamp portion 210 includes a first semi-annular portion 211, a second semi-annular portion 212, a hinge portion 213, a tightening portion 214, and a position fixing portion 215.

The first semi-annular portion 211 and the second semi-annular portion 212 are in the approximate shape of a half ring, and can sandwich the outer periphery of the resin pipe 11. The first semi-annular portion 211 includes on its outer periphery a guide support portion 211*b* and a threaded portion 211*c*. A through-hole is formed in the guide support portion 211*b*, and a rod-shaped guide member 230 is inserted therein.

The second semi-annular portion 212 includes on its outer periphery two guide support portions 212*b* and 212*c*. A through-hole is formed in each of the guide support portion 212*b* and the guide support portion 212*c*, and the rod-shaped guide members 230 are inserted therein.

The hinge portion 213 rotatably links the peripheral ends of the first semi-annular portion 211 and the second semi-annular portion 212. The first resin pipe 11 is disposed between the first semi-annular portion 211 and the second semi-annular portion 212 in a state in which the space between the first semi-annular portion 211 and the second semi-annular portion 212 is open with the hinge portion 213 in the center.

The tightening portion 214 is a screw, for example, and is provided at the ends on the opposite side in the peripheral direction from the hinge portion 213 of the first semi-annular portion 211 and the second semi-annular portion 212. The end of the first semi-annular portion 211 on the opposite side in the peripheral direction from the hinge portion 213 protrudes outward, and a through-hole is formed in the protruding portion 211*a*. Also, the end of the second semi-annular portion 212 on the opposite side in the peripheral direction from the hinge portion 213 protrudes outward, and a through-hole is formed in the protruding portion 212*a*.

In a state in which the first semi-annular portion 211 and the second semi-annular portion 212 are closed, the two through-holes are opposite each other, and the tightening portion 214 (a screw) is inserted. The inner peripheral surface of the through-hole in the protruding portion 212*a* is threaded, and the through-hole in the protruding portion 211*a* is not threaded. The tightening portion 214 is inserted into the through-hole of the protruding portion 211*a* and screwed into the through-hole of the protruding portion 212*a*.

Consequently, when the tightening portion 214 is rotated, the protruding portion 211*a* is pressed against the protruding portion 212*a* by the head of the tightening portion 214, and the resin pipe 11 can be clamped by the first clamp portion 210. The tightening portion 214 is not limited to being a screw, and may instead be a bolt and nut, for example, and there are no limitations on the configuration so long as the first semi-annular portion 211 and the second semi-annular portion 212 can be tightened.

The position fixing portion 215 is a threaded member and is provided to the guide support portion 211*b*. More precisely, a threaded hole is formed in the guide support portion 211*b* toward the through-hole into which the guide member 230 is inserted, and the position fixing portion 215 is inserted into this threaded hole.

When the position fixing portion 215 is tightened, the distal end of the position fixing portion 215 comes into contact with the guide member 230, which fixes the position of the first clamp portion 210 with respect to the guide member 230.

The second clamp portion 220 includes a first semi-annular portion 221, a second semi-annular portion 222, a hinge portion 223, and a tightening portion 224.

The first semi-annular portion 221 includes the same shape as the first semi-annular portion 211, and includes a protruding portion 221*a*, a guide support portion 221*b*, and a threaded portion 221*c*. Unlike the guide support portion 211*b*, the guide member 230 is fixed to the guide support portion 221*b*.

Also, the second semi-annular portion 222 includes the same shape as the second semi-annular portion 212, and includes a protruding portion 222*a*, a guide support portion 222*b*, and a guide support portion 222*c*. Unlike the guide support portions 212*b* and 212*c*, the guide members 230 are fixed to the guide support portions 222*b* and 222*c*.

The hinge portion 223 is the same as the hinge portion 213, and rotatably links the ends in the peripheral direction of the first semi-annular portion 221 and the second semi-annular portion 222. The tightening portion 224 is the same as the tightening portion 214, and is provided to the protruding portion 221*a* and the protruding portion 222*a*.

The guide member 230 is inserted through the guide support portion 211*b* and fixed to the guide support portion 221*b*. The guide member 230 is inserted through the guide support portion 212*b* and fixed to the guide support portion 222*b*. The guide member 230 is inserted through the guide support portion 212*c* and fixed to the guide support portion 222*c*.

The threaded pressing member 240 is a ball screw, and is inserted into the threaded portion 211*c* and the threaded portion 221*c*. The threaded portion 211*c* and the threaded portion 221*c* are formed with threaded holes through which the threaded pressing member 240 is inserted, and the threaded portion 211*c* and the threaded portion 221*c* are formed with threaded holes in the opposite direction. That is, when the threaded pressing member 240 is rotated, the first clamp portion 210 and the second clamp portion 220 move toward or away from each other along the guide member 230.

As shown in FIG. 6, the resin pipe 11 is squeezed and fixed by the first clamp portion 210, the resin pipe 12 is squeezed and fixed by the second clamp portion 220, and when the threaded pressing member 240 is then rotated, the first clamp portion 210 and the second clamp portion 220 move toward each other (see arrows A1 and A2).

This allows the resin pipe 11 and the resin pipe 12 to be pressed so that the pipe end 11*a* of the resin pipe 11 is pressed against the first side surface 22*a* of the stopper portion 22, and the pipe end 12*a* of the resin pipe 12 is pressed against the second side surface 22*b* of the stopper portion 22.

Also, the pressed state produced by the first clamp portion 210 and the second clamp portion 220 can be maintained by tightening the position fixing portion 215 in the pressed state.

Next, in step S3, in a pressed state, the connectors of the electrofusion device are attached to the two pins 61 of the connector attachment portion 6, and the power is turned on for a specific length of time. The threaded pressing member 240 may be rotated while the power is on so that the first resin pipe 11 and the second resin pipe 12 are pushed into the electrofusion joint 1. The heating wire temperature when the power is on may be any temperature that is high enough to melt the main body 2, and in the case of a polyolefin, the temperature is preferably no higher than 220° C.

Figure 7:
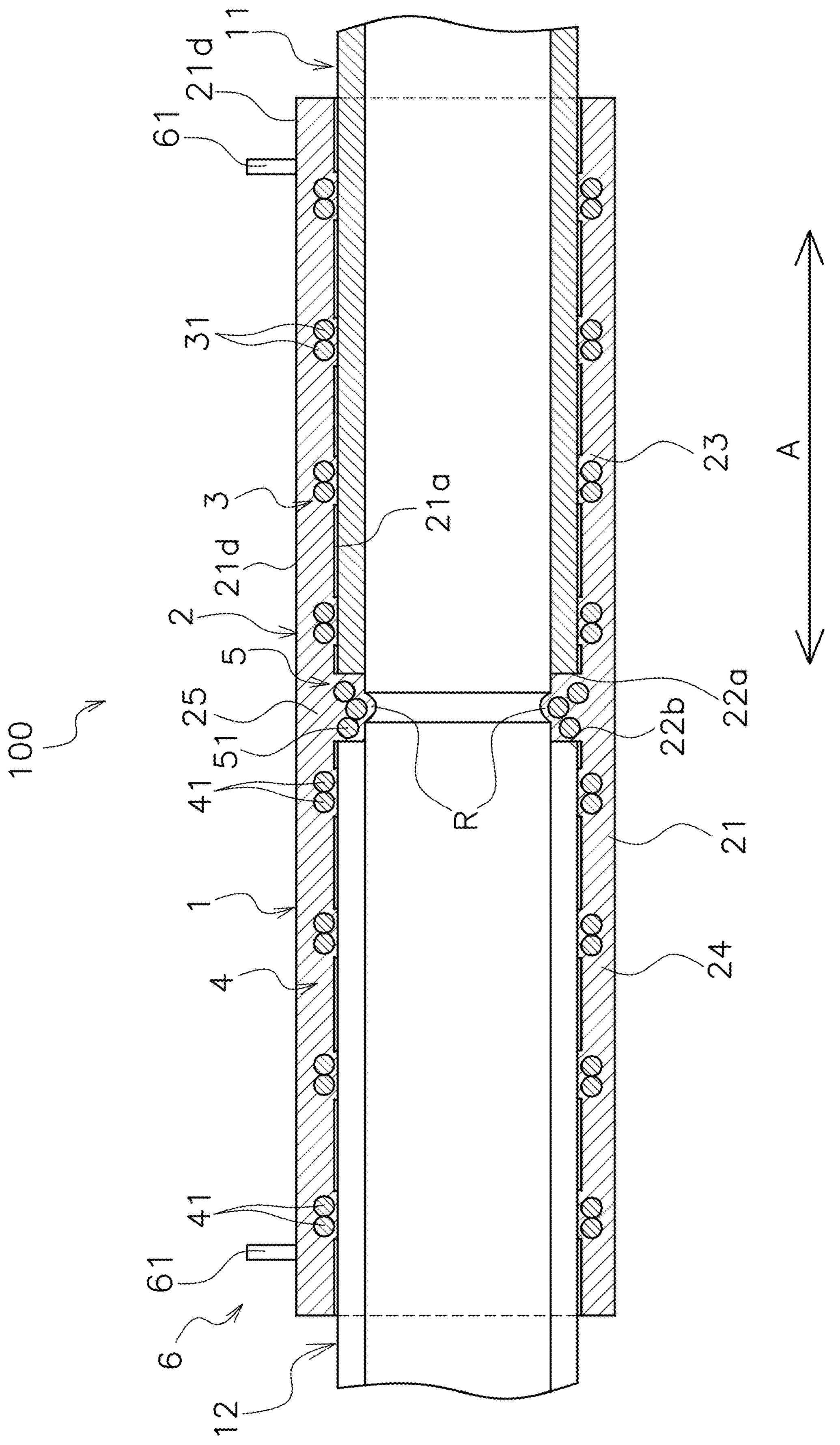
FIG. 7 is a cross-sectional configuration view showing a state in which the electrofusion joint of FIG. 1 and the resin pipes are fused.

FIG. 7 is a view showing a state in which the resin pipe 11, the electrofusion joint 1 and the resin pipe 12 are molten and connected. As shown in FIG. 7, the stopper portion 22 is molten, the stopper portion 22 is narrowed by being pushed by the resin pipes 11 and 12, and a bead R which fills the space between the resin pipe 11 and the resin pipe 12 is formed.

This energization causes the heating wires 31, 41, 51 to generate heat. Here, by setting the heating wire density in the first heat generating sections 3 and 4 smaller than the heating wire density in the second heat generating section 5, when the resin pipes 11 and 12 are inserted into the joint receiving portions 23 and 24 and heating is performed while pressing the resin pipes 11 and 12 against the stopper portion 22, the portions between the surfaces of the pipe ends 11*a* and 12*a* of the resin pipes 11 and 12 and the stopper portion 22 is fused before the portions between the outer peripheral surfaces of the resin pipes 11 and 12 and the inner peripheral surfaces of the joint receiving portions 23 and 24. Therefore, the seam can be filled and the formation of clevis can be suppressed.

Further, by reducing the heating wire density in the joint receiving portions 23 and 24, the resin pipes 11 and 12 are not heated too much, so that the occurrence of convex portions (wrinkles) on the inner surfaces of the resin pipes 11 and 12 can be suppressed.

Further, in the electrofusion joint 1, the number of turns of the heating wire 51 in the second heat generating section 5 is larger than the number of turns of the heat generating portion 3*a*. Further, the number of turns of the heating wire 51 in the second heat generating section 5 is larger than the number of turns of the heat generating portion 4*a*.

When the heating wires 31 and 41 of the first heat generating section 3 and 4 and the heating wire 51 of the second heat generating section 5 have the same wire diameter and material, the larger the number of turns, the faster it is for the temperature to rise during energization. If the number of turns of the heating wire 51 of the second heat generating section 5 is smaller than the number of turns of the heating wires 31 and 41 of the first heat generating sections 3 and 4, the heat generated by the first heat generating sections 3 and 4 is larger than the heat generated by the second heat generating section 5. Therefore, the side surface of the resin pipes 11 and 12 are first heated and expanded. As a result, the resin pipes 11 and 12 are restrained by the portions of the first heat generating sections 3 and 4, and a large force is required to push the resin pipes 11 and 12 (see arrows A1 and A2) in order to press the pipe ends 11*a* and 12*a* against the stopper portion 22, it is necessary to use a large and heavy jig, and it is costly to fuse.

On the other hand, as in the present embodiment, the number of turns of the heating wire 51 in the second heat generating section 5 is larger than the number of turns of the heat generating portions 3*a* and 4*a*, so that the heat generated in the second heat generating section 5 is larger than the heat generated in the heat generating portions 3*a* and 4*a* closest to the second heat generating section 5. As a result, the pipe ends 11*a* and 12*a* can be pressed against the stopper portion 22 by melting the resin by the second heat generating section 5 before the resin pipes 11 and 12 are restrained by the electrofusion joint 1 due to the heating expansion of the side surfaces of the resin pipes 11 and 12. Therefore, fusion can be performed with a small pushing force.

It is permissible that the resin protrudes like a burr after fusion at the seam portion between the stopper portion 22 and the pipe ends 11*a* and 12*a* of the resin pipes 11 and 12, and the inner peripheral surface of the stopper portion 22 and the inner peripheral surfaces of the resin pipes 11 and 12 do not have to be flush with each other.

Embodiment 1b

Next, the electrofusion joint 101 of the embodiment 1b according to the present disclosure will be described.

The electrofusion joint 101 of the embodiment 1b has different heating wire densities in the first heat generating sections 3 and 4 from the electrofusion joint 1 of the first embodiment 1a.

Figure 8:
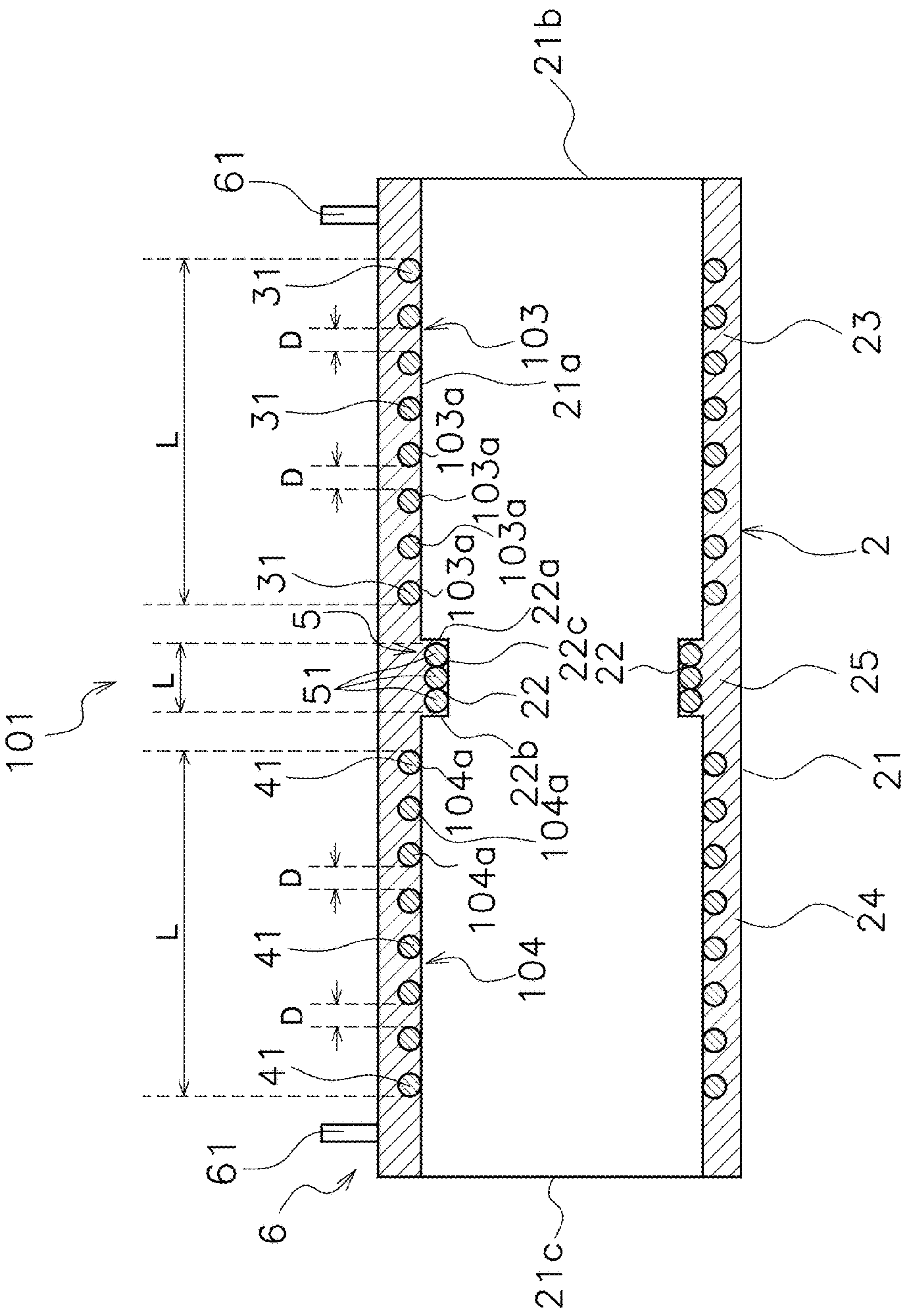
FIG. 8 is a cross-sectional configuration view showing an electrofusion joint according to the embodiment 1b of the present disclosure.

FIG. 8 is a cross-sectional configuration view showing the electrofusion joint 101 of the first embodiment 1b. The electrofusion joint 101 shown in FIG. 8 includes a first heat generating section 103 in which the heating wire 31 is wound differently from the first heat generating section 3 of the first embodiment 1a, and a first heat generating section 104 in which the heating wire 41 is wound differently from the first heat generating section 4 of the first embodiment 1a.

Since the first heat generating section 103 and the first heat generating section 104 have a symmetrical configuration with respect to the stopper portion 22, the first heat generating section 103 will be described as an example.

The heating wire 31 is disposed so that the heating wire density in the first heat generating section 103 is smaller than the heating wire density in the second heat generating section 5.

In the first heat generating section 103, the heating wire 31 is wound once, the heating wire 31 is wound once with a predetermined interval D, and the heating wire 31 is wound once with a predetermined interval D. Such a configuration is repeated. In this embodiment, the heating wire 31 is wound eight times. The portion in which the heating wire 31 is wound around once is referred to as a heat generating portion 103*a*. It can be said that the first heat generating section 103 includes a plurality of heat generating portions 103*a*, and the heat generating portions 103*a* is disposed at predetermined intervals D along the axial direction A.

Further, when the length of the region where the heating wire 31 is disposed along the axial direction A is defined as L, in the present embodiment, eight lines of the heating wire 31 are disposed in the length L. The length L can be said to be the length of the first heat generating section 103 along the axial direction A or the length of the heating wire 31 along the axial direction A.

Here, assuming that the outer diameter of the heating wire 31 is 1 mm and the predetermined interval D is 1 mm, since there are eight lines of the heating wire at L=15 mm, the heating wire density in the first heat generating section 103 is set to 8/15≈0.53 (lines/mm).

As in the case of the first heat generating section 103, the first heat generating section 104 also includes eight lines of the heating wire 41 disposed in a length of 15 mm, so that the heating wire density is set to 8/15≈0.53 (lines/mm). The portion in which the heating wire 41 is wound around once is referred to as a heat generating portion 104*a*. It can be said that the first heat generating section 104 includes a plurality of heat generating portions 104*a*, and the heat generating portions 104*a* are disposed at predetermined intervals D along the axial direction A.

Also in this embodiment, the heating wire density of the second heat generating section 5 is 1 as in the embodiment 1a. Therefore, the heating wire density in the first heat generating section 103 and 104 are set to be smaller than the heating wire density in the second heat generating section 5.

Embodiment 1c

Next, the electrofusion joint 201 of the embodiment 1c according to the present disclosure will be described.

The electrofusion joint 201 of the embodiment 1c has different heating wire densities in the first heat generating sections 3 and 4 from the electrofusion joint 1 of the embodiment 1a.

Figure 9:
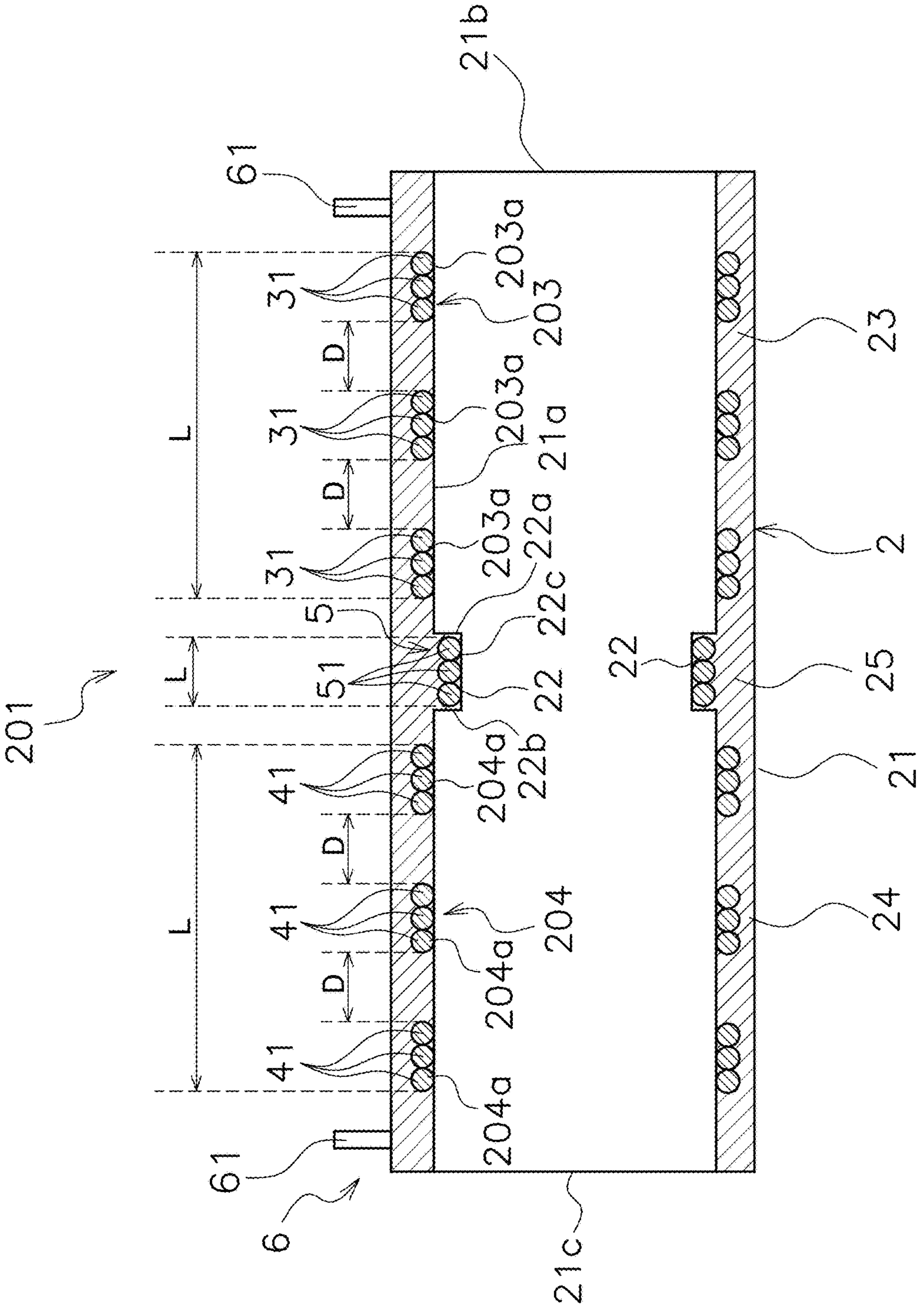
FIG. 9 is a cross-sectional configuration view showing an electrofusion joint according to the embodiment 1c of the present disclosure.

FIG. 9 is a cross sectional configuration view showing the electrofusion joint 201 of the first embodiment 1c. The electrofusion joint 201 shown in FIG. 9 includes a heat generating section 203 in which the heating wire 31 is wound differently from the first heat generating section 3 of the embodiment 1a and a heat generating section 204 in which the heating wire 41 is wound differently from the first heat generating section 4 of the embodiment 1a.

Since the heat generating section 203 and the heat generating section 204 have a symmetrical configuration with respect to the stopper portion 22, the heat generating section 203 will be described as an example.

The heating wire 31 is disposed so that the heating wire density in the heat generating section 203 is smaller than the heating wire density in the second heat generating section 5.

In the heat generating section 203, the heating wire 31 is wound around three times so that the wound parts of the heating wire 31 come contact with each other, and a predetermined interval D is provided along the axial direction A, and the heating wire 31 is wound around three times so that the wound parts of the heating wire 31 come contact with each other. Such a configuration is repeated. In the present embodiment, the heating wire 31 is wound around nine times. The portion in which the heating wire 31 is wound around three times is referred to as a heat generating portion 203*a*. It can be said that the first heat generating section 203 includes a plurality of heat generating portions 203*a*, and the heat generating portions 203*a* are disposed along the axial direction A with a predetermined interval D.

Further, defining that the length of the region where the heating wire 31 is disposed along the axial direction A as L, in the present embodiment, nine lines of the heating wire 31 are disposed in the length L. The length L can be said to be the length of the first heat generating section 203 along the axial direction A or the length of the heating wire 31 along the axial direction A.

Here, assuming that the outer diameter of the heating wire 31 is 1 mm and the predetermined interval D is 3 mm, since there are nine lines of the heating wire at L=15 mm, the heating wire density in the heat generating section 203 is set to 0.6 (lines/mm)=9 (lines)/15 (mm).

As in the case of the heat generating section 203, the heat generating section 204 also includes nine lines of the heating wire 41 disposed in a length of 15 mm, so that the heating wire density is set to 0.6 (lines/mm)=9 (lines)/15 (mm). The portion in which the heating wire 41 is wound around three times is referred to as a heat generating portion 204*a*. It can be said that the first heat generating section 204 includes a plurality of heat generating portions 204*a*, and the heat generating portions 204*a* are disposed along the axial direction A with a predetermined interval D.

Also in this embodiment, the heating wire density of the second heat generating section 5 is 1 as in the embodiment 1a. Therefore, the heating wire density in the heat generating section 203 and 204 are set to be smaller than the heating wire density in the second heat generating section 5.

In the electrofusion joint 201 of the embodiment 1c, the number of turns of the heating wire 51 in the second heat generating section 5 is configured to be the same as the number of turns of the heat generating portions 203*a* and 204*a* of the first heat generating sections 203 and 204.

In the first embodiment 1c, since the number of turns of the heating wires 31 and 41 of the heat generating portions 203*a* and 204*a* of the first heat generating section 203 and 204 is the same as the number of turns of the heating wire 51 of the second heat generating section 5, the temperature of the heat generating portions 203*a* and 204*a* and the temperature of the second heat generating section 5 rise at the same time. At least the temperature of the heat generating portions 203*a* and 204*a* does not rise faster than the temperature of the second heat generating section 5. So, a large pushing force is not required when the pipe ends 11*a* and 12*a* are pressed against the stopper portion 22, and fusion is easy. In consideration of ease of pushing, it is preferable that the number of turns of the heating wires 31 and 41 of the heat generating portions 203*a* and 204*a* is smaller than the number of turns of the heating wires 51 of the second heat generating section 5.

Embodiment 1d

Next, the electrofusion joint 301 of the embodiment 1d according to the present disclosure will be described.

The electrofusion joint 301 of the embodiment 1d is provided with air holes 371 and 372 in the electrofusion joint 1 of the embodiment 1a.

Figure 10:
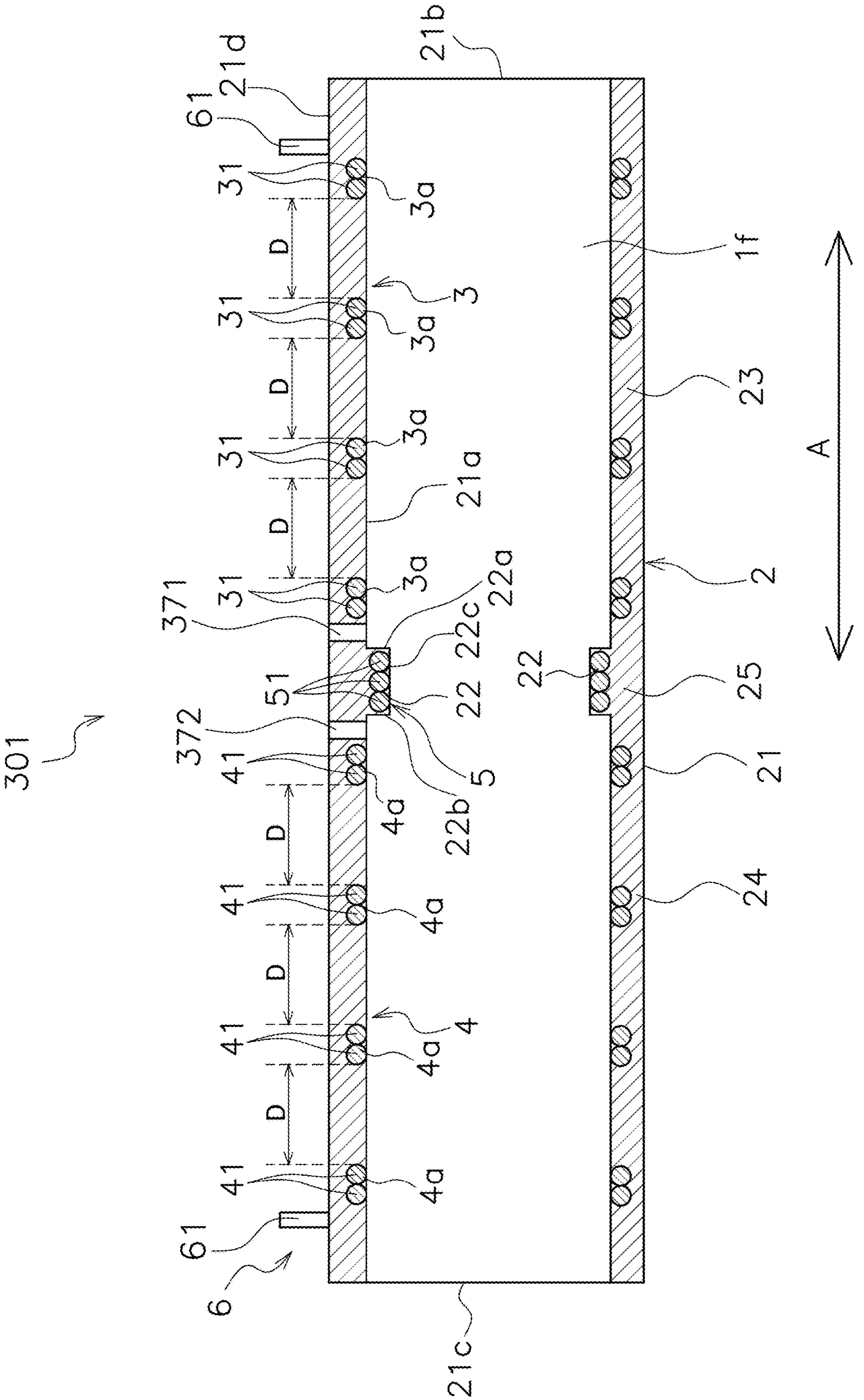
FIG. 10 is a cross-sectional configuration view showing an electrofusion joint according to the embodiment 1d of the present disclosure.

FIG. 10 is a cross sectional view showing the electrofusion joint 301 of the embodiment 1d.

The air hole 371 (an example of a through hole) is formed between the second heat generating section 5 and the first heat generating section 3 in the axial direction A, and penetrates from the inner surface 21*a* to the outer surface 21*d* of the main body 2. The air hole 371 is disposed between the stopper portion 22 and the heat generating portion 3*a* disposed next to the stopper portion 22 (closest to the stopper portion 22). A plurality of air holes 371 may be formed in the circumferential direction, but only one may be formed.

The air hole 372 (an example of a through hole) is formed between the second heat generating section 5 and the first heat generating section 4 in the axial direction A, and penetrates from the inner surface 21*a* to the outer surface 21*d* of the main body 2. The air hole 372 is disposed between the stopper portion 22 and the heat generating portion 4*a* disposed next to the stopper portion 22 (closest to the stopper portion 22). A plurality of air holes 372 may be formed in the circumferential direction, but only one may be formed.

Figure 11A:
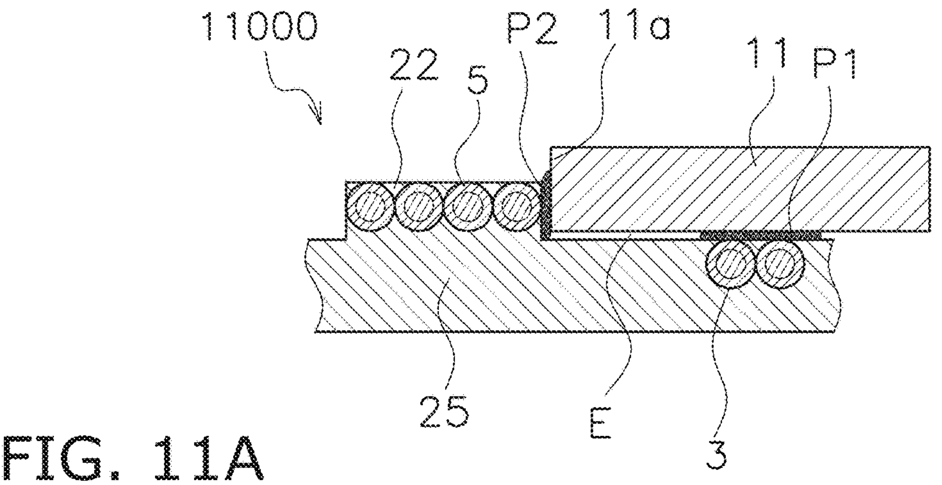
FIGS. 11(*a*) to 11(*c*) are views for explaining that a size and shape of a bead become unstable.
Figure 11B:
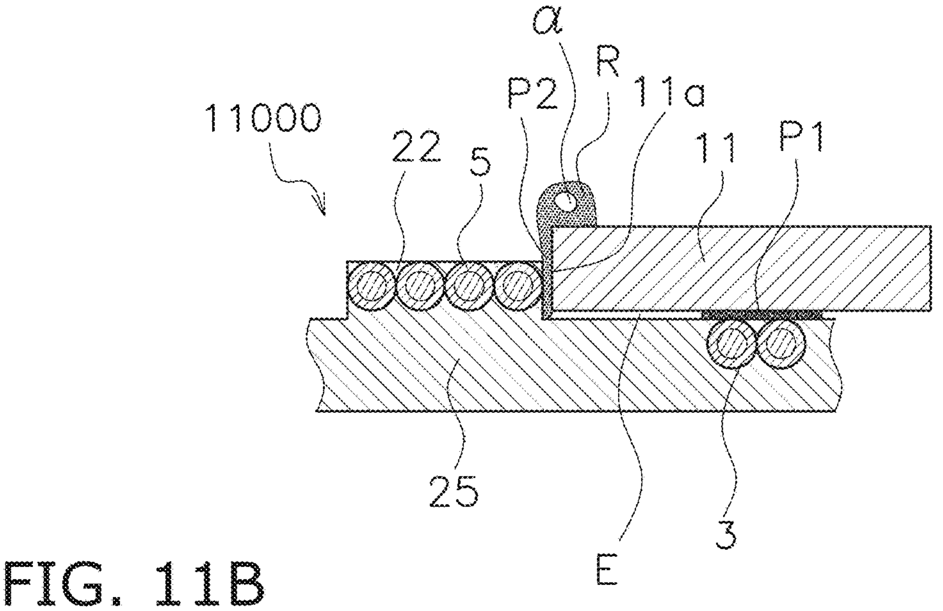
Figure 11C:
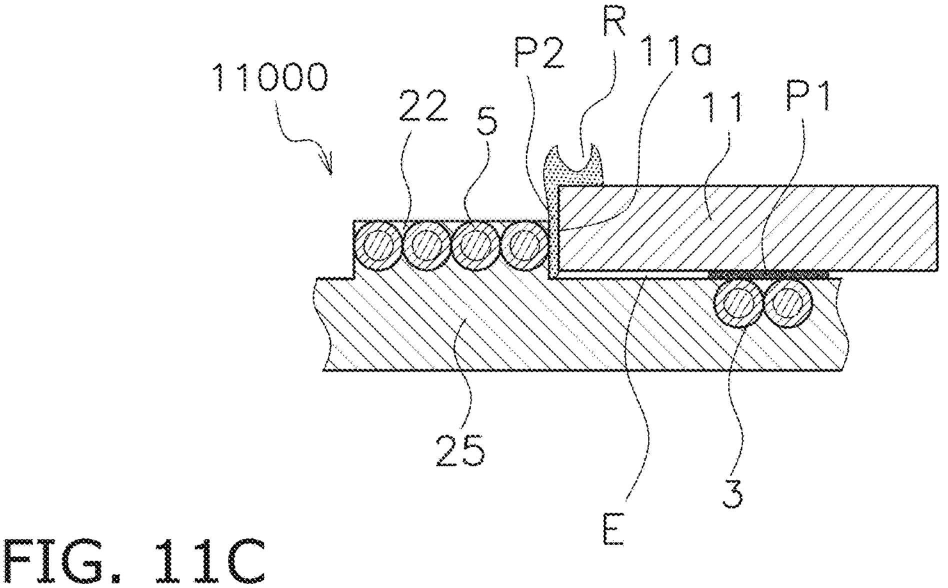

The effects of the air holes 371 and 372 will be described with reference to FIGS. 11(*a*) to 11(*c*). FIG. 11(*a*) is a view showing a state in which the resin pipe 11 is inserted into the electrofusion joint 11000 in which the air hole 371 is not formed. Air exists in the clearance (indicated by E in the figure) between the inner surface of the electrofusion joint 1000 and the outer surface of the resin pipe 11 in the portion (cold zone) between the second heat generating section 5 of the stopper portion 22 and the first heat generating section 4 of the joint receiving portion 23. When the fusion is started, the fusion (the fused portion is indicated by P2 in the figure) between the stopper portion 22 provided with the second heat generating section 5 and the pipe end 11*a* of the resin pipe 11 and the fusion (the fused portion is indicated by P1 in the figure) between the inner surface of the portion of the joint receiving portion 23 where the first heat generating section 3 is provided and the outer surface of the resin pipe 11 proceeds at the same time. Therefore, air in the clearance E may be expanded by heat in a state of being confined between the fused portions P1 and P2, and the bead R may be ejected. Further, as shown in FIG. 11(*b*), there is no escape place for air in the clearance E, and air a may enter inside the bead R. In this case, the air a further expands, and as shown in FIG. 11(*c*), when the air a bursts, a depression is generated. When the bead R is ejected or a depression is generated, the fluid tends to stay, which is not preferable.

On the other hand, by forming the air holes 371 and 372 as in the electrofusion joint 301 of the present embodiment 1d, the air between the fused portion P1 and the fused portion P2 is discharged from the air holes 371, 372. Therefore, it is possible to suppress the ejection of the bead R and suppress the generation of a convex portion.

Other Embodiments

Although one embodiment of the present disclosure has been described above, the present disclosure is not limited to the above embodiment, and various changes can be made without departing from the gist of the invention.

(A)

In the above embodiment, all wound parts of the heating wires 51 of the second heat generating section 5 are in contact with each other, but all or part of them may not be in contact with each other.

(B)

In the above embodiment, the external shape of the stopper portion 22 is circular when viewed along the axial direction A, but it is not limited to a circle and may be a polygonal shape.

(C)

In the above embodiment, the first heat generating sections 3, 103, 203 and the first heat generating sections 4, 104, 204 are provided symmetrically with the stopper portion 22 interposed therebetween, but the present invention is not limited to this. For example, the heat generating section 3 may be provided in one joint receiving portion 23 and the heat generating section 104 may be provided in the other joint receiving portion 24 with the stopper portion 22 interposed therebetween.

(D)

In the above embodiment, the flow paths of the electrofusion joints 1, 101, and 201 are all formed in a straight line, but an elbow joint in which the flow path is curved may be used.

(E)

In the above described embodiments 1a to 1*d*, the same heating wire is used for the heating wires 31, 41, 51 of the first heat generating section 3, 4, 103, 104, 203, 204 and the second heat generating section 5, so the insulating film is provided on all heating wires 31, 41, and 51, but the heating wire is not limited to this.

However, it is preferable that at least the heating wire 51 is provided with an insulating film. This is because the resin pipe 11 and the resin pipe 12 may pressurize the heating wires 51 so that the parts of the heating wires 51 are likely to come into contact with each other.

(F)

In the above embodiments 1a to 1*d*, the pipe end 11*a* of the resin pipe 11 and the pipe end 12*a* of the resin pipe 12 are pressed against the stopper portion 22, but they do not have to be pressed. However, in order to suppress the occurrence of clevis, it is preferable to press them, and the construction time can be shortened.

(G)

In the above embodiments 1a and 1*c*, the same number of turns (2 turns and 3 turns) come contact with each other in the first heat generating section 3, but the number of turns in contact in the first heat generating section 3 may be different. The same applies to the first heat generating sections 4, 203 and 204.

Example

Next, the above described embodiment will be described in detail with reference to examples.

Example 1

In the example 1, the electrofusion joint 1 of the above-mentioned embodiment 1a is used. The resin pipe 11 and the resin pipe 12 are 25A pipes, and polyethylene pipes having a wall thickness of 2.9 mm are used. These 25A polyethylene pipes are inserted into the electrofusion joint 1 of the example 1, after that, while pressing the polyethylene pipes in the direction of the stopper portion 22, the heat generating section 3, 4, 5 are energized to fuse the polyethylene pipes and the electrofusion joint.

In the example 1, as described as an example in the embodiment 1a, the outer diameters of the heating wires 31 and 41 shown in FIG. 2 are set to 1 mm, and the interval D is set to 5 mm. Therefore, the length L is 23 mm, and the heating wire densities in the first heat generating sections 3 and 4 are 0.35 (lines/mm)≈8 (lines)/23 (mm).

Further, the heating wire density in the second heat generating section 5 is 1 (lines/mm)=3 (lines)/3 (mm).

The polyethylene pipe (resin pipe 11 and resin pipe 12) and the joint (electrofusion joint 1) after fusion are divided into two in the tubular direction, and the clevis is evaluated by visual observation. As for the evaluation of the clevis, the one in which the bead is formed in the shape of an inner circle at the contact part (position indicated by P in FIG. 3) of the two polyethylene pipes is marked with o, and the one in which the bead is not formed in part of the inner circle is marked with Δ, and one in which no bead is formed is marked with x.

Further, it is evaluated whether or not wrinkles are formed on the inner peripheral surfaces of the polyethylene pipes (inner peripheral surfaces of the joint receiving portion 23 and the joint receiving portion 24) in contact with the first heat generating sections 3 and 4. As for the evaluation of wrinkles, a uneven surface such as sink marks and wrinkles is visually observed and the uneven surface having an unacceptable size is marked with x as having wrinkles, and a uneven surface such as sink marks and wrinkles is visually observed, but the uneven surface having acceptable size are marked with Δ as acceptable wrinkles, and no uneven surface is marked with o as no wrinkle.

The results are shown in (Table 1) below.

As shown in (Table 1), no wrinkle is observed and no clevis is observed in the configuration of Example 1.

Example 2

In the example 2, the electrofusion joint 101 of the above-mentioned embodiment 1b is used. The resin pipe 11 and the resin pipe 12 are 25A pipes, and polyethylene pipes having a wall thickness of 2.9 mm are used. These 25A polyethylene pipes are inserted into the electrofusion joint 101 of the example 2, after that, while pressing the polyethylene pipes in the direction of the stopper portion 22, the heat generating section 103, 104, 5 are energized to fuse the polyethylene pipes and the electrofusion joint.

In the example 2, as described as an example in the embodiment 1b, the outer diameters of the heating wires 31 and 41 shown in FIG. 8 are set to 1 mm, and the interval D is set to 1 mm. Therefore, the length L is 15 mm, and the heating wire densities in the first heat generating sections 103 and 104 are 0.53 (lines/mm)≈8 (lines)/15 (mm).

Further, the heating wire density in the second heat generating section 5 is 1 (lines/mm)=3 (lines)/3 (mm).

After the polyethylene pipe and the electrofusion joint 101 are fused, the same visual observation as in Example 1 is performed. The results are shown in (Table 1).

As shown in (Table 1), in the electrofusion joint 101 of Example 2, no wrinkle is observed and no clevis is observed.

Example 3

In the example 3, the electrofusion joint 201 of the above-mentioned embodiment 1c is used. The resin pipe 11 and the resin pipe 12 are 25A pipes, and polyethylene pipes having a wall thickness of 2.9 mm are used. These 25A polyethylene pipes are inserted into the electrofusion joint 201 of the example 3, after that, while pressing the polyethylene pipes in the direction of the stopper portion 22, the heat generating section 203, 204, 5 are energized to fuse the polyethylene pipes and the electrofusion joint.

In the example 3, as described as an example in the embodiment 1c, the outer diameters of the heating wires 31 and 41 shown in FIG. 9 are set to 1 mm, and the interval D is set to 3 mm. Therefore, the length L is 15 mm, and the heating wire densities in the first heat generating sections 103 and 104 are 0.6 (lines/mm)=9 (lines)/15 (mm).

Further, the heating wire density in the second heat generating section 5 is 1 (lines/mm)=3 (lines)/3 (mm).

After the polyethylene pipe and the electrofusion joint 201 are fused, the same visual observation as in Example 1 is performed. The results are shown in (Table 1).

As shown in (Table 1), in Example 3, there are some unformed portions of bead, and acceptable wrinkles are observed.

Comparative Example 1

Figure 12:
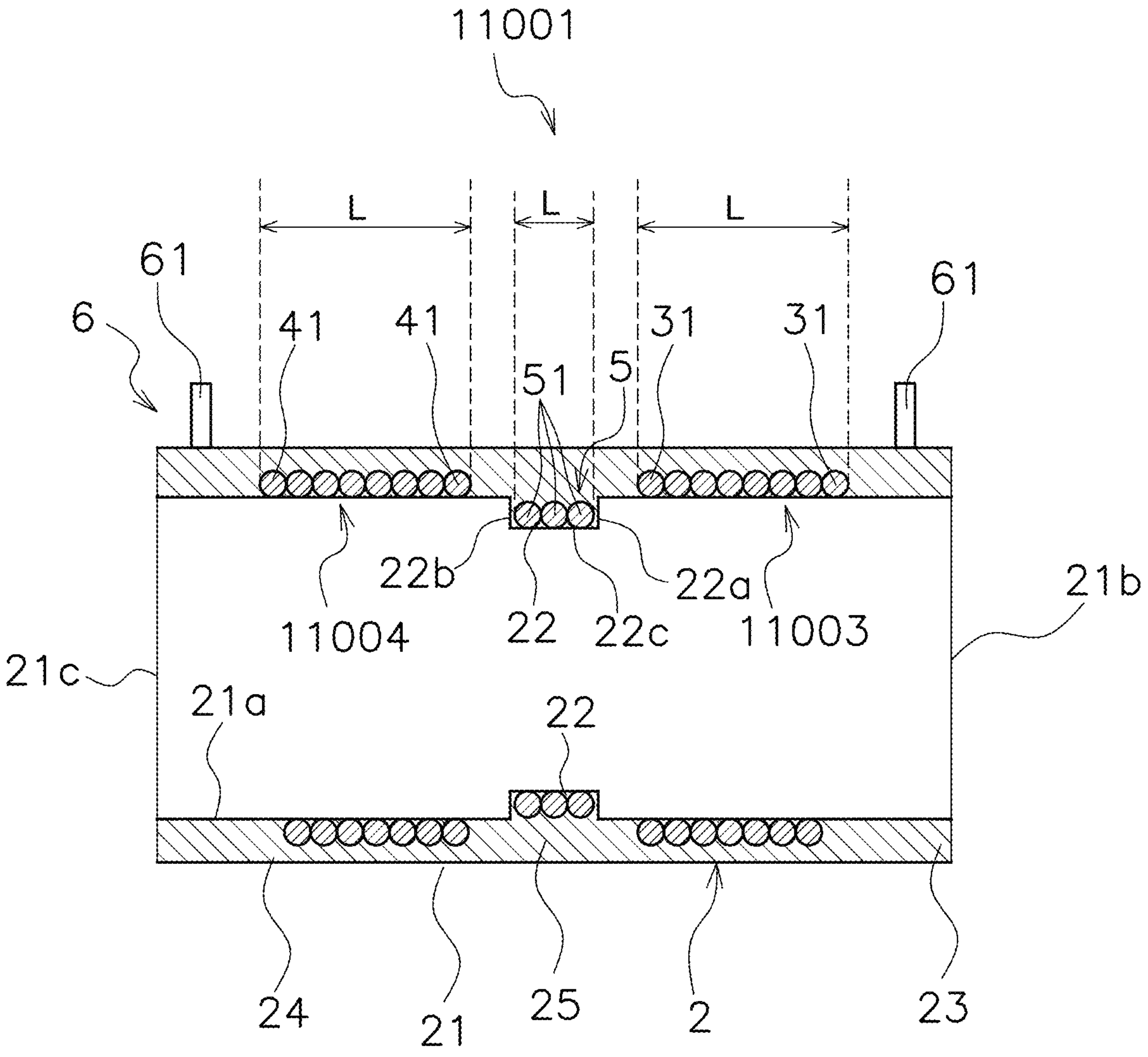
FIG. 12 is a cross-sectional configuration view showing an electrofusion joint in a comparative example.

As shown in FIG. 12, in the electrofusion joint 11001 of Comparative Example 1, the heating wires 31 is wound eight times in the first heat generating section 11003 so that all wound parts of the heating wire 31 come into contact with each other. Further, in the first heat generating section 11004, the heating wire 41 is wound eight times so that all wound parts of the heating wire 41 come into contact with each other. Other configurations are the same as those of the example 1. The outer diameters of the heating wires 31, 41, and 51 are set to 1 mm, the heating wire density is 1 (line/mm) because there are 8 lines of the heating wire for L=8 mm. In this case, the heating wire wound eight times is an example of the heat generating portions of the first heat generating section 11003 and 11004, and the number of turns of the heating wire in the heating portion is larger than the number of turns of the heating wire 51 of the second heat generating section 5.

Using the electrofusion joint 11001 of Comparative Example 1 as described above, wrinkles and clevis are evaluated. The results are shown in Table 1.

In Comparative Example 1, no bead was formed, clevis is observed, an uneven surface such as sink marks and wrinkles of unacceptable size were visually observed, and wrinkles are present.

TABLE 1

| | Example 1 | Example 2 | Example 3 | Comparative Example 1 |
|---|---|---|---|---|
| Heating wire density of the first heat generating section (lines/mm) | 0.35 | 0.53 | 0.6 | 1 |
| Heating wire density of the second heat generating section (lines/mm) | 1 | 1 | 1 | 1 |
| wrinkle evaluation | ○ | ○ | Δ | X |
| Clevis evaluation | ○ | ○ | Δ | X |

As shown in Examples 1 to 3 and Comparative Example 1, it can be seen that the evaluation of the clevis and the wrinkle is good when the heating wire density in the first heat generating section is smaller than the heating wire density in the second heat generating section.

Further, since the evaluations are further improved in Example 2 than in Example 3, it can be seen that it is more preferable that the heating wire density in the first heat generating section is 0.55 times or less the heating wire density in the second heat generating section.

Example 4

The electrofusion joint 1 of the embodiment 1a and the resin pipes 11 and 12 are fused.

As for the jig, the jig of the embodiment 2 described later is used to pressurize at the same time as the start of heating by energization.

Example 5

The electrofusion joint 301 of the embodiment 1d and the resin pipes 11 and 12 are fused.

As for the jig, the jig of the embodiment 2 described later is used to pressurize at the same time as the start of heating by energization.

As shown in (Table 2) below, in the electrofusion joint of Example 4 in which the air holes 371 and 372 are not formed, although it is within the permissible range, there are cases where bead ejection occurs or the bead has a depression. In the electrofusion joint of Example 5, it is possible to suppress the occurrence of bead ejection and the depression of the bead.

TABLE 2

| | Example 4 | Example 5 |
|---|---|---|
| Air hole | No existence | Existence |
| Number of turns of the first heat generating section | 2 × 4 lines (distributed) | 2 × 4 lines (distributed) |
| Number of turns of the second heat generating section | 4 | 4 |
| Execution or non-execution of pressing force during fusion | Execution | Non-execution |
| Timing of pressing force | Simultaneously with the start of fusion | Simultaneously with the start of fusion |
| Evaluation of bead ejection or depression Visual confirmation after dividing | Δ | ○ |

Embodiment 2

Hereinafter, the embodiment 2 according to the present disclosure will be described with reference to the drawings.

<Structure>

(Overview of Piping Structure 1100)

Figure 13:
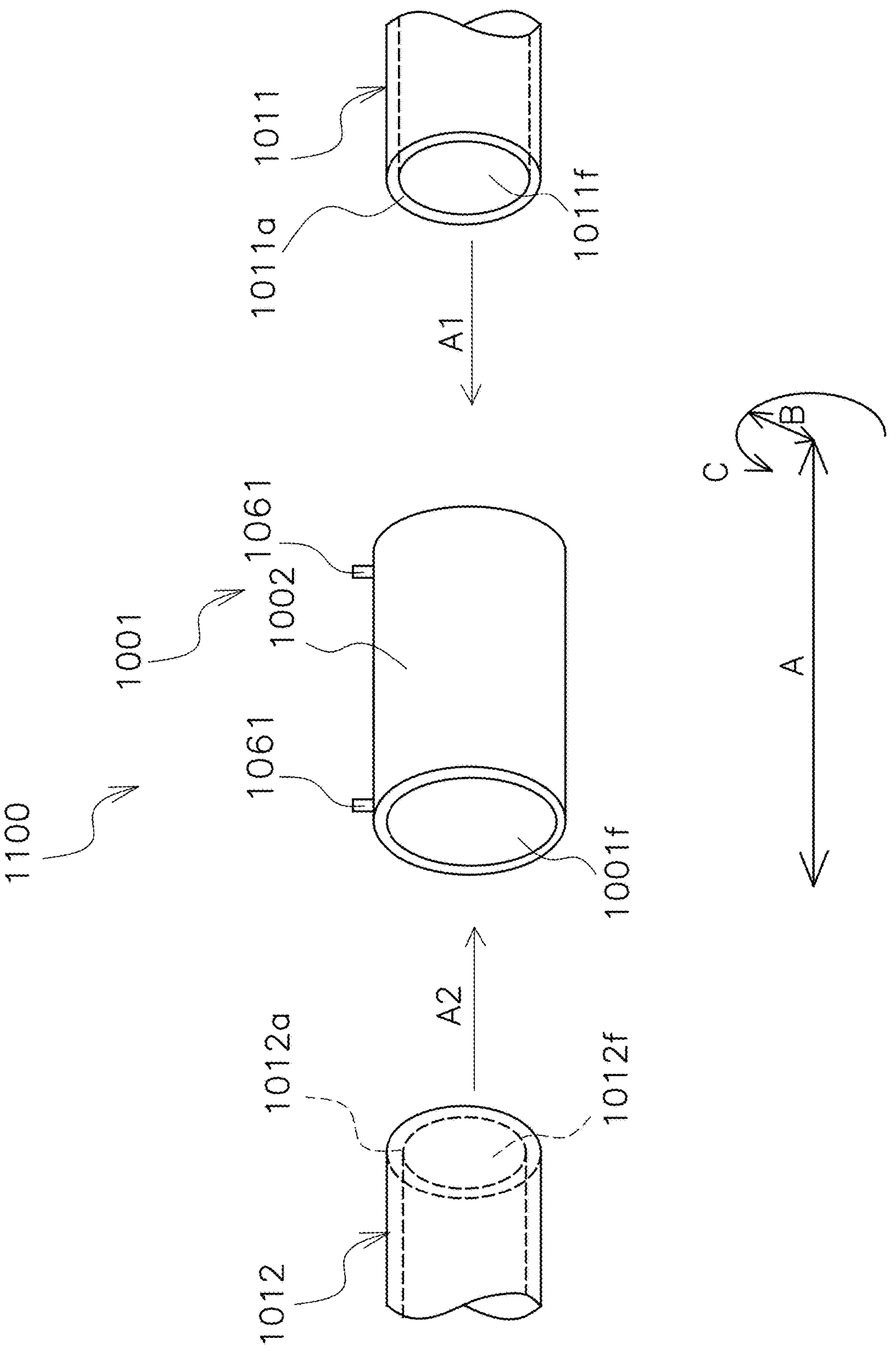
FIG. 13 is an external view showing an electrofusion joint and resin pipes connected to the electrofusion joint according to the embodiment 2 of the present disclosure.

FIG. 13 is a view showing an electrofusion joint 1001 according to an embodiment of the present invention, and a resin pipe 1011 (an example of a pipe containing thermoplastic resin) and a resin pipe 1012 (an example of a pipe containing thermoplastic resin) that are connected by the electrofusion joint 1001. FIG. 13 could also be called an exploded view of a piping structure 1100. The piping structure 1100 includes, for example, the electrofusion joint 1001, the resin pipe 1011, and the resin pipe 1012.

As shown in the figure, the electrofusion joint 1001 is fused to the resin pipe 1011 and the resin pipe 1012, thereby connecting the resin pipe 1011 and the resin pipe 1012.

The resin pipe 1011 and the resin pipe 1012 are each made from a thermoplastic resin. Specifically, the resin pipe 1011 and the resin pipe 1012 are made from a polyolefin such as polyethylene.

Flow paths **1011*f* and 1012*f* including a circular cross section extend through the inside of the resin pipe 1011 and the resin pipe 1012. A flow path 1001*f* including a circular cross section extends through the inside of the electrofusion joint 1001. In a state in which the resin pipe 1011 and the resin pipe 1012 are connected by the electrofusion joint 1001, the axes of the respective flow paths of the resin pipe 1011, the resin pipe 1012, and the electrofusion joint 1001** all fall along the same straight line.

The direction in which each axis extends in the flow paths of the electrofusion joint 1001, the resin pipe 1011, and the resin pipe 1012 is defined as the axial direction A. Also, the direction, which is orthogonal to the axes, of moving toward and away from the axes in the electrofusion joint 1001, the first resin pipe 1011, and the second resin pipe 1012 is defined as the radial direction B, and the direction around each axis is defined as the circumferential direction C.

The resin pipe 1011 is connected to the electrofusion joint 1001 by being moved in the direction of the arrow A1 relative to the electrofusion joint 1001. Also, the resin pipe 1012 is connected to the electrofusion joint 1001 by being moved in the direction of the arrow A2 relative to the electrofusion joint 1001. A state in which the resin pipe 1011 and the resin pipe 1012 have been connected by the electrofusion joint 1001 constitutes the piping structure 1100.

(Electrofusion Joint 1001)

Figure 14:
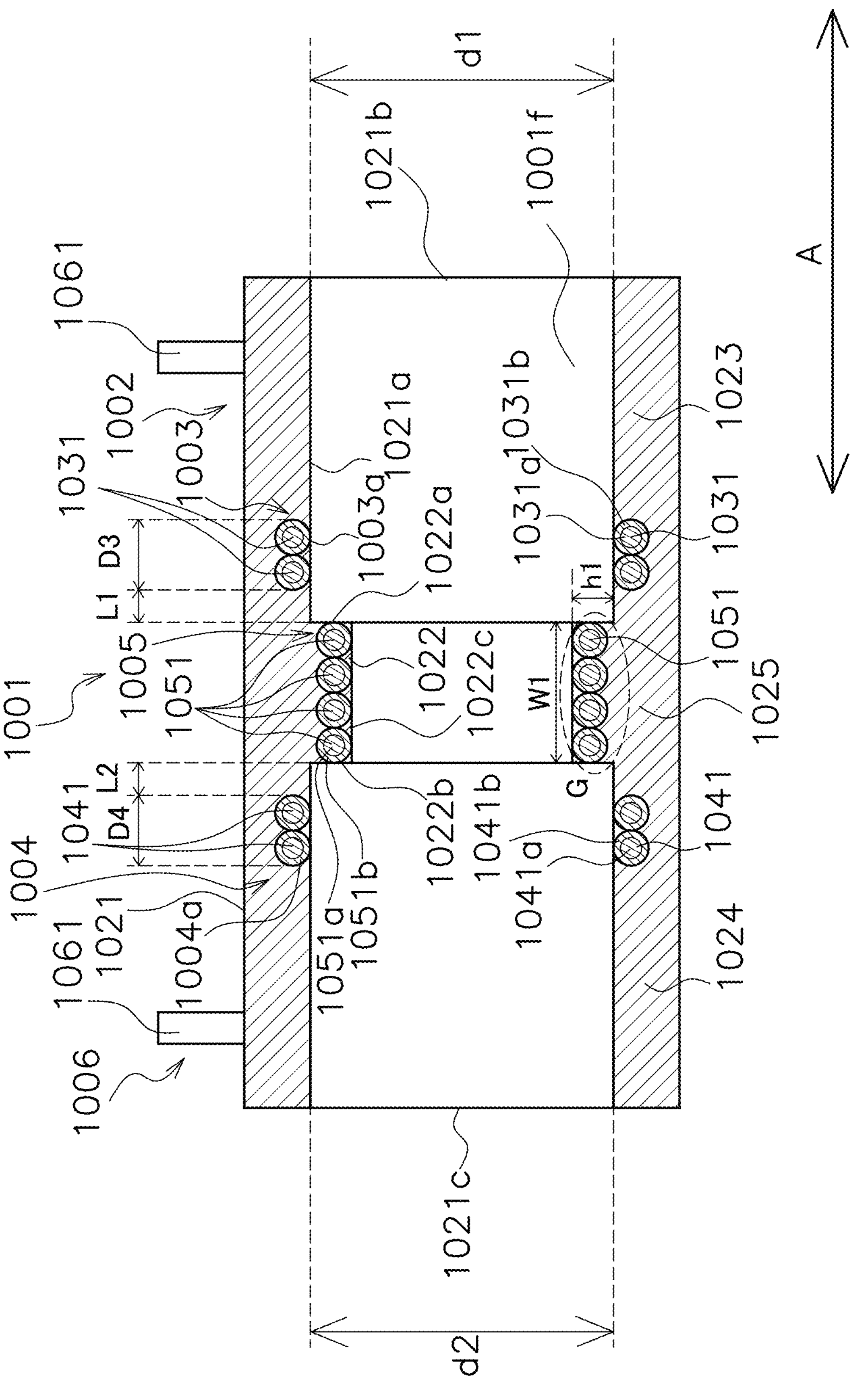
FIG. 14 is a cross-sectional configuration view showing the electrofusion joint of FIG. 13.

FIG. 14 is a view showing a cross-sectional configuration of the electrofusion joint 1001.

As shown in FIGS. 13 and 14, the electrofusion joint 1001 includes a main body 1002, a first heat generating section 1003, a first heat generating section 1004, a second heat generating section 1005, and a connector attachment portion 1006.

(Main body 1002)

The main body 1002 is formed from a thermoplastic resin and includes a tubular portion 1021 and a stopper portion 1022, as shown in FIG. 14. The tubular portion 1021 is tubular and includes a joint receiving portion 1023, a joint receiving portion 1024, and a continuous portion 1025. The resin pipe 1011 is inserted into the joint receiving portion 1023. The resin pipe 1012 is inserted into the joint receiving portion 1024.

There are no particular restrictions on the thermoplastic resin used in the main body 1002, but a resin having a melting point of less than 230° C. is preferable.

Figure 15:
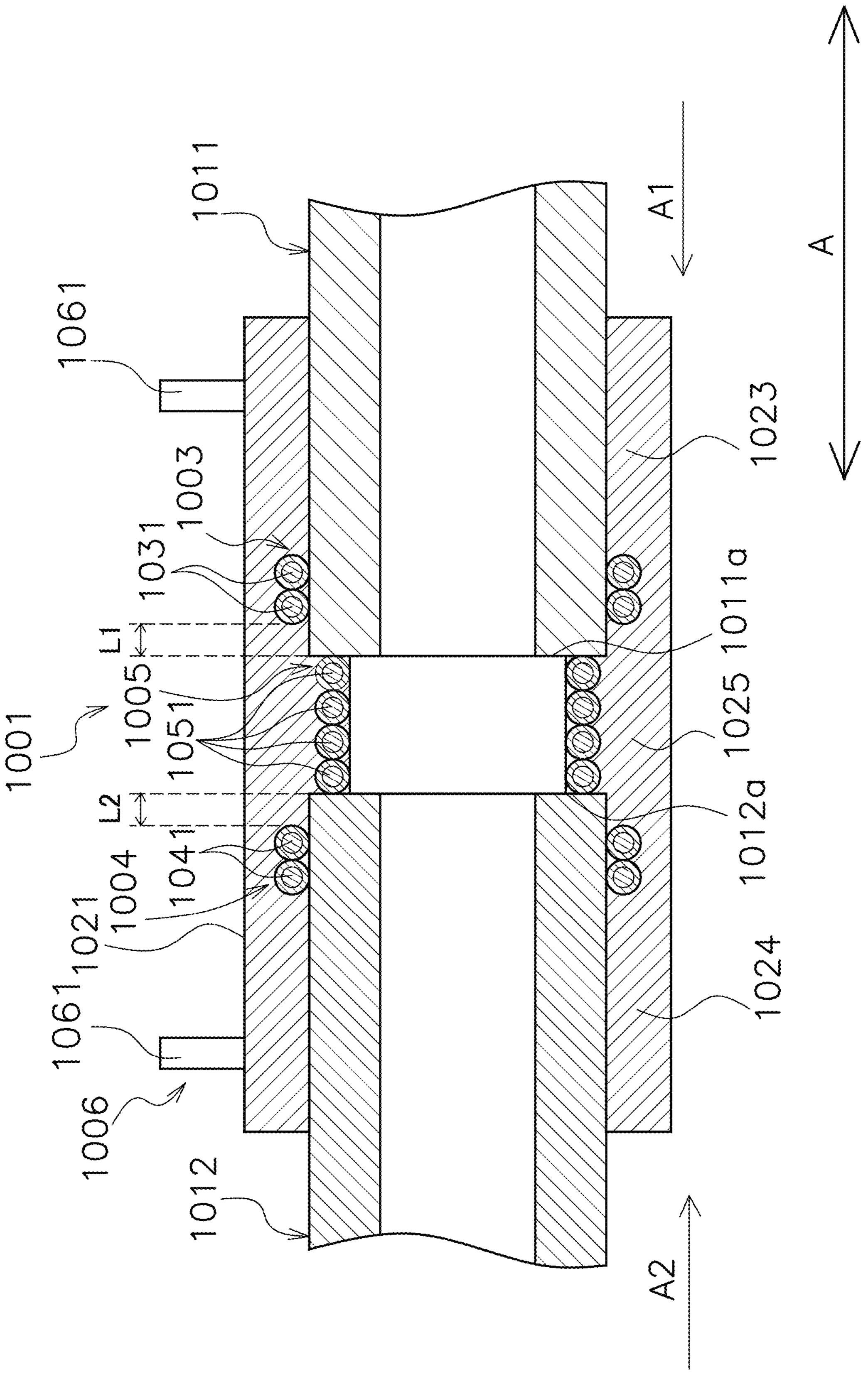
FIG. 15 is a cross-sectional configuration view showing a state in which the resin pipe and the resin pipe are inserted into the electrofusion joint of FIG. 13.

FIG. 15 is a cross-sectional configuration view showing a state in which the resin pipe 1011 has been inserted into the joint receiving portion 1023 of the electrofusion joint 1001 and the resin pipe 1012 has been inserted into the joint receiving portion 1024.

The inside diameter of the joint receiving portion 1023 equal to or larger than the outside diameter of the resin pipe 1011. The inside diameter of the joint receiving portion 1024 is equal to or larger than the outside diameter of the resin pipe 1012. When the outer diameter of the resin pipe 1011 is larger than the inner diameter of the joint receiving portion 1023, the resin pipe 1011 can be inserted into the joint receiving portion 1023 by scraping the outer circumference of the resin pipe 1011 with a scraper or the like. When the outer diameter of the resin pipe 1012 is larger than the inner diameter of the joint receiving portion 1024, the resin pipe 1012 can be inserted into the joint receiving portion 1024 by scraping the outer circumference of the resin pipe 1012 with a scraper or the like.

As shown in FIG. 14, the continuous portion 1025 is continuous with the joint receiving portion 1023 and the joint receiving portion 1024, and connects the joint receiving portion 1023 and the joint receiving portion 1024. The continuous portion 1025 is a portion that spans the joint receiving portion 1023 and the joint receiving portion 1024, and a stopper portion 1022 (discussed below) is provided inside the continuous portion 1025 in the radial direction B.

(Stopper Portion 1022)

The stopper portion 1022 is a portion having the shape of a circular ring. The stopper portion 1022 is formed on the inner surface 1021*a* of the tubular portion 2101, as a rib going all the way around in the circumferential direction C. The stopper portion 1022 also contains a thermoplastic resin, and is preferably formed from the same thermoplastic resin as that used in the tubular portion 1021.

The stopper portion 1022 is formed so as to protrude inward in the radial direction from the inner surface 1021*a* of the tubular portion 1021. Also, the stopper portion 1022 is disposed inside the continuous portion 1025 of the tubular portion 1021 in the radial direction B. The stopper portion 1022 may be formed as a single member with the tubular portion 1021, or may be formed as a separate member apart from the tubular portion 1021.

The stopper portion 1022 includes a first side surface 1022*a*, a second side surface 1022*b*, and a peripheral surface 1022*c*. The peripheral surface 1022*c* is the end surface on the inner side of the stopper portion 1022 in the radial direction.

The first side surface 1022*a* is formed substantially perpendicular to the axial direction A, inward in the radial direction B from the inner surface 1021*a* of the tubular portion 1021.

The second side surface 1022*b* is formed substantially perpendicular to the axial direction A, inward in the radial direction B from the inner surface 1021*a* of the tubular portion 1021.

The peripheral surface 1022*c* connects the end on the inside in the radial direction of the first side surface 1022*a* to the end on the inside in the radial direction of the second side surface 1022*b*. The peripheral surface 1022*c* is formed substantially parallel to the inner surface 1021*a* of the tubular portion 1021.

When the resin pipe 1011 is inserted into the joint receiving portion 1023, as shown in FIG. 15, the pipe end 1011*a* of the resin pipe 1011 comes into contact with the first side surface 1022*a* of the stopper portion 1022, which restricts the insertion position of the pipe end 1011*a*. The concept of the pipe end 1011*a* coming into contact with the first side surface 1022*a* encompasses both when the pipe end 1011*a* comes into direct contact with the first side surface 1022*a*, and when the pipe end 1011*a* comes into contact with the side surface 1022*a* indirectly via the heating wire 1051 (discussed below) of the second heat generating section 1005.

When the resin pipe 1012 is inserted into the joint receiving portion 1024, as shown in FIG. 15, the pipe end 1012*a* of the resin pipe 1012 comes into contact with the second side surface 1022*b* of the stopper portion 1022, and insertion position of the pipe end 1012*a* is restricted. The concept that the pipe end 1012*a* comes into contact with the second side surface 1022*b* encompasses both when the pipe end 1012*a* comes into direct contact with the second side surface 1022*b*, and when the pipe end 1012*a* comes into indirect contact with the side surface 1022*b* via the heating wire 1051 (discussed below) of the second heat generating section 1005.

In this embodiment, the occurrence of clevis is suppressed between the pipe end 1011*a* and the first side surface 1022*a* and between the pipe end 1012*a* and the second side surface 1022*b*.

(First Heat Generating Section 1003, 1004)

The first heat generating sections 1003 and 1004 are provided in the joint receiving portions 1023 and 1024.

As shown in FIG. 14, the first heat generating section 1003 includes a heating wire 1031 embedded in the inner surface 1021*a* on the joint receiving portion 1023 which is one end of the tubular portion 1021.

The heating wire 1031 is disposed so as to be wound twice in the circumferential direction along the inner surface 1021*a*. The heating wire 1031 is disposed in the vicinity of the inner surface 1021*a*. The heating wire 1031 may be embedded in the tubular portion 1021 so that a part thereof is exposed on the flow path 1001*f* side or may be completely embedded.

As shown in FIG. 14, the first heat generating section 1004 includes a heating wire 1041 embedded in the inner surface 1021*a* of the joint receiving portion 1024 which is the other end of the tubular portion 1021.

The heating wire 1041 is disposed so as to be wound twice in the circumferential direction along the inner surface 1021*a*. The heating wire 1041 is disposed in the vicinity of the inner surface 1021*a*. The heating wire 1041 may be embedded in the tubular portion 1021 so that a part thereof is exposed on the flow path 1001*f* side or may be completely embedded.

The heating wires 1031 may include, for example, a conducting wire 1031*a* and an insulating film 1031*b*. The heating wires 1041 may include, for example, a conducting wire 1041*a* and an insulating film 1041*b*. As each of the conducting wires 1031*a* and 1041*a*, for example, a nichrome wire, an iron chromium type 2 wire, an iron chromium type 1 wire, a nickel chromium wire, or the like can be used. As each of the conducting wires 1031*a* and 1041*a*, for example, a nichrome wire, an iron chromium type 2 wire, an iron chromium type 1 wire, a nickel chromium wire, or the like can be used. The wire diameters of the conducting wires 1031*a* and 1041*a* can be set to, for example, φ0.3 to 0.8 mm. If it is less than φ0.3 mm, a conducting wire may expand due to the tension during winding and the resistance value may become unstable. Further, the resistance value of the unit length of the conducting wires 1031*a* and 1041*a* is about 2 to 212/m depending on the wire diameter.

The insulating films 1031*b* and 1041*b* are disposed so as to cover the periphery of the conducting wire. The insulating films 1031*b* and 1041*b* have a melting point of 230° C. or higher. It is preferable that this is set to a temperature at which the insulating film does not melt even at a temperature at which the thermoplastic resin melts (for example, in the case of polyethylene, the heating wire is heated to 220° C.) in the present embodiment. The insulating films 1031*b* and 1041*b* can be formed of, for example, a fluorine-based resin or an imide-based resin, but it is more preferable to form the insulating film with a polyimide-based resin. For example, the thickness of the conducting wires 1031*a* and 1041*a* may be set to 0.1 mm or more and 10 mm or less.

When the portion wound around twice so that the wound part of the heating wire 1031 comes into contact with each other is referred to as a heat generating portion 1003*a* (see FIG. 14), it can be said that the first heat generating section 1003 in the present embodiment includes a heat generating portions 1003*a*. When the portion wound around twice so that the wound part of the heating wire 1041 comes into contact with each other is referred to as a heat generating portion 1004*a* (see FIG. 14), it can be said that the first heat generating section 1004 in the present embodiment includes a heat generating portions 1004*a*. The first heat generating sections 1003 and 1004 are disposed in the vicinity of the stopper portion 1022. The arrangement of the first heat generating sections 1003 and 1004 will be described in detail later.

(Second Heat Generating Part 1005)

The second heat generating section 1005 is provided in the stopper portion 1022. The second heat generating section 1005 includes a heating wire 1051. The heating wire 1051 is provided in the stopper portion 1022 so as to be wound in the circumferential direction C along the axial direction A. In the present embodiment, the heating wire 1051 is wound around, for example, four times in the stopper portion 1022. In the second heat generating section 5 of the present embodiment, the adjacent wound parts of the heating wire 1051 are all in contact with each other.

The heating wire 1051 is embedded in the stopper portion 1022, but the heating wire 1051 may be embedded in the stopper portion 1022 so that a part of the heating wire 1051 is exposed from the first side surface 1022*a*, the second side surface 1022*b* or the peripheral surface 1022*c* to the flow path 1001*f* side.

The heating wire 1051 may have a conducting wire 1051*a* and an insulating film 1051*b*, for example, as shown in FIG. 14. As the conducting wire 1051*a*, for example, a nichrome wire, an iron chromium type 2 wire, an iron chromium type 1 wire, a nickel chromium wire, or the like can be used. The wire diameters of the conducting wires 1051*a* can be set to, for example, φ0.3 to 0.8 mm. If it is less than φ0.3 mm, a wire may expand due to the tension during winding and the resistance value may become unstable. The wire diameter of the conducting wire 1051*a* is set to a maximum of 0.8 mm due to the equipment for forming the insulating film 1051*b*. The resistance value of the unit length of the conducting wire 1051*a* is about 2 to 21 Ω/m depending on the wire diameter.

The insulating films 1051*b* is disposed so as to cover the periphery of the conducting wire 1051*a*. The insulating film 1051*b* has a melting point of 230° C. or higher. It is preferable that this is set to a temperature at which the insulating film does not melt even at a temperature at which the thermoplastic resin melts (for example, in the case of polyethylene, the heating wire is heated to 220° C.) in the present embodiment. The insulating film 1051*b* can be formed of, for example, a fluorine-based resin or an imide-based resin, but it is more preferable to form the insulating film with a polyimide-based resin. For example, the thickness of the conducting wires 1051*a* may be set to 0.1 mm or more and 10 mm or less.

Figure 16:
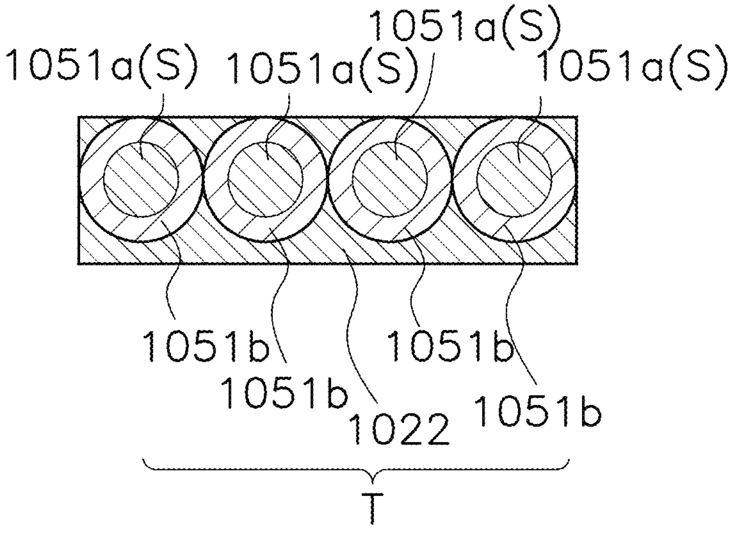
FIG. 16 is a view for explaining a volume ratio of a conducting wire and a resin in a stopper portion.

Further, the volume ratio of the conducting wire 1051*a* and the resin in the stopper portion 1022 is set to be 0.04 to 0.07. As shown in FIG. 16, when the cross-sectional area of one conducting wire 1051*a* is defined as S and the cross-sectional area of the stopper portion 1022 and the insulating film 1051*b* combined is defined as T, the volume of the conducting wire 1051*a*/(the volume of the stopper portion 1022 and the insulating film 1051*b*)≈4xS/T can be set. This 4S/T is set to be 0.04 to 0.07. FIG. 16 is an enlarged view of the G portion of FIG. 14.

In the present embodiment, the heating wire 1051 is wound around four times so that the adjacent wound parts of the heating wire 1051 are in contact with each other, but the present invention is not limited to this, and the heating wire 1051 is wound three times or less or five times or more. Further, the second heat generating section 1005 may be formed by winding not only one heating wire but also two or more heating wires 1051. The heating wire 1051 may be wound so that all or part of the wound parts does not come into contact with the neighbor.

(Connector Attachment Portion 1006)

The connector attachment portion 1006 includes two pins 1061 as shown in FIG. 14. The two pins 1061 are provided so as to project outward in the radial direction from the outer surface 1021*d* of the tubular portion 1021. As shown in FIG. 14, one of the two pins 1061 is disposed in the vicinity of the end 1021*b* of the tubular portion 1021, and the other pin 1061 is disposed in the vicinity of the end 1021*c*. Although not depicted in the figures, the two pins 1061 are connected to the heating wires 1031 and 1041 of the first heat generating section 1003 and 1004 and the heating wires 1051 of the second heat generating section 1005. When the connector of the electrofusion device is attached to the pins 1061 and power is switched on, the heating wires 1031, 1041, and 1051 generate heat. In the present embodiment, the heating wires 1031, 1041 and 1051 are connected to form a single heating wire.

(Position of First Heat Generating Part 1003, 1004)

The arrangement of the heating wires 1031 and 1041 in the first heat generating sections 1003 and 1004 will be described. The first heat generating section 1004 is provided symmetrically with the first heat generating section 1003 with reference to the stopper portion 1022.

The first heat generating section 1003 is configured by winding the heating wire 1031 twice along the axial direction A so that the wound part of the heating wire 1031 comes into contact with each other in the joint receiving portion 1023. Here, as shown in FIG. 14, the distance along the axial direction A from the first side surface 1022*a* of the stopper portion 1022 to the heating wire 1031 closest to the stopper portion 1022 is defined as L1. The inner diameter of the joint receiving portion 1023 is defined as d1.

When the outer diameter (OD: Outer Diameter) of the resin pipe 1011 is 25 mm or less, d1/L1 is set to 2.5 or less, and when the outer diameter (OD) of the resin pipe 1011 is 32 mm or more and 50 mm or less, d1/L1 is set to 3.5 or less, and when the outer diameter (OD) of the resin pipe 1011 is 63 mm or more and 90 mm or less, d1/L1 is set to 4.0 or less, and when the outer diameter (OD) of the resin pipe 1011 is 110 mm or more and 160 mm or less, d1/L1 is set to 5.5 or less, and when the outer diameter (OD) of the resin pipe 1011 is 225 mm or more, d1/L1 is set to 6.5 or less.

The first heat generating section 1004 is configured by winding the heating wire 1041 twice along the axial direction A so that the wound part of the heating wire 1041 comes into contact with each other in the joint receiving portion 1024. Here, the distance along the axial direction A from the second side surface 1022*b* of the stopper portion 1022 to the heating wire 1041 closest to the stopper portion 1022 is defined as L2. The inner diameter of the joint receiving portion 1024 is defined as d2. When the outer diameter (OD: Outer Diameter) of the resin pipe 1012 is 25 mm or less, d2/L2 is set to 2.5 or less, and when the outer diameter (OD) of the resin pipe 1012 is 32 mm or more and 50 mm or less, d2/L2 is set to 3.5 or less, and when the outer diameter (OD) of the resin pipe 1012 is 63 mm or more and 90 mm or less, d2/L2 is set to 4.0 or less, and when the outer diameter (OD) of the resin pipe 1012 is 110 mm or more and 160 mm or less, d2/L2 is set to 5.5 or less, and when the outer diameter (OD) of the resin pipe 1012 is 225 mm or more, d2/L2 is set to 6.5 or less.

The case where the outer diameter (OD) of the resin pipes 1011 and 1012 is 25 mm or less can be said to be the case where the joint receiving portions 1023 and 1024 are for pipes with OD25. The case where the outer diameter (OD) of the resin pipes 1011 and 1012 is 32 mm or more and 50 mm or less can be said to be the case where the joint receiving portions 1023 and 1024 are for pipes with OD32 or more and OD50 or less. The case where the outer diameter (OD) of the resin pipes 1011 and 1012 is 63 mm or more and 90 mm or less can be said to be the case where the joint receiving portions 1023 and 1024 are for pipes with OD63 or more and OD90 or less. The case where the outer diameter (OD) of the resin pipes 1011 and 1012 is 110 mm or more and 160 mm or less can be said to be the case where the joint receiving portions 1023 and 1024 are for pipes with OD63 or more and OD90 or less. The case where the outer diameter (OD) of the resin pipes 1011 and 1012 is 225 mm or more can be said to be the case where the joint receiving portions 1023 and 1024 are for pipes with OD110 or more and OD160 or less.

Further, for example, a pipe having an OD25 mm indicates a pipe having a nominal diameter of 20 A, a pipe having an OD32 mm indicates a pipe having a nominal diameter of 25 A, a pipe having an OD50 mm indicates a pipe having a nominal diameter of 40 Å, and a pipe having an OD63 mm indicates a pipe having a nominal diameter of 50 A, the OD75 mm pipe indicates a pipe having a nominal diameter of 65 A, the OD90 mm pipe indicates a pipe having a nominal diameter of 75A, the OD110 mm pipe indicates a pipe having a nominal diameter of 100A, and the OD140 mm pipe indicates a pipe having a nominal diameter of 125 A, a pipe having an OD 160 mm indicates a pipe having a nominal diameter of 150A, and a pipe having an OD225 mm indicates a pipe having a nominal diameter of 200 A.

Figure 17:
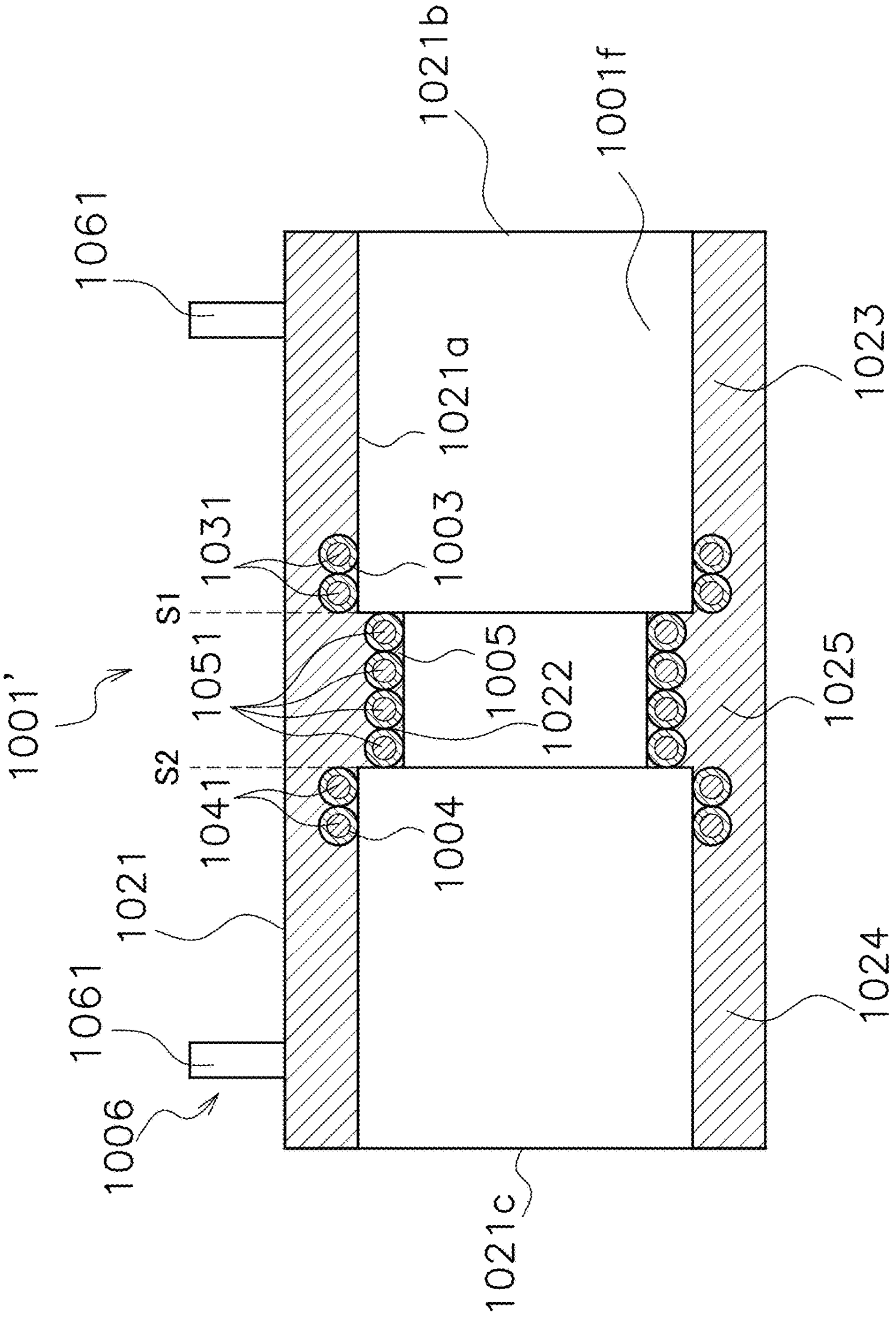
FIG. 17 is a cross-sectional configuration view showing an electrofusion joint according to another embodiment of the present disclosure.

It is more preferable that both L1 and L2 are zero. FIG. 17 is a cross-sectional view showing an electrofusion joint 1001 'having a configuration in which L1 and L2 are zero. As shown in FIG. 17, L1 being zero means a state in which a part of the heating wire 1031 closest to the stopper portion 1022 of the first heat generating section 1003 is in contact with the surface S1 on which the first side surface 1022*a* extended in the radial direction B. Further, as shown in FIG. 17, L2 being zero means a state in which a part of the heating wire 1041 closest to the stopper portion 1022 of the first heat generating section 1004 is in contact with the surface S2 on which the second side surface 1022*b* extended in the radial direction B.

<Jig 1200>

Figure 18:
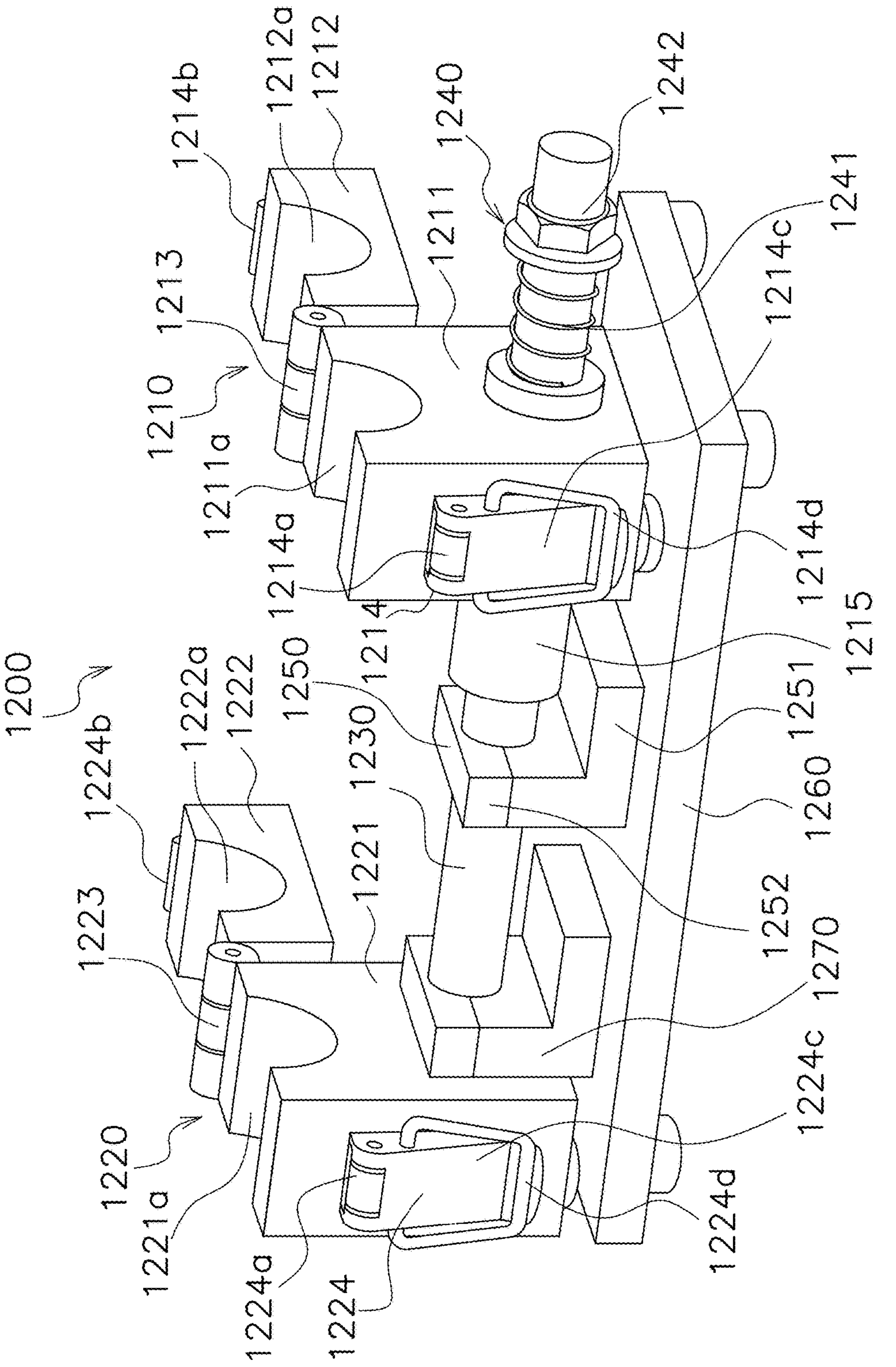
FIG. 18 is a perspective view showing a jig used in a connection method of the embodiment 2 according to the present disclosure.
Figure 19:
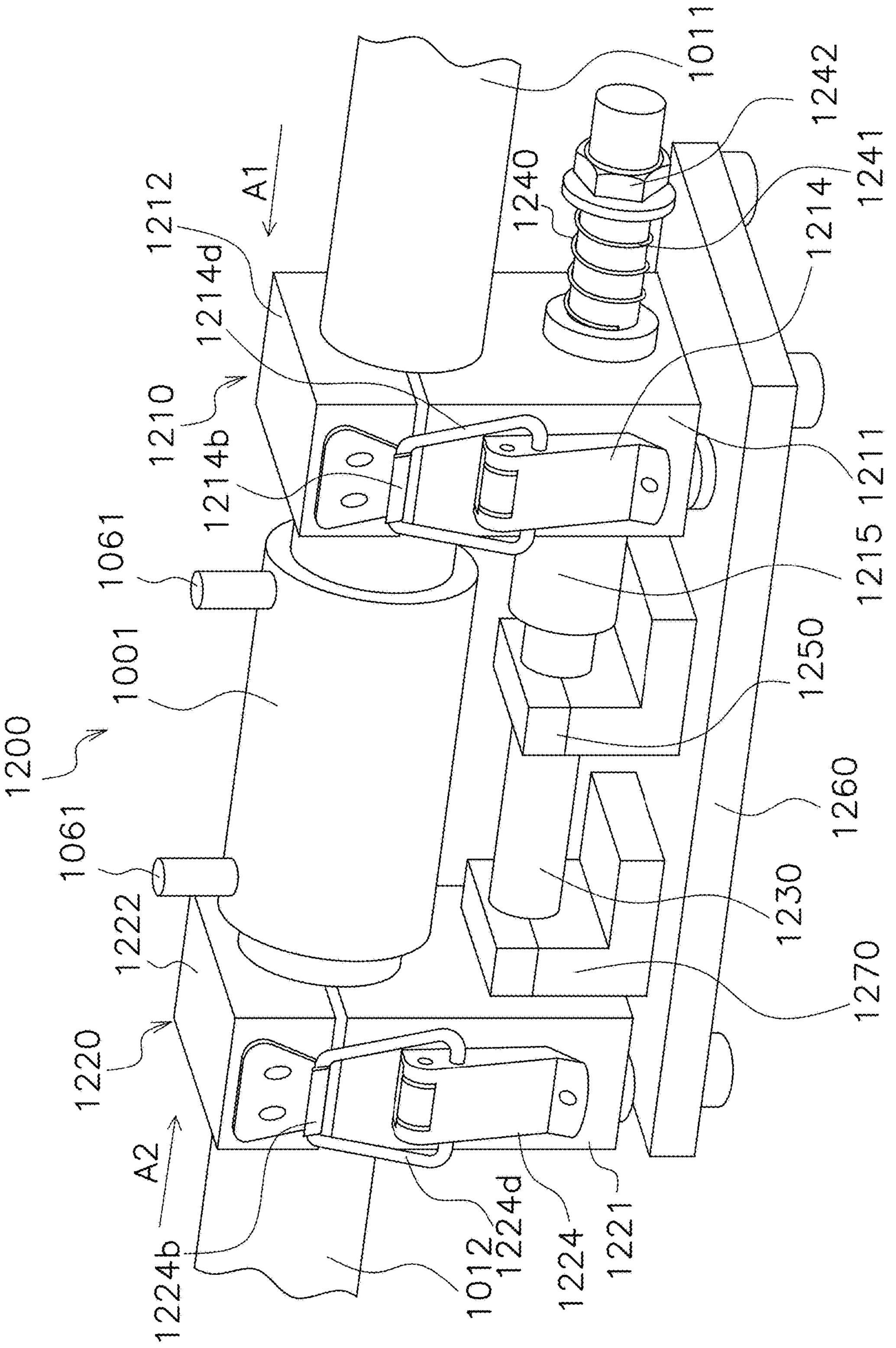
FIG. 19 is a view showing a state in which a resin pipe, an electrofusion joint, and a resin pipe are attached to the jig of FIG. 18.
Figure 20:
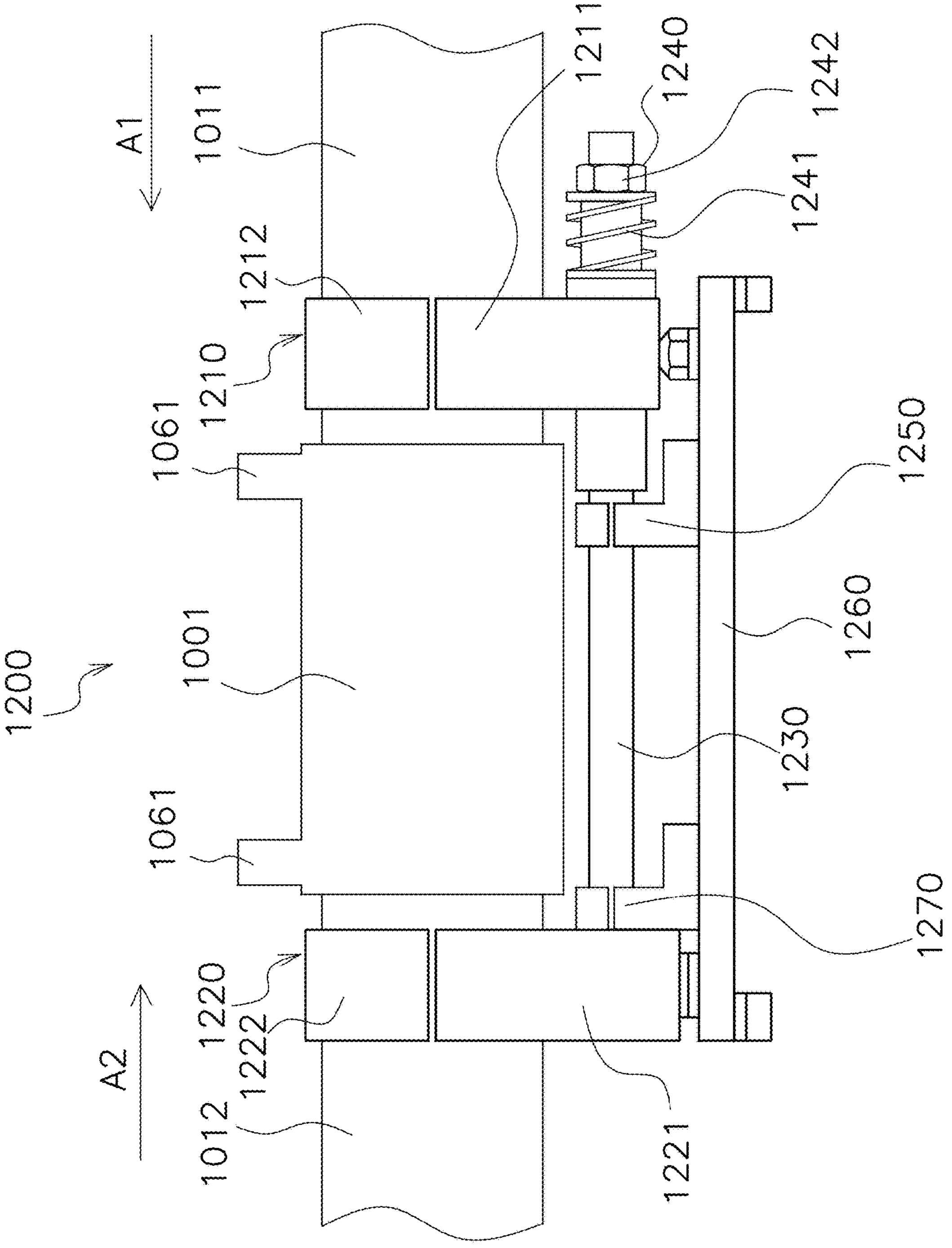
FIG. 20 is a side view of FIG. 19.

Next, the jig 1200 used in the connection method of the embodiment according to the present disclosure will be described. A resin pipe 1011, an electrofusion joint 1001 and a resin pipe 1012 are arranged on the jig 1200. FIG. 18 is a view showing a jig 1200. FIG. 19 is a view showing a state in which the resin pipe 1011, the electrofusion joint 1001, and the resin pipe 1012 are attached to the jig 1200. FIG. 20 is a side view of FIG. 19.

The jig 1200 includes a first clamp portion 1210, a second clamp portion 1220, a shaft portion 1230, a pressing portion 1240, a restricting portion 1250, and a pedestal 1260.

(Pedestal 1260)

The pedestal 1260 is a plate-shaped member. The pedestal 1260 supports the first clamp portion 1210, the second clamp portion 1220, the shaft portion 1230, the pressing portion 1240, and the restricting portion 1250 arranged on the upper surface side thereof.

(First Clamp Portion 1210)

The first clamp portion 1210 sandwiches and fixes the resin pipe 1011. The first clamp portion 1210 includes a lower clamp portion 1211, an upper clamp portion 1212, a hinge portion 1213, a fastening portion 1214, and a bearing portion 1215. The lower clamp portion 1211 is a member having a semicircular concave portion 1211*a* formed on the upper surface thereof. In the present embodiment, the lower clamp portion 1211 is a member having a substantially rectangular parallelepiped shape in which a semicircular concave portion is formed on the upper surface.

The bearing portion 1215 is provided on the lower clamp portion 1211. The bearing portion 1215 is inserted into a through hole formed in the lower clamp portion 1211. The bearing portion 1215 is arranged below the concave portion 1211*a*. A shaft portion 1230, which will be described later, is inserted inside the bearing portion 1215. The axial direction of the bearing portion 1215 is arranged parallel to the central axis of the concave portion 1211*a*. As a result, the first clamp portion 1210 can move along the shaft portion 1230. When the resin pipe 1011 and the resin pipe 1012 and the electrofusion joint 1001 are arranged on the jig, the axial direction of the bearing portion 1215 is parallel to the axial direction A.

The upper clamp portion 1212 is a member in which a semicircular concave portion 1212*a* is formed. In the present embodiment, the upper clamp portion 1212 is a member having a substantially rectangular parallelepiped shape in which a semicircular concave portion 1212*a* is formed on a predetermined one surface. The upper clamp portion 1212 and the lower clamp portion 1211 can sandwich the outer periphery of the resin pipe 1011 between the concave portion 1212*a* and the concave portion 1211*a* formed therein. The central axes of the concave portion 1212*a* and the concave portion 1211*a* substantially coincide with each other in the state where the resin pipe 1011 is sandwiched. Further, in a state where the resin pipe 1011 is sandwiched, that central axis coincides with the above-mentioned axial direction A.

The hinge portion 1213 rotatably connects the ends of the lower clamp portion 1211 and the upper clamp portion 1212 to each other. The upper clamp portion 1212 is configured to be rotatable with respect to the lower clamp portion 1211 about the hinge portion 1213. The upper clamp portion 1212 is attached to the lower clamp portion 1211 via the hinge portion 1213 so that the concave portion 1212*a* faces the concave portion 1211*a* of the lower clamp portion 1211 when the upper clamp portion 1212 is rotated around the hinge portion 1213.

The resin pipe 1011 is arranged along the concave portion 1211*a* of the lower clamp portion 1211 in a state where the lower clamp portion 1211 and the upper clamp portion 1212 open around the hinge portion 1213. After that, the upper clamp portion 1212 is rotated about the hinge portion 1213, and the resin pipe 1011 is arranged so as to fit into the concave portion 1212*a*.

The fastening portion 1214 is a so-called snap lock. The fastening portion 1214 includes a lock body 1214*a* and a protrusion 1214*b*. The fastening portion 1214 is provided on the side opposite to the hinge portion 1213 with the concave portions 1211*a* and 1212*a* of the lower clamp portion 1211 and the upper clamp portion 1212 interposed therebetween. The lock body 1214*a* is arranged on the side surface of the lower clamp portion 1211. The protrusion 1214*b* is arranged on the side surface of the upper clamp portion 1212. The lock body 1214*a* includes a lever 1214*c* and an annular portion 1214*d*. In a state where the upper clamp portion 1212 is rotated upward of the lower clamp portion 1211, the annular portion 1214*d* is hooked on the protrusion 1214*b* and the lever 1214*c* is tilted downward, whereby the upper clamp portion 1212 can be fastened with respect to the lower clamp portion 1211 in the closed state.

(Second Clamp Part 1220)

The second clamp portion 1220 sandwiches and fixes the resin pipe 1012. The second clamp portion 1220 fixes the resin pipe 1012 so that the central axis of the resin pipe 1012 coincides with the central axis of the resin pipe 1011.

The second clamp portion 1220 includes a lower clamp portion 1221, an upper clamp portion 1222, a hinge portion 1223, and a fastening portion 1224. The lower clamp portion 1221 is a member having a semicircular concave portion 1221*a* formed on the upper surface thereof. In the present embodiment, the lower clamp portion 1221 is a member having a substantially rectangular parallelepiped shape in which a semicircular concave portion is formed on the upper surface. The lower clamp portion 1211 is fixed to the pedestal 1260 via the bracket 1270.

The upper clamp portion 1222 is a member in which a semicircular concave portion 1222*a* is formed. In the present embodiment, the upper clamp portion 1222 is a member having a substantially rectangular parallelepiped shape in which a semicircular concave portion 1222*a* is formed on a predetermined one surface.

The upper clamp portion 1222 and the lower clamp portion 1221 can sandwich the outer periphery of the resin pipe 1012 between the concave portion 1222*a* and the concave portion 1221*a* formed therein. The central axes of the concave portion 1222*a* and the concave portion 1221*a* substantially coincide with each other when the resin pipe 1012 is sandwiched. Further, in a state where the resin pipe 1012 is sandwiched, that central axis coincides with the above-mentioned axial direction A.

The hinge portion 1223 rotatably connects the ends of the lower clamp portion 1221 and the upper clamp portion 1222 to each other. The upper clamp portion 1222 is configured to be rotatable with respect to the lower clamp portion 1221 about the hinge portion 1223. The upper clamp portion 1222 is attached to the lower clamp portion 1221 via the hinge portion 1223 so that the concave portion 1222*a* faces the concave portion 1221*a* of the lower clamp portion 1221 when the upper clamp portion 1222 is rotated about the hinge portion 1223.

The resin pipe 1012 is arranged along the concave portion 1221*a* of the lower clamp portion 1221 in a state where the lower clamp portion 1221 and the upper clamp portion 1222 open around the hinge portion 1223. After that, the upper clamp portion 1222 is rotated about the hinge portion 1223, and the resin pipe 1012 is arranged so as to fit into the concave portion 1222*a*.

The fastening portion 1224 is a so-called snap lock. The fastening portion 1224 includes a lock body 1224*a* and a protrusion 1224*b*. The fastening portion 1224 is provided on the side opposite to the hinge portion 1223 with the concave portions 1221*a* and 1222*a* of the lower clamp portion 1221 and the upper clamp portion 1222 interposed therebetween. The lock body 1224*a* is arranged on the side surface of the lower clamp portion 1221. The protrusion 1224*b* is arranged on the side surface of the upper clamp portion 1222. The lock body 1224*a* includes a lever 1224*c* and an annular portion 1224*d*. In a state where the upper clamp portion 1222 is rotated upward of the lower clamp portion 1221, the annular portion 1224*d* is hooked on the protrusion 1224*b* and the lever 1224*c* is tilted downward, whereby the upper clamp portion 1222 can be fastened with respect to the lower clamp portion 1221 in the closed state.

With the resin pipe 1011 and the resin pipe 1012 inserted in the electrofusion joint 1001, the resin pipe 1011 is sandwiched with the first clamp portion 1210 and the resin pipe 1012 is sandwiched with the second clamp portion 1220, whereby the resin pipe 1011 and the resin pipe 1012 and the electrofusion joint 1001 can be arranged on the jig 1200.

(Shaft 1230)

The shaft portion 1230 is supported by the pedestal 1260. The shaft portion 1230 is arranged in parallel with the central axis of the concave portion 1211*a* and the concave portion 1212*a* of the first clamp portion 1210. The shaft portion 1230 is arranged parallel to the central axis of the concave portion 1221*a* and the concave portion 1222*a* of the second clamp portion 1220. Further, the shaft portion 1230 is arranged in parallel with the central axis of the resin pipe 1011 fixed to the first clamp portion 1210 and the resin pipe 1012 fixed to the second clamp portion 1220. The shaft portion 1230 is arranged along the above-mentioned axial direction A.

The shaft portion 1230 extends from the second clamp portion 1220 toward the first clamp portion 1210. The first clamp portion 1210 is attached to the shaft portion 1230 so as to be movable along the shaft portion 1230. The shaft portion 1230 is arranged from the lower clamp portion 1221 to the lower clamp portion 1211. The bearing portion 1215 is arranged in a portion below the concave portion 1211*a* of the lower clamp portion 1211 of the first clamp portion 1210, and the shaft portion 1230 is inserted through the bearing portion 1215.

(Pressing Portion 1240)

The pressing portion 1240 presses the first clamp portion 1210 toward the second clamp portion 1220 along the shaft portion 1230. The pressing portion 1240 includes a spring 1241 and a nut 1242.

The spring 1241 is disposed around the shaft portion 1230 on the side of the first clamp portion 1210 opposite to the second clamp portion 1220.

The nut 1242 is disposed on the shaft portion 1230 on the side opposite to the first clamp portion 1210 of the spring 1241. A male screw shape is formed around the end of the shaft portion 1230 opposite to the second clamp portion 1220, and is screwed with the female screw shape formed inside the nut 1242. The nut 1242 can be moved along the shaft portion 1230 by rotating it.

The spring 1241 is disposed between the nut 1242 and the first clamp portion 1210. Since the nut 1242 is screwed with the shaft portion 1230 and the position on the shaft portion 1230 is fixed, a load is applied to the first clamp portion 1210 toward the second clamp portion 1220. The load can be set, for example, in the range of 1 to 50 kgf, and more preferably in the range of 3 to 20 kgf. Further, when the nut 1242 is rotated and brought close to the first clamp portion 1210 in a state in which the resin pipes 1011 and 1012 and the electrofusion joint 1001 are arranged on the jig 1200, the spring 1241 is compressed, so that the load applied to the first clamp portion 1210 can be increased. On the other hand, when the nut 1242 is rotated and moved away from the first clamp portion 1210, the spring 1241 expands, so that the load applied to the first clamp portion 1210 can be reduced.

As shown in FIG. 20, a load is applied to the first clamp portion 1210 by the pressing portion 1240 in a state where the resin pipe 1011, the resin pipe 1012, and the electrofusion joint 1001 are arranged on the jig 1200. As a result, a load is applied to the pipe end 1011*a* of the resin pipe 1011 and the pipe end 1012*a* of the resin pipe 1012 so as to be pressed against the stopper portion 1022.

(Restricting Portion 1250)

The restricting portion 1250 restricts that the first clamp portion 1210 moves too much toward the second clamp portion 1220 by the pressing portion 1240.

The restricting portion 1250 is arranged between the first clamp portion 1210 and the second clamp portion 1220.

The restricting portion 1250 includes a fixing portion 1251 and a contact portion 1252. The fixing portion 1251 is fixed to the pedestal 1260. The contact portion 1252 is a portion extending upward from the fixing portion 1251 and is arranged around the shaft portion 1230. By the bearing portion 1215 of the first clamp portion 1210 abutting on the contact portion 1252, it is possible to restrict the movement of the first clamp portion 1210 to the second clamp portion 1220 side.

<Connection Method>

Figure 21:
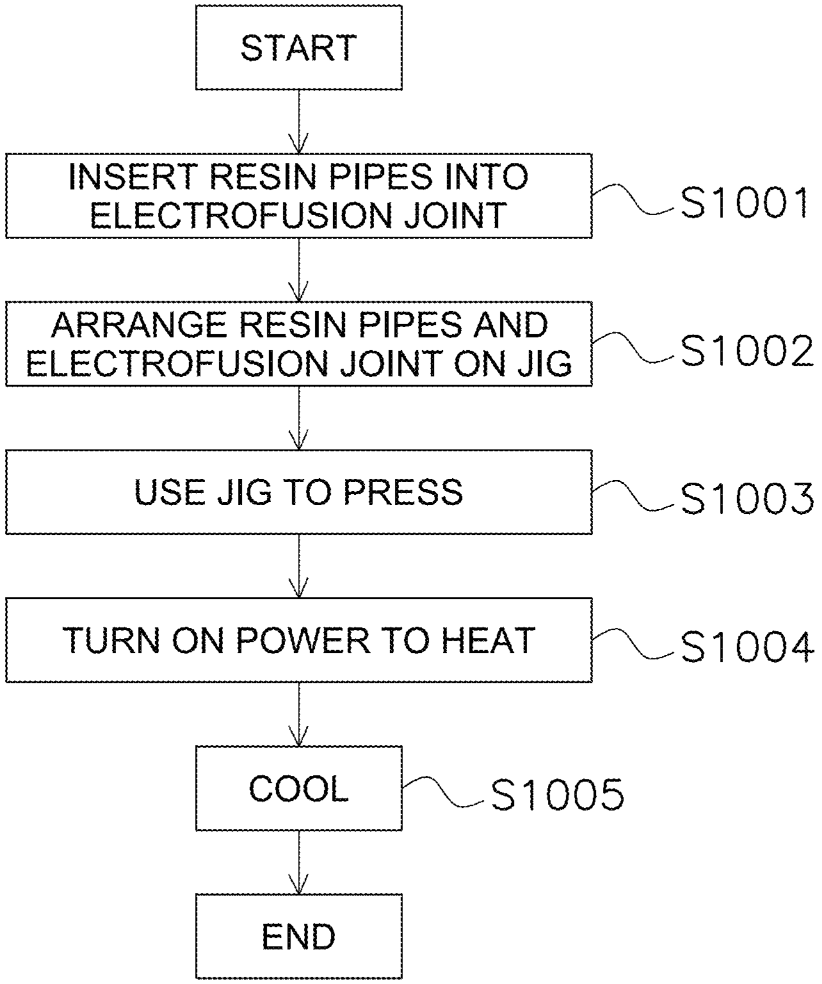
FIG. 21 is a flow chart showing a connection method of the embodiment 2 according to the present disclosure.

Next, a connection method using the above-mentioned jig 1200 will be described. FIG. 21 is a flow chart showing the connection method of the present embodiment.

First, in step S1001, the resin pipe 1011 and the resin pipe 1012 are inserted into the electrofusion joint 1001. As shown in FIG. 15, the resin pipe 1011 is inserted inside the joint receiving portion 1023 of the electrofusion joint 1001 until the stopper portion 1022 restricts the relative movement of the pipe end 1011*a* of the resin pipe 1011. Next, the resin pipe 1012 is inserted inside the joint receiving portion 1024 of the electrofusion joint 1001 until the stopper portion 1022 restricts the relative movement of the pipe end 1012*a* of the resin pipe 1012. FIG. 15 shows a state in which the resin pipe 1011 and the resin pipe 1012 are inserted into the electrofusion joint 1001. It is more preferable to scrape the edge surface (the surface facing the stopper portion 1022) of the resin pipes 1011 and 1012 before step S1001 and insert the resin pipes 1011 and 1012 into the electrofusion joint 1001 because the strength of fusion is improved.

In this state, in step S1002 (an example of the arrangement step), as shown in FIG. 20, the resin pipe 1011 is sandwiched and fixed by the first clamp portion 1210, and the resin pipe 1012 is sandwiched and fixed by the second clamp portion 1220, and the resin pipe 1011, the electrofusion joint 1001 and the resin pipe 1012 are arranged on the jig 1200.

By fixing the resin pipe 1011, the electrofusion joint 1001 and the resin pipe 1012 to the jig 1200, in step S1003 (an example of the pressurizing step), a load is applied to the first clamp portion 1210 toward the second clamp portion 1220 by the urging force of the pressing portion 1240. By applying a load to the first clamp portion 1210 toward the second clamp portion 1220, the pipe end 1011*a* of the resin pipe 1011 is pressed against the first side surface 1022*a* of the stopper portion 1022, and the pipe end 1012*a* of the resin pipe 1012 is pressed against the second side surface 1022*b* of the stopper portion 1022.

Next, in step S1004 (an example of a heating step), the connector of the electrofusion device is attached to the two pins 1061 of the connector attachment portion 1006 in a pressurized state, and energization is performed for a predetermined time.

This energization causes the heating wire 1051 to generate heat, and the stopper portion 1022, the pipe end 1011*a* of the resin pipe 1011 and the pipe end 1012*a* of the resin pipe 1012 are molten, and the pipe end 1011*a* of the resin pipe 1011 and the pipe end 1012*a* of the resin pipe 1012 come into close contact with the stopper portion 1022.

Since the stopper portion 1022 is molten by energization and the width in the axial direction A becomes smaller and the applied load becomes smaller, the load applied to the first clamp portion 1210 by the spring 1241 can be secured by moving the nut 1242 toward the second clamp portion 1220 side. It is desirable that the load does not change even when the pipe ends 1011*a* and 1012*a* melt, but it may change.

The heating wire temperature at the time of energization may be any temperature as long as it melts the main body 1002, and in the case of polyolefin, it is preferably 220° C. or less.

Next, in step S1005 (an example of a cooling step), the molten resin pipe 1011, the molten electrofusion joint 1001 and the molten resin pipe 1012 are cooled for a predetermined time. It is preferable to continue applying the load by the pressing portion 1240 until the step S1005 is completed.

Figure 22:
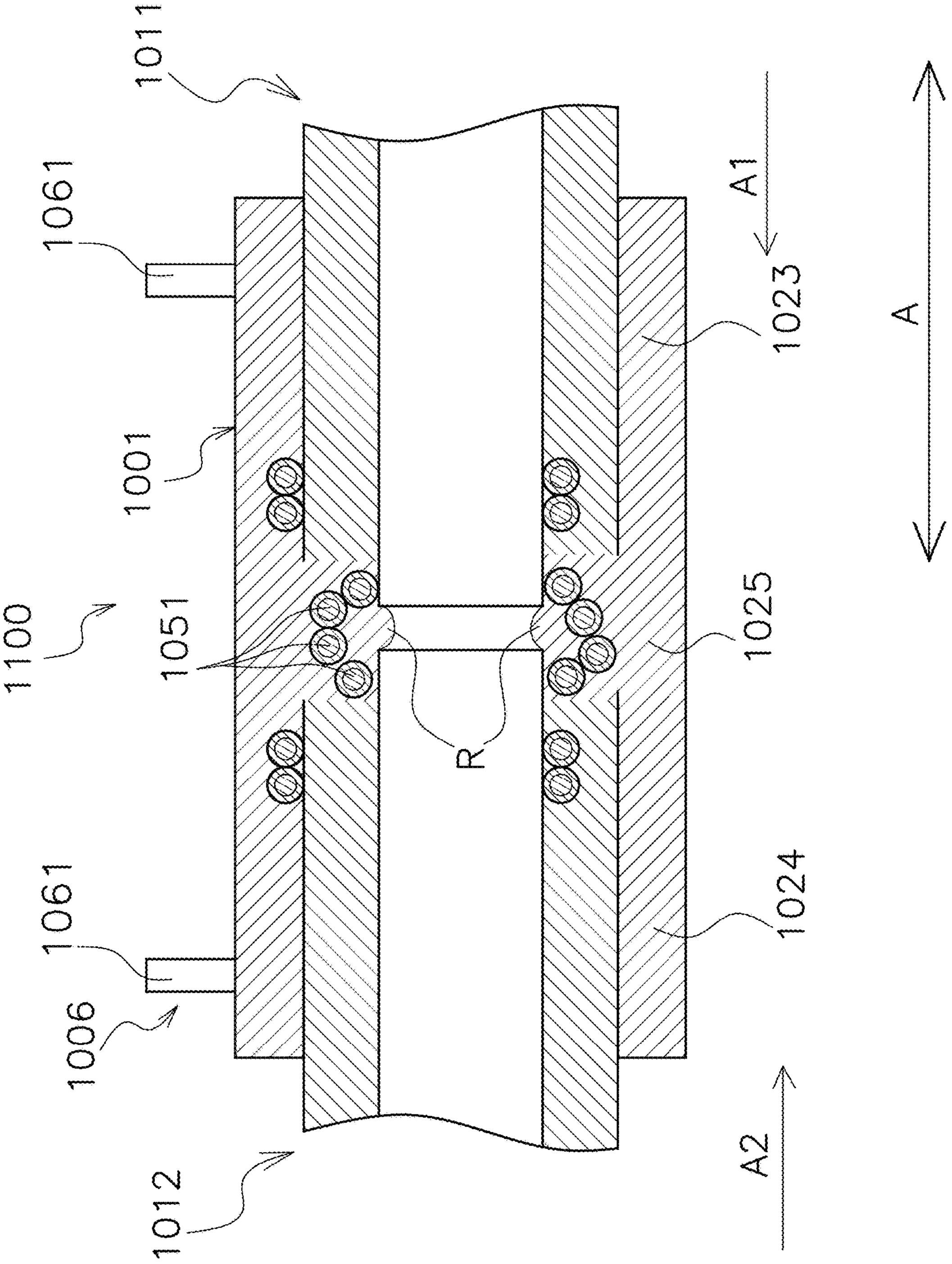
FIG. 22 is a cross-sectional configuration view showing the electrofusion joint and the resin pipes after fusion.
Figure 23A:
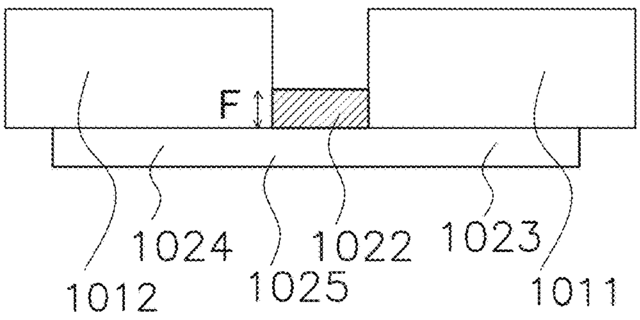
FIGS. 23(*a*) to 23(*d*) are views for explaining the volume relationship between a filling portion of a stopper portion for forming the bead and a gap.
Figure 23B:
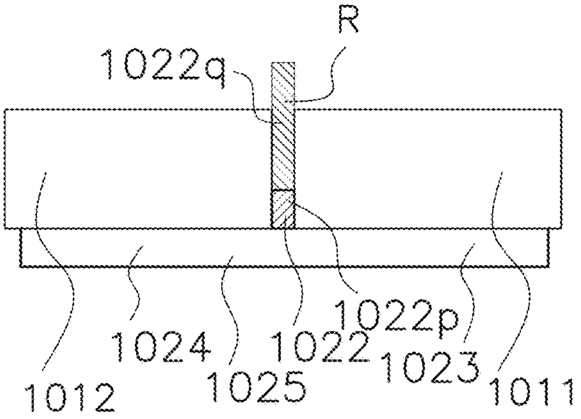
Figure 23C:
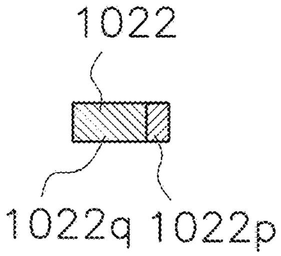
Figure 23D:
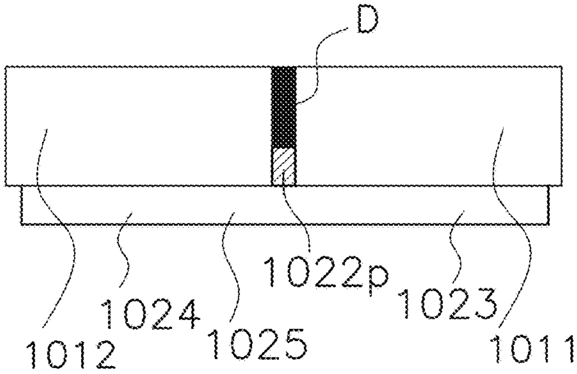

FIG. 22 is a view showing a state in which the resin pipe 1011, the electrofusion joint 1001 and the resin pipe 1012 are molten and connected. As shown in FIG. 22, the stopper portion 1022 is molten, pushed by the resin pipes 1011 and 1012 to be narrowed, and fills the space between the resin pipes 1011 and the resin pipes 1012 to form a bead R.

FIG. 23(*a*) is a schematic view showing the resin pipes 1011 and 1012 and the stopper portion 1022. FIG. 23(*b*) is a schematic view showing the resin pipes 1011 and 1012 and the stopper portion 1022 in a state after being molten and connected. In FIG. 23(*b*), the remaining portion remaining after melting of the stopper portion 1022 is shown by 1022*p*. FIG. 23(*c*) shows the remaining portion 1022*p* of the stopper portion 1022 and the other filling portion 1022*q*. As shown in FIG. 23(*c*), the filling portion 1022*q* other than the remaining portion 1022*p* of the stopper portion 1022 fills the gap D surrounded by the molten resin pipe 1011, the molten resin pipe 1012, and the molten remaining portion 1022*p*. The gap D is a space formed by the height from the height of the stopper portion 1022 to the inner peripheral surface of the resin pipes 1011 and 1012 before fusion and the width between the resin pipe 1011 and the resin pipe 1012 after fusion.

The gap D is shown in FIG. 23(*d*). In FIG. 23(*d*), the gap D is shown by filling. Here, in order to form the bead R that rises inward from the inner peripheral surface of the resin pipes 1011 and 1012, the volume of the filling portion 1022*q* is set larger than the volume of the gap D. For example, it is preferable that the filling portion 1022*q*/gap D×100(%) is set to 130 to 300%. The length of the width of the remaining portion 1022*p* along the axial direction A is, for example, 1 mm.

<Use of Ultrapure Water for Piping Structure 1100>

The piping structure 1100 of the embodiment according to the present disclosure can be used, for example, for transporting ultrapure water. Specifically, the piping structure 1100 for ultrapure water according to the embodiment of the present disclosure can be used as a pipe in the ultrapure water production apparatus, a pipe for transporting ultrapure water from the ultrapure water production apparatus to a use point, and a pipe for returning ultrapure water from a use point.

Ultrapure water is extremely pure water, and is suitably used for cleaning electronic devices such as semiconductor elements. There are many indicators for expressing the grade of ultrapure water, but in this embodiment, the electrical resistivity of ultrapure water is 18.2 MΩ2·cm or more, and the TOC is 50 ppb or less.

The piping structure 1100 of the embodiment according to the present disclosure is preferably used in a water piping for nuclear power generation, a manufacturing process of pharmaceuticals, a semiconductor element or a liquid crystal, in which the water quality required for ultrapure water is particularly strict. The piping structure 1100 of the embodiment according to the present disclosure is more preferably used in a transport pipe for ultrapure water used in a wet treatment step such as cleaning in a semiconductor element manufacturing step. The semiconductor device is preferably one having a higher degree of integration, and specifically, the piping structure is more preferably used in the manufacturing process of a semiconductor device having a minimum line width of 65 nm or less. As an examples of the standard regarding the quality of ultrapure water used in semiconductor manufacturing, SEMI F75 can be mentioned.

Further, since the piping structure 1100 of the embodiment according to the present disclosure includes a polyethylene-based resin layer, it is excellent in workability. For example, fusion construction such as EF (electric fusion) joining can be easily performed at a relatively low temperature.

<Characteristics>

In the electrofusion joint 1001 of the present embodiment, the number of adjacent turns of the heating wire 1051 in the second heat generating section 1005 is less than or equal to the number of adjacent turns of the heating wires 1031 and 1041 in the heat generating portions 1003*a* and 1004*a* adjacent to the second heat generating section 1005. As shown in FIG. 14, the number of turns of the heating wire 1051 in the second heat generating section 1005 is four turns, and the number of turns of each of the heating wires 1031 and 1041 in the heat generating portions 1003*a* and 1004*a* of the first heat generating sections 1003 and 1004 is two turns.

When the heating wires 1031 and 1041 of the first heat generating section 1003 and 1004 and the heating wire 1051 of the second heat generating section 1005 have the same wire diameter and material, the larger the number of turns, the faster the temperature rises during energization. If the number of turns of the heating wire 1051 of the second heat generating section 1005 is smaller than the number of turns of the heating wires 1031 and 1041 of the heat generating portions 1003*a* and 1004*a*, the heat generated by the heat generating portions 1003*a* and 1004*a* is larger than the heat generated by the second heat generating section. Therefore, the side surface of the resin pipes 1011 and 1012 are first heated and expanded. As a result, the resin pipes 1011 and 1012 are restrained by the portions of the first heat generating portions 1003*a* and 1004*a*, and a large force is required to push the resin pipes 1011 and 1012 (see arrows A1 and A2) in order to press the pipe ends 1011*a* and 1012*a* against the stopper portion 1022, it is necessary to use a large and heavy jig, and it is costly to fuse.

On the other hand, as in the present embodiment, the number of turns of the heating wire 1051 in the second heat generating section 1005 is larger than the number of turns of the heat generating portions 1003*a* and 1004*a* in the first heat generating section 1003 and 1004, so that the heat generated in the second heat generating section 5 is larger than the heat generated in the heat generating sections 1003 and 1004. As a result, the pipe ends 1011*a* and 1012*a* can be pressed against the stopper portion 1022 by melting the resin by the second heat generating section 5 before the resin pipes 1011 and 1012 are restrained by the electrofusion joint 1001 due to the heating expansion of the side surfaces of the resin pipes 1011 and 1012. Therefore, fusion can be performed with a small pushing force.

In the electrofusion joint 1001 of the present embodiment, d1/L1 is set to 2.5 or less when the outer diameter of the resin pipe 1011 is 25 mm or less, and d1/L1 is set to 3.5 or less when the outer diameter of the resin pipe 1011 is 32 mm or more and 50 mm or less, and d1/L1 is set to 4.0 or less when the outer diameter of the resin pipe 1011 is 63 mm or more and 90 mm or less, and d1/L1 is set to 5.5 or less when the outer diameter of the resin pipe 1011 is 110 mm or more and 160 mm or less, and d1/L1 is set to 6.5 or less when the outer diameter of the resin pipe 1011 is 225 mm or more. Further, d2/L2 is set to 2.5 or less when the outer diameter of the resin pipe 1012 is 25 mm or less, and d2/L2 is set to 3.5 or less when the outer diameter of the resin pipe 1012 is 32 mm or more and 50 mm or less, and d2/L2 is set to 4.0 or less when the outer diameter of the resin pipe 1012 is 63 mm or more and 90 mm or less, and d2/L2 is set to 5.5 or less when the outer diameter of the resin pipe 1012 is 110 mm or more and 160 mm or less, and d2/L2 is set to 6.5 or less when the outer diameter of the resin pipe 1012 is 225 mm or more.

Figure 24A:
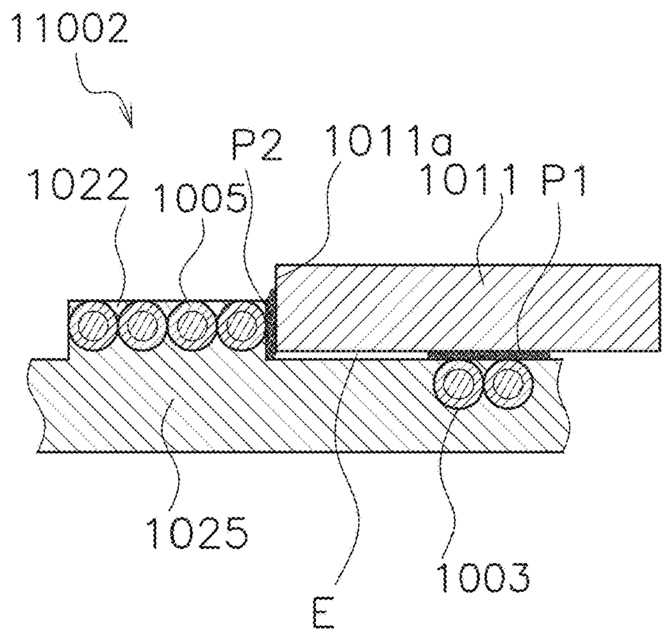
FIGS. 24(*a*) and 24(*b*) are views for explaining that a size and shape of a bead become unstable.
Figure 24B:
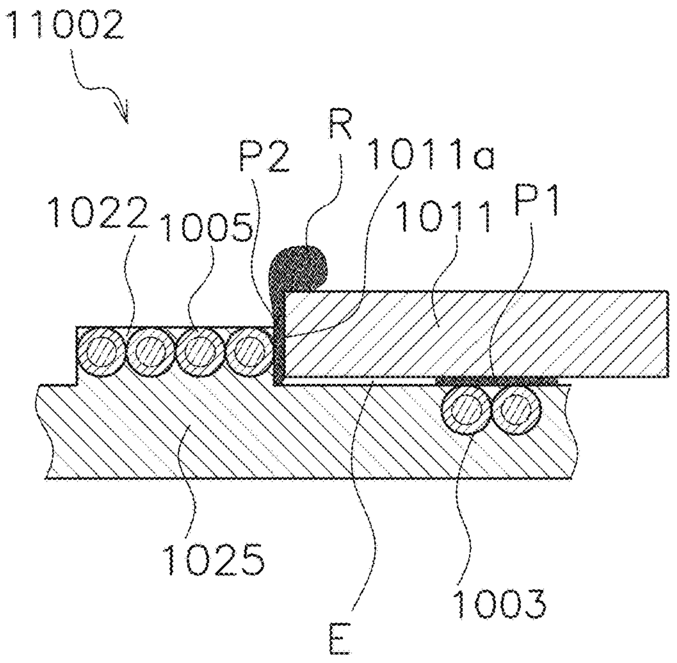

Here, the reason why the bead R becomes unstable when the arrangement of the first heat generating sections 1003 and 1004 is too far from the stopper portion 1022, which was found by the inventors of the present invention, will be described. FIG. 24(*a*) is a view showing a configuration in which the distances L1 and d1 are outside the range of the present embodiment, that is, d1/L1 is set to be larger than 2.5 when the outer diameter of the resin pipe 1011 is 25 mm or less, and d1/L1 is set to be larger than 3.5 when the outer diameter of 1011 is 32 mm or more and 50 mm or less, and d1/L1 is set to be larger than 4.0 when the outer diameter of the resin pipe 1011 is 63 mm or more and 90 mm or less, and d1/L1 is set to be larger than 5.5 when the outer diameter of 1011 is 110 mm or more and 160 mm or less, and d1/L1 is set to be larger than 6.5 when the outer diameter of the resin pipe 1011 is 225 mm or more.

When the resin pipe 1011 is inserted into the electrofusion joint 11002 having such a configuration, air exists in the clearance (indicated by E in the figure) between the inner surface of the electrofusion joint 1001 and the outer surface of the resin pipe 1011 in the portion (cold zone) between the second heat generating section 1005 of the stopper portion 22 and the first heat generating section 1004 of the joint receiving portion 1023. When the fusion is started, the fusion (the fused portion is indicated by P2 in the figure) between the stopper portion 1022 provided with the second heat generating section 1005 and the pipe end 1011*a* of the resin pipe 1011, and the fusion (the fused portion is indicated by P1 in the figure) between the inner surface of the portion of the joint receiving portion 1023 where the first heat generating section 1003 is provided and the outer surface of the resin pipe 1011 proceeds at the same time. Therefore, air in the clearance E may be expanded by heat in a state of being confined between the fused portions P1 and P2, and pushes up the molten resin in the process of forming the bead R as shown in FIG. 24(*b*). Therefore, the size and shape of the bead R change. This phenomenon may occur due to variations in the dimensional accuracy when molding pipes and joints, the amount of scraping during construction (the thickness cut in the process of cutting the outer surface of the pipe before fusion), and the degree of insertion of the pipe.

Therefore, in the electrofusion joint 1001 of the present disclosure, when the joint receiving portion 1023 is used for a pipe having an OD of 25 mm or less, d1/L1 is set to 2.5 or less, and when the joint receiving portion 1023 is used for a pipe having an OD of 32 mm or more and an OD of 50 mm or less, d1/L1 is set to 3.5 or less, and when the joint receiving portion 1023 is used for a pipe having an OD of 63 mm or more and OD 90 mm or less, d1/L1 is set to 4.0 or less, and when the joint receiving portion 1023 is used for OD of 110 mm or more and OD of 160 mm or less, d1/L1 is set to 5.5 or less, and when the joint receiving portion 1023 is used for a pipe having an OD of 225 mm or more, d1/L1 is set to 6.5 or less. Further, in the electrofusion joint 1001 of the present disclosure, when the joint receiving portion 1024 is used for a pipe having an OD of 25 mm or less, d2/L2 is set to 2.5 or less, and when the joint receiving portion 1024 is used for a pipe having an OD of 32 mm or more and an OD of 50 mm or less, d2/L2 is set to 3.5 or less, and when the joint receiving portion 1024 is used for a pipe having an OD of 63 mm or more and OD 90 mm or less, d2/L2 is set to 4.0 or less, and when the joint receiving portion 1024 is used for OD of 110 mm or more and OD of 160 mm or less, d2/L2 is set to 5.5 or less, and when the joint receiving portion 1024 is used for a pipe having an OD of 225 mm or more, d2/L2 is set to 6.5 or less.

As a result, the distance between the second heat generating section 1005 of the stopper portion 1022 and the first heat generating sections 1003 and 1004 of the joint receiving portion 1023 and 1024 is narrowed, so that air is less likely to be trapped within the clearance between the inner surface of the joint and the outer surface of the pipe, it is possible to form a bead R having a stable shape and size, and it is possible to suppress the occurrence of a gap between the electrofusion joint and the pipe.

As shown in FIG. 17, the predetermined distances L1 and L2 may be set to zero. The first heat generating sections 1003 and 1004 are arranged adjacent to the stopper portion 1022 in the direction along the axis of the main body 1002.

As a result, the distance between the second heat generating section 1005 of the stopper portion 1022 and the first heat generating sections 1003 and 1004 of the joint receiving portion 1023 and 1024 becomes narrower, so that air is less likely to be trapped within the clearance between the inner surface of the joint and the outer surface of the pipe, and it is possible to form a bead R having a stable shape and size.

The first heat generating sections 1003 and 1004 include heating wires 1031 and 1041 wound around two or more turns.

As a result, the first heat generating sections 1003 and 1004 can be fused more reliably.

Other Embodiments

Although one embodiment of the present disclosure has been described above, the present disclosure is not limited to the above embodiment, and various changes can be made without departing from the gist of the invention.

(A)

In the above embodiment, the spring 1241 and the nut 1242 are used as the pressing portion for applying the load to the first clamp portion 1210, but the pressing portion is not limited to these, and a motor, a cylinder, or the like may be used. Further, pressing the pipe ends 1011*a* and 1011*b* against the stopper portion 1022 may be due to either the application of a load to the first clamp portion 1210 or the amount of movement of the first clamp portion 1210.

(B)

In the above-mentioned electrofusion joints 1001 and 1001', the heating wire 1031 and the heating wire 1041 are wound around two turns, but may be wound around three or more turns. Further, in the above embodiment, the first heat generating section 1003 and the first heat generating section 1004 are provided symmetrically with the stopper portion 1022 interposed therebetween, but they do not have to be symmetrical. Further, the adjacent wound parts of the heating wire 1031 and the adjacent wound parts of the heating wire 1041 are in contact with each other, but all or part of them may not be in contact with each other.

Further, a heat generating portion formed by winding the heating wire 1031 may be provided on the end 1021*b* side of the first heat generating section 1003, and this heat generating portion may be provided at a predetermined interval from the first heat generating section 1003. A heat generating portion formed by winding the heating wire 1041 may be provided on the end 1021*c* side of the first heat generating section 1004, and this heat generating portion may be provided at a predetermined interval from the first heat generating section 1004.

(C)

In the above embodiment, the outer diameter of the stopper portion 1022 is circular when viewed along the axial direction A, but it is not limited to a circle and may be a polygonal shape.

(D)

In the above embodiment, the flow paths of the electrofusion joints 1001 and 1001' are both formed in a straight line, but an elbow joint in which the flow path is curved may be used.

(E)

In the above embodiment, the same heating wires 1031, 1041 and 1051 are used for the first heat generating section 1003, 1004 and the second heat generating section 1005, all the heating wires 1031, 1041 and 1051 have an insulating film, but the heating wire is not limited to this. However, it is preferable that at least the heating wire 1051 is provided with an insulating film. This is because the resin pipe 1011 and the resin pipe 1012 may pressurize the heating wire 1051 so that the parts of the heating wire 1051 are likely to come into contact with each other.

(F)

In the above embodiment, the resin pipe 1011 and the resin pipe 1012 are pressed against the electrofusion joint 1001 by the pressing portion 1240 before the first heat generating section 1003 and 1004 and the second heat generating section 1005 are energized, but pressurization may be performed after the energization or from the middle of energization.

Example

Hereinafter, the present embodiment will be described in detail with reference to examples.

When the inner diameter of the joint receiving portion 1023 shown in FIG. 14 is defined as d1 and the inner diameter of the joint receiving portion 1024 is defined as d2, d1 and d2 are set to d1=d2 in this embodiment. Further, when the melting length of the first heat generating section 1003 is defined as D3 (the length along the axial direction A) and the melting length of the first heat generating section 1004 is defined as D4, D3 and D4 are set to D3=D4 in this embodiment. Further, the above-mentioned L1 and L2 are also set to L1=L2 in this embodiment. In the table, L1 and L2 are shown as the length of the cold zone.

The shape of the bead R was verified by changing the inner diameter of the joint receiving portion described above, insertion length, melting length, and cold zone length. The results are shown in (Table 3). Since the piping structure used in the examples is for ultrapure water, the sizes of the resin pipes and the electrofusion joint are different from those in the comparative examples (see Table 3).

The dimensions of the stopper portion 1022 are set as follows.

As shown in FIG. 14, the stopper height h1 is the height in the direction toward the central axis of the first side surface 1022*a* and the second side surface 1022*b*. As shown in FIG. 14, the stopper width W1 is a length along the axial direction A of the peripheral surface 1022*c*.

When the stopper portion 1022 is too low, the pipe ends 1011*a* and 1012*a* of the resin pipes 1011 and 1012 will not be completely melted, and when it is too high, the bead R will be too large. Therefore, the height h1 of the stopper portion 1022 is set to ¼ to 1/2 of the pipe thickness and the width W1 of the stopper portion 1022 is set to about 3 to 15 mm.

Further, at the time of heating, the temperature of the pipe ends 1011*a* and 1012*a* of the resin pipes 1011 and 1012 is set to 220° C. (180 to 240° C.). For example, when the temperature is 180° C. or lower, the melting is insufficient and the resin pipes 1011 and 1012 cannot be pushed in, and when the temperature is too high as 280° C. or more, the resin melts and emits smoke.

It is considered to be good when the size of the bead R (maximum height (mm) toward the central axis direction) is higher than 0 mm and equal to or less than the upper limit shown in the following (Table 3).

TABLE 3

| Diameter A | 20 | 25 | 40 | 50 | 65 | 75 | 100 | 125 | 150 | 200 |
|---|---|---|---|---|---|---|---|---|---|---|
| Height(mm) | 3.2 | 3.2 | 3.5 | 4 | 4.3 | 5 | 5.5 | 6 | 7 | 7.5 |

For example, in the case that the diameter of the resin pipes 1011 and 1012 is 25 A, it is judged to be good when the height of the bead R is 2 mm to 3.2 mm.

TABLE 4

| | Diameter A of pipe | Joint receiving portion d1, d2 mm) | melting length D3, D4(mm) | Length of cold zone L1, L2(mm) | d1/L1, d2/L2 | Bead judgement |
|---|---|---|---|---|---|---|
| Comparative Example 1 | 20 | 27.35 | 16.8 | 9.7 | 2.8 | X |
| Comparative Example 2 | 25 | 34.40 | 24.5 | 7.5 | 4.6 | X |
| Comparative Example 3 | 30 | 42.40 | 25.2 | 10.8 | 3.9 | X |
| Comparative Example 4 | 40 | 48.40 | 18 | 13.0 | 3.7 | X |
| Comparative Example 5 | 50 | 60.50 | 22.8 | 14.2 | 4.3 | X |
| Comparative Example 6 | 50 | 63.70 | 22.8 | 14.2 | 4.5 | X |
| Comparative Example 7 | 65 | 76.60 | 23.1 | 15.9 | 4.8 | X |
| Comparative Example 8 | 75 | 89.70 | 23.1 | 16.9 | 5.3 | X |
| Comparative Example 9 | 75 | 91.10 | 26.4 | 13.6 | 6.7 | X |
| Comparative Example 10 | 100 | 114.85 | 31.2 | 22.8 | 5.0 | X |
| Comparative Example 11 | 100 | 126.35 | 35.7 | 15.3 | 8.3 | X |
| Comparative Example 12 | 125 | 140.95 | 40.8 | 23.2 | 6.1 | X |
| Comparative Example 13 | 150 | 166.10 | 45.9 | 27.1 | 6.1 | X |
| Comparative Example 14 | 150 | 181.70 | 51 | 19.0 | 9.6 | X |
| Comparative Example 15 | 200 | 252.25 | 60 | 30.0 | 8.4 | X |
| Example 1 | 20 | 25.30 | 2.0 | 10.0 | 2.5 | ○ |
| Example 2 | 25 | 32.35 | 2.0 | 10.0 | 3.2 | ○ |
| Example 3 | 40 | 50.45 | 3.6 | 15.0 | 3.4 | ○ |
| Example 4 | 50 | 63.50 | 3.6 | 17.0 | 3.7 | ○ |
| Example 5 | 65 | 75.65 | 3.6 | 21.0 | 3.6 | ○ |
| Example 6 | 75 | 90.90 | 4.8 | 25.0 | 3.6 | ○ |
| Example 7 | 100 | 111.05 | 4.8 | 26.0 | 4.3 | ○ |
| Example 8 | 125 | 141.25 | 4.8 | 26.0 | 5.4 | ○ |
| Example 9 | 150 | 161.40 | 4.8 | 30.0 | 5.4 | ○ |
| Example 10 | 200 | 226.95 | 4.8 | 35.0 | 6.5 | ○ |

As a result of the above, the shape and size of the bead R is not good in all of Comparative Examples 1 to 15, and good in all of the electrofusion joints of Examples 1 to 10.

By confirming Examples 1 to 10, it can be seen that when the diameters (nominal diameters) of the resin pipes 1011 and 1012 are increased, the electrofusion joints are good even if the lengths of L1 and L2 are long. This is because as the diameter (nominal diameter) increases, the wall thickness of the resin pipes 1011 and 1012 increases, and the height of the stopper portion 1022 also increases. So the cross sectional areas of the side surface on the stopper portion and the pipe end of the pipe which are integrated at the initial stage of fusion increase (See arrow F in FIG. 23(*a*)). As described in FIGS. 24(*a*) and 24(*b*), the cause of the defective bead is that the air expands and the resin swells from between the side surface of the stopper portion 1022 and the pipe end to the surface in the middle of fusion. So, the larger the diameter (nominal diameter) of the resin pipes 1011 and 1012 and the larger the contact area of the arrow F, the more difficult it is for the air to expand due to the thickness of the resin. Therefore, the larger the diameter (nominal diameter), the better even when the lengths of L1 and L2 are lengthened.

Example 11

In Example 11, the resin pipes 1011 and 1012 are fused to the electrofusion joint 1001 of the second embodiment. The pushing force when the resin pipes 1011 and 1012 are fused to the electrofusion joint 1001 is measured by a load meter and found to be 2 kgf.

Comparative Example 16

In Comparative Example 16, the resin pipes 1011 and 1012 are fused to the electrofusion joint in which the number of turns of the heating wires 31 and 41 in each of the first heat generating sections 1003 and 1004 of the electrofusion joint 1001 of the second embodiment is changed to 6 turns. The pushing force when the resin pipes 1011 and 1012 are fused to the electrofusion joint is measured by a load meter and found to be 5 kgf.

Comparative Example 17

In Comparative Example 17, the resin pipes 1011 and 1012 are fused to the electrofusion joint in which the number of turns of the heating wires 31 and 41 in each of the first heat generating sections 1003 and 1004 of the electrofusion joint 1001 of the second embodiment is changed to eight turns. The pushing force when the resin pipes 1011 and 1012 are fused to the electrofusion joint is measured by a load meter and found to be 11 kgf.

Comparative Example 18

In Comparative Example 18, the resin pipes 1011 and 1012 are fused to the electrofusion joint in which the number of turns of the heating wires 31 and 41 in each of the first heat generating sections 1003 and 1004 of the electrofusion joint 1001 of the second embodiment is changed to 15 turns. 1012 was fused. The pushing force when the resin pipes 1011 and 1012 are fused to the electrofusion joint is measured by a load meter and found to be 30 kgf.

Deformation of the inner surface of the pipes in the pipe structures made in Example 11 and Comparative Examples 16 to 18 is visually confirmed. The results are shown in Table (5) below.

TABLE 5

| | Number of turns in second heat generating section | Number of turns in first heat generating section (one side) | Pushing force (kgf) | Deformation of inner surface of pipe |
|---|---|---|---|---|
| Example 11 | 4 | 2 | 2 | Small |
| Comparative Example 16 | 4 | 6 | 5 | Large |
| Comparative Example 17 | 4 | 11 | 11 | Large |
| Comparative Example 18 | 4 | 30 | 30 | Large |

From the above, it can be seen that it is preferable that the number of adjacent turns of the heating wire 1051 in the second heat generating section 1005 is equal or more than the number of adjacent turns of the heating wires 1031 and 1041 in the heat generating portions 1003*a* and 1004*a* adjacent to the second heat generating section 1005 because the pushing force is small and the deformation of the inner surface of the pipe is also small.

Electrofusion joints are often used when connecting resin pipes or pipes in which a resin is used, such as a metal-reinforced composite pipe having a resin layer and a metal reinforcing layer (see, for example, JP2020-143713).

The electrofusion joint shown in Patent Document 1 includes a joint receiving portion into which a pipe is inserted, a stopper portion protruding inward from the inner peripheral surface to restrict the insertion of the pipe, and a heat generating section arranged inside the joint receiving portion. The pipe and the electrofusion joint are fused by heating the pipe with the heat generating portion while the pipe is inserted into the joint receiving portion.

However, in the electrofusion joint shown in Patent Document 1, since the interface between the end face of the pipe and the stopper portion is not fused, a gap may be generated between the stopper portion and the end face of the pipe, and the flow of water or a chemical solution stay. As a result, microorganisms propagate and cause deterioration of water quality, and deterioration of the chemical solution causes deterioration of purity, which may cause deterioration of product yield in semiconductor manufacturing pipes and the like.

It is an object of the present disclosure to provide an electrofusion joint which is capable of suppressing the occurrence of a gap.

In order to achieve the above object, the electrofusion joint according to the first disclosure includes a tubular main body, a stopper portion, a first heat generating section, and a second heat generating section. The tubular main body includes a joint receiving portion into which a pipe containing a thermoplastic resin can be inserted inside. The stopper portion is arranged so as to project inward on an inner surface of the main body, and regulates an insertion position of a pipe end of the pipe when the pipe is inserted inside the joint receiving portion. The first heat generating section is arranged inside the joint receiving portion and includes a heating wire provided with an insulator. The second heat generating section is arranged in the stopper portion and includes a heating wire provided with an insulator. The distance from the stopper portion to the first heat generating section in the direction along an axis of the main body is set as L, an inner diameter of the joint receiving portion is set as d. When an outer diameter of the pipe is 25 mm or less, d/L is set to 2.5 or less. When the outer diameter of the pipe is 32 mm or more and 50 mm or less, d/L is 3.5 or less. When the outer diameter of the pipe is 63 mm or more and 90 mm or less, d/L is 4.0 or less. When the outer diameter of the pipe is 110 mm or more and 160 mm or less, d/L is 5.5 or less. When the outer diameter of the pipe is 225 mm or more, d/L is 6.5 or less.

The inventors of the present invention considered to provide a heat generating section not only in the joint receiving portion but also in the stopper portion in order to suppress the occurrence of a gap between the stopper portion and the end surface of the pipe. However, we have found the problem that the size and shape of the bead may not be stable simply by providing the heat generating section. When the size and shape of the bead are not stable, the amount of water will not be stable and dead water will be generated depending on the shape of the bead. Further, when the height of the bead is not uniform in the circumferential direction, a strong pressure is applied to the non-uniform portion (swelling portion), and the swelling portion may be removed and flow out. It is also conceivable that cracks will occur in the joint portion starting from the swelling portion and dead water will occur.

Then, the inventors of the present invention have clarified that the reason why the size and shape of such a bead become unstable is as follows. When a pipe is inserted into an electrofusion joint, air is present in the clearance between the inner surface of the joint and the outer surface of the pipe in the part (cold zone) between the heat generating section of the stopper portion and the heat generating section of the joint receiving portion. When the fusion is started, the fusion between the stopper portion provided with the heat generating section and the end of the pipe and the fusion between the inner surface of the portion provided with the heat generating section of the joint receiving portion and the outer surface of the pipe proceed at the same time. Therefore, the air in the clearance expands due to heat in a state of being trapped between both of the fused portions, expanded air pushes up the molten resin in the process of forming the bead. This changes the size and shape of the bead. This phenomenon may occur due to variations in the dimensional accuracy when molding pipes and joints, the amount of scraping during construction (the thickness cut in the process of cutting the outer surface of the pipe before fusion), and the degree of insertion of the pipe.

Therefore, in the electrofusion joint of the present disclosure, when the outer diameter of the pipe is 25 mm or less, d/L is set to 2.5 or less. When the outer diameter of the pipe is 32 mm or more and 50 mm or less, d/L is 3.5 or less. When the outer diameter of the pipe is 63 mm or more and 90 mm or less, the d/L is set to 4.0 or less. When the outer diameter of the pipe is 110 mm or more and 160 mm or less, the d/Lis 5.5 or less. When the outer diameter of the pipe is 225 mm or more, d/L is set to 6.5 or less.

As a result, air is less likely to be trapped in the clearance between the inner surface of the joint and the outer surface of the pipe between the second heat generating section of the stopper portion and the first heat generating section of the joint receiving portion, and it is possible to form the bead which has a stable shape and size, and it is possible to suppress the occurrence of a gap between the electrofusion joint and the pipe.

The electrofusion joint according to the second disclosure is the electrofusion joint according to the first disclosure and includes a tubular main body, a stopper portion, a first heat generating section, and a second heat generating section. The tubular main body includes a joint receiving portion into which a pipe containing a thermoplastic resin can be inserted inside. The stopper portion is arranged so as to project inward on an inner surface of the main body, and regulates an insertion position of a pipe end of the pipe when the pipe is inserted inside the joint receiving portion. The first heat generating section is arranged inside the joint receiving portion and includes a heating wire provided with an insulator. The second heat generating section is arranged in the stopper portion and includes a heating wire provided with an insulator. When the distance from the stopper portion to the first heat generating section in the direction along an axis of the main body is set as L, the distance L is set to zero. The first heat generating section is arranged adjacent to the stopper portion in the direction along an axis of the main body.

For the reason described above, the closer the position of the first heat generating section is to the stopper portion, the smaller the clearance and the less likely it is that air expansion occurs. Therefore, by setting L to zero, it is possible to form a bead with a stable shape and size.

The electrofusion joint according to the third disclosure is the electrofusion joint according to the first disclosure or the second disclosure and the first heat generating section includes a heating wire wound around two or more turns.

As a result, it is possible to more reliably fuse in the first heat generating section.

According to the present disclosure, it is possible to provide an electrically fused joint capable of suppressing the occurrence of a gap.

An electrofusion joint that achieves the above object described in the embodiment can be described as the following invention.

(1)

An electrofusion joint, comprising:

- a main body including a tubular shape, the main body including a joint receiving portion in which a pipe containing a thermoplastic resin can be inserted;
- a stopper portion arranged so as to project inward on an inner surface of the main body, the stopper portion configured to regulate an insertion position of a pipe end of the pipe when the pipe is inserted inside the joint receiving portion;
- a first heat generating section arranged inside the joint receiving portion, the first heat generating section including a heating wire provided with an insulator; and
- a second heat generating section arranged in the stopper portion, the second heat generating section including a heating wire provided with an insulator,
- wherein a distance from the stopper portion to the first heat generating section in a direction along an axis of the main body is set as L, an inner diameter of the joint receiving portion is set as d and, when an outer diameter of the pipe is 25 mm or less, d/L is set to 2.5 or less, and when the outer diameter of the pipe is 32 mm or more and 50 mm or less, d/L is 3.5 or less, and when the outer diameter of the pipe is 63 mm or more and 90 mm or less, d/L is 4.0 or less, and when the outer diameter of the pipe is 110 mm or more and 160 mm or less, d/L is 5.5 or less, and when the outer diameter of the pipe is 225 mm or more, d/L is 6.5 or less.

(2)

An electrofusion joint, comprising:

- a main body including a tubular shape, the main body including a joint receiving portion in which a pipe containing a thermoplastic resin can be inserted;
- a stopper portion arranged so as to project inward on an inner surface of the main body, the stopper portion configured to regulate an insertion position of a pipe end of the pipe when the pipe is inserted inside the joint receiving portion;

a first heat generating section arranged inside the joint receiving portion, the first heat generating section including a heating wire provided with an insulator; and a second heat generating section arranged in the stopper portion, the second heat generating section including a heating wire provided with an insulator, wherein a distance from the stopper portion to the first heat generating section in a direction along an axis of the main body is set as L, the distance L is set to zero, and the first heat generating section is arranged adjacent to the stopper portion in a direction along an axis of the main body.

(3)

The electrofusion joint according to (1) or (2) above, wherein the first heat generating section includes the heating wire wound around two or more turns.

Embodiment 3

Next, a method for manufacturing an electrofusion joint according to the third embodiment of the present disclosure will be described.

Figure 25:
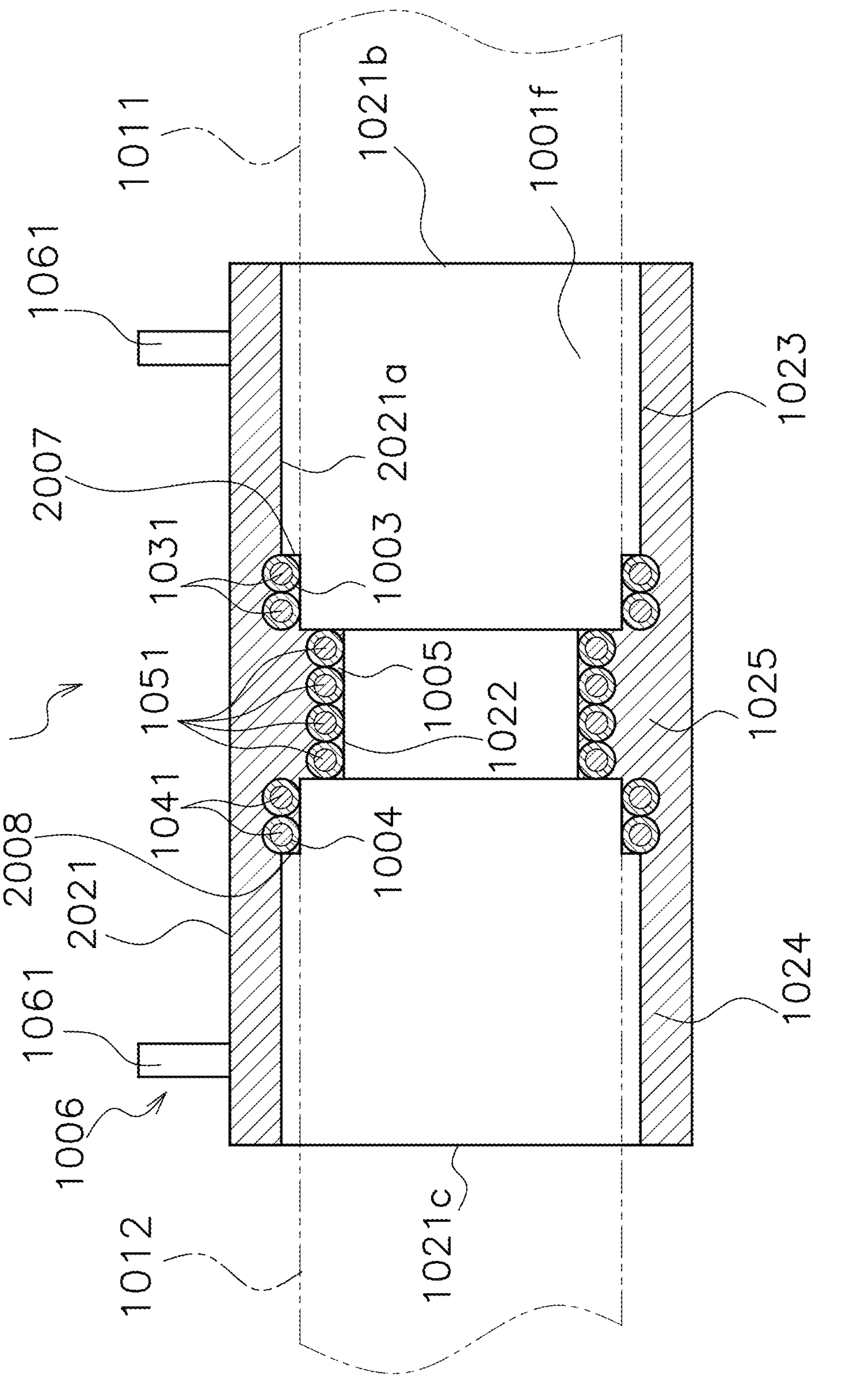
FIG. 25 is a cross-sectional configuration view showing an electrofusion joint according to the embodiment 3 of the present disclosure.

FIG. 25 is a cross-sectional view showing an electrofusion joint 2001 manufactured by the method for manufacturing an electrofusion joint according to the third embodiment.

The electrofusion joint 2001 is different from the electrofusion joint 1001'shown in FIG. 17 in that steps is formed in portions of the inner surface 1021*a* where the first heat generating sections 1003 and 1004 are arranged. Among the configurations of the electrofusion joint 2001, the same configuration as the electrofusion joint 1001' is assigned the same number and the description thereof will be omitted.

A step 2007 and a step 2008 are formed on the inner surface 2021*a* of the tubular portion 2021 of the electrofusion joint 2001. The step 2007 is provided in a portion where the first heat generating section 1003 is formed. The step 2008 is provided in a portion where the first heat generating section 1004 is formed. The steps 2007 and 2008 are formed so as to project toward the center of the tubular portion 2021. The step 2007 and 2008 have a smaller protrusion amount than the stopper portion 1022. At the time of fusion, the resin pipe 1011 is inserted inside the step 2007, and the resin pipe 1012 is inserted inside the step 2008 and the resin pipes 1011 and 1012 come into contact with the stopper portion 1022.

Figure 26:
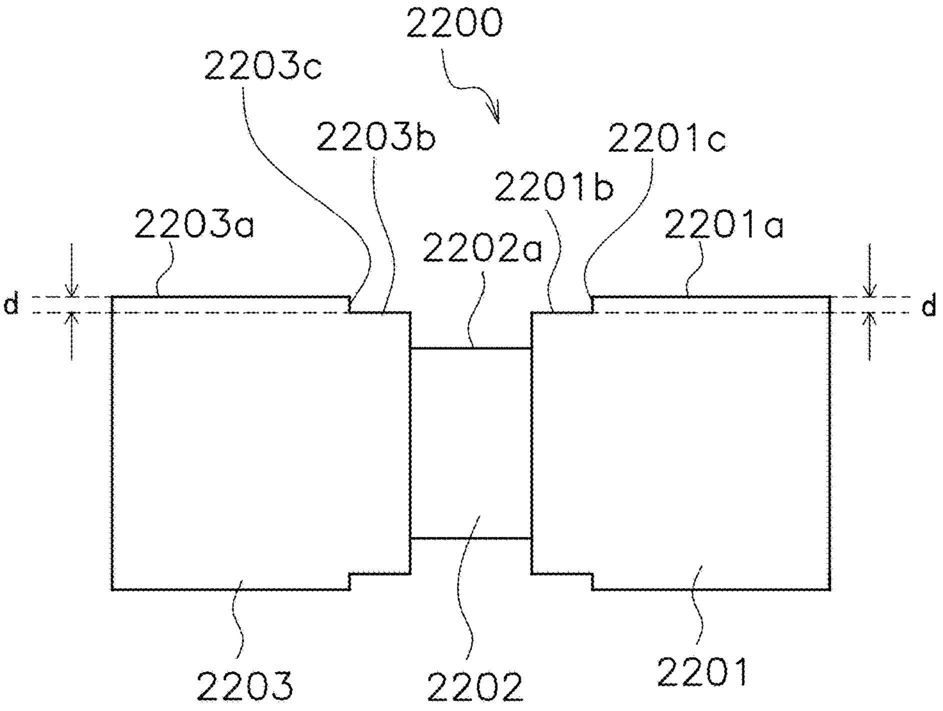
FIG. 26 is a front view showing a winding core used when manufacturing an electrofusion joint according to the embodiment 3 according to the present disclosure.

The manufacturing method of the electrofusion joint 2001 will be described. FIG. 26 is a view showing a winding core 2200. The winding core 2200 includes a first member 2201, a second member 2202, and a third member 2203. The first member 2201, the second member 2202, and the third member 2203 are substantially columnar members, and are arranged coaxially side by side.

The second member 2202 is arranged between the first member 2201 and the third member 2203. The first member 2201 forms the joint receiving portion 1023. The second member 2202 forms the stopper portion 1022. The third member 2203 forms the joint receiving portion 1024. The second member 2202 is formed to have a smaller diameter than the first member 2201 and the third member 2203.

Figure 27:
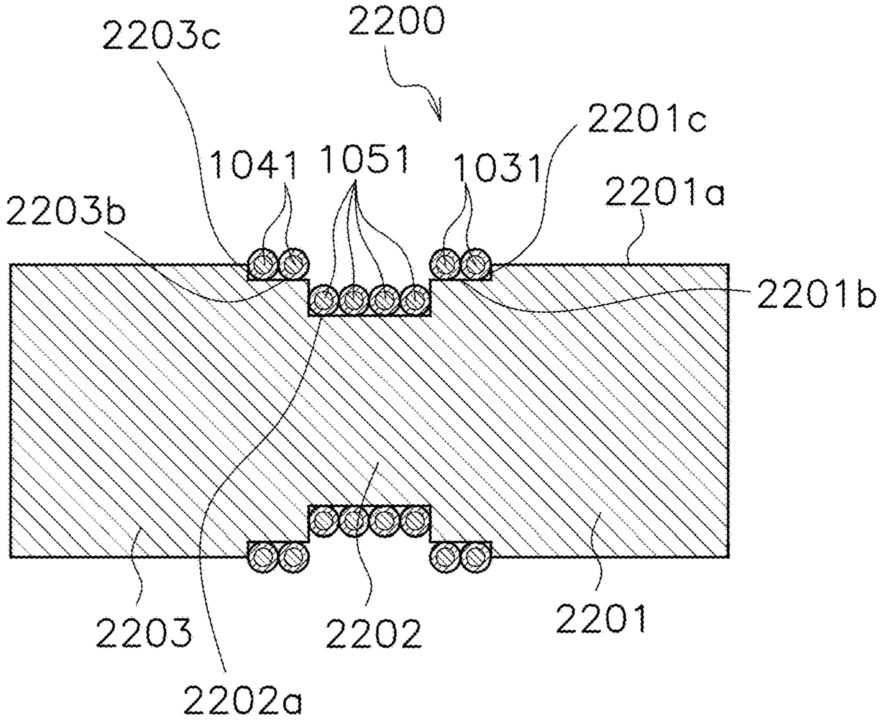
FIG. 27 is a view showing a state in which a heating wire is disposed on the winding core of FIG. 26.

FIG. 27 is a view showing a state in which the heating wires 1031, 1041 and 1051 are arranged on the winding core 2200.

At the end of the outer peripheral surface 2201*a* of the first member 2201 on the second member 2202 side, a heating wire arranging portion 2201*b* in which the heating wire 1031 of the first heat generating section 1003 is wound around and arranged is provided. The heating wire arranging portion 2201*b* is formed by denting the outer peripheral surface 2201*a* toward the center side. The heating wire arranging portion 2201*b* is formed in a stepped shape on the outer peripheral surface 2201*a*. The diameter of the heating wire arranging portion 2201*b* in the outer peripheral surface 2201*a* is smaller than the diameter of the portion other than the heating wire arranging portion 2201*b*. The size of the step d of the heating wire arranging portion 2201*b* is preferably up to about 20% of the diameter of the heating wire 1031.

As shown in FIG. 27, the heating wire 1051 of the second heat generating section 1005 is wound around and arranged on the outer peripheral surface 2202*a* of the second member 2202.

At the end of the outer peripheral surface 2203*a* of the third member 2203 on the second member 2202 side, a heating wire arranging portion 2203*b* in which the heating wire 1041 of the first heat generating section 1004 is wound around and arranged is provided. The heating wire arranging portion 2203*b* is formed by denting the outer peripheral surface 2203*a* toward the center side. The heating wire arranging portion 2203*b* is formed in a stepped shape on the outer peripheral surface 2203*a*. The diameter of the heating wire arranging portion 2203*b* in the outer peripheral surface 2203*a* is smaller than the diameter of the portion other than the heating wire arranging portion 2203*b*. The size of the step d of the heating wire arranging portion 2203*b* is preferably up to about 20% of the diameter of the heating wire 1041.

The electrofusion joint 2001 is manufactured using such the winding core 2200.

Figure 28:
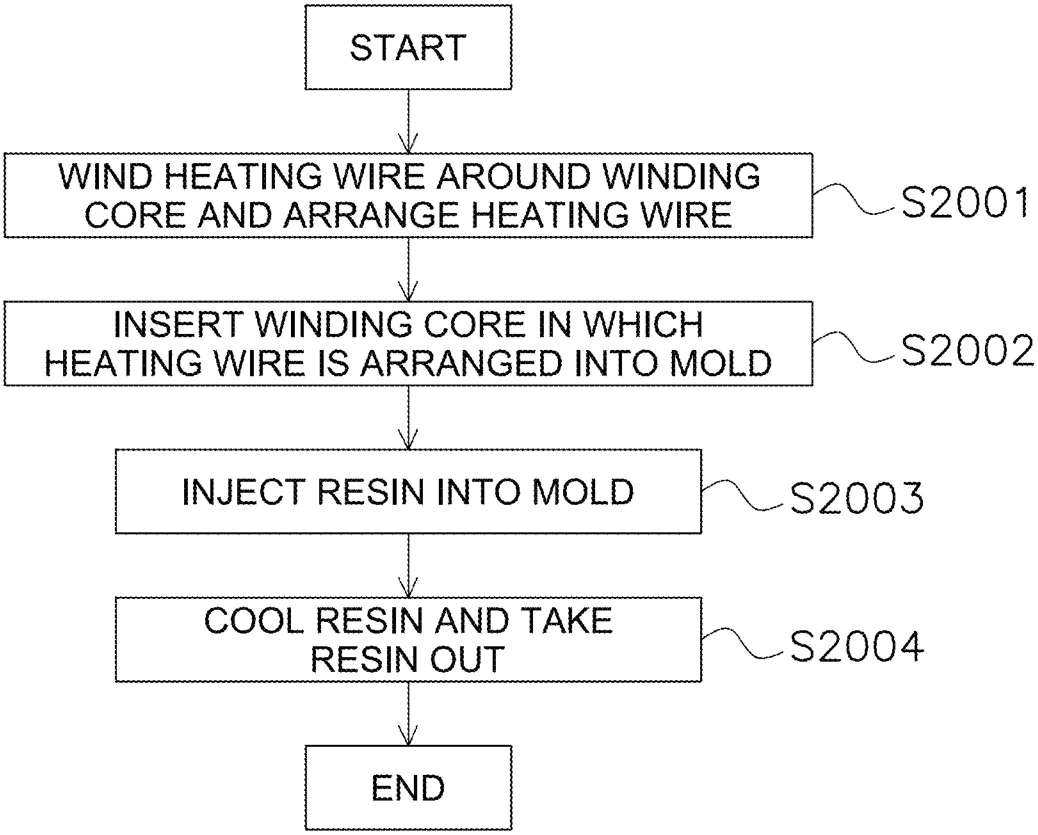
FIG. 28 is a flow chart showing a method of manufacturing the electrofusion joint according to the embodiment 3 of the present disclosure.

FIG. 28 is a flow chart showing a manufacturing process of the electrofusion joint 2001. The heating wires 1031, 1041 and 1051 are connected and are one heating wire.

First, in step S2001, the heating wires 1031, 1041 and 1051 are wound and arranged around the winding core 2200. Since the heating wires 1031, 1041 and 1051 are one connected heating wire, the heating wire is wound from left to right or right to left shown in FIGS. 27 and 28. At this time, since the heating wire arranging portion 2201*b* and the heating wire arranging portion 2203*b* have a stepped shape, it becomes easy to understand the position to start winding the first turn.

Figure 29:
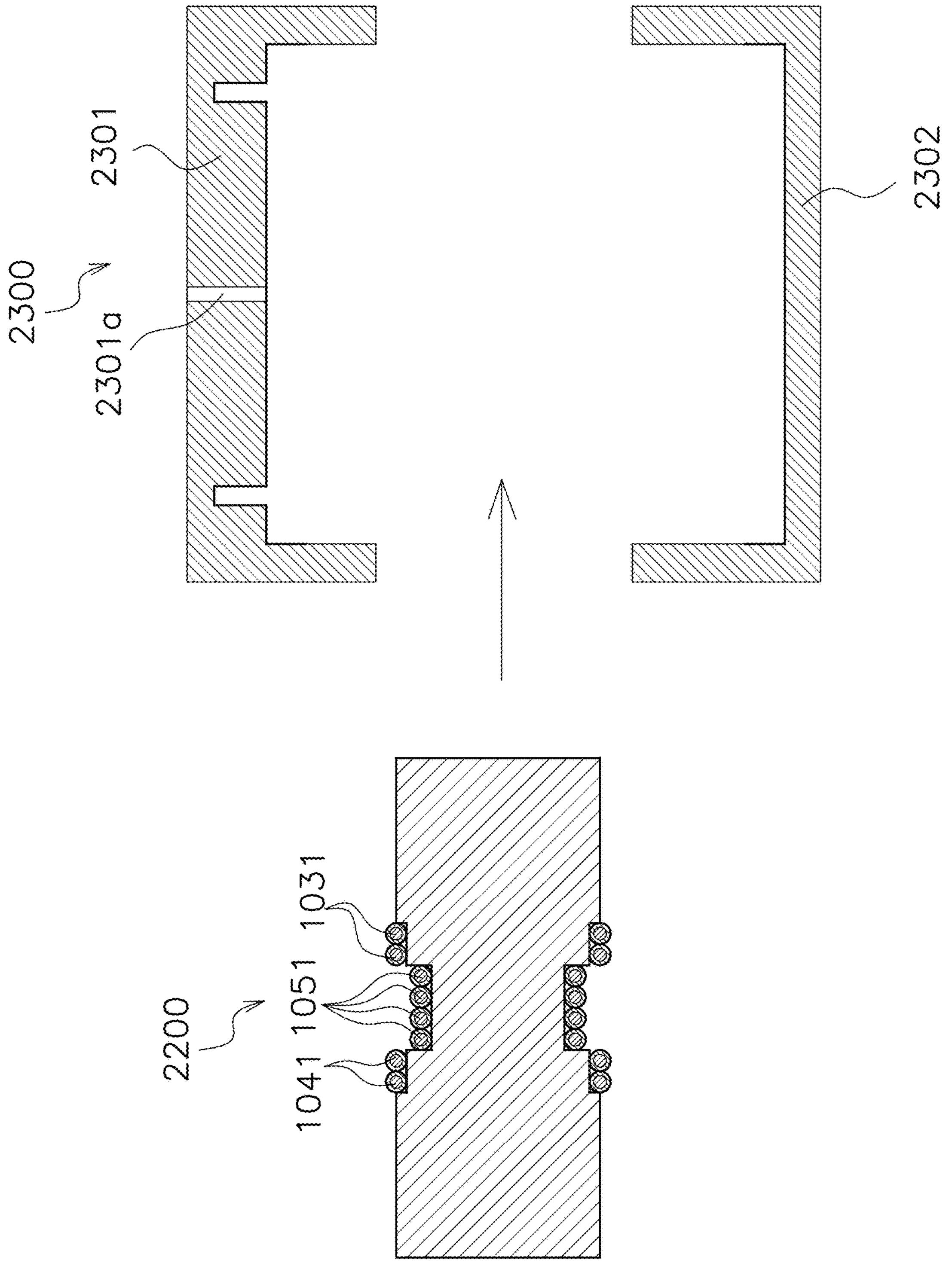
FIG. 29 is a view for explaining that the winding core is inserted into a mold when manufacturing the electrofusion joint according to the embodiment 3 according to the present disclosure.
Figure 30:
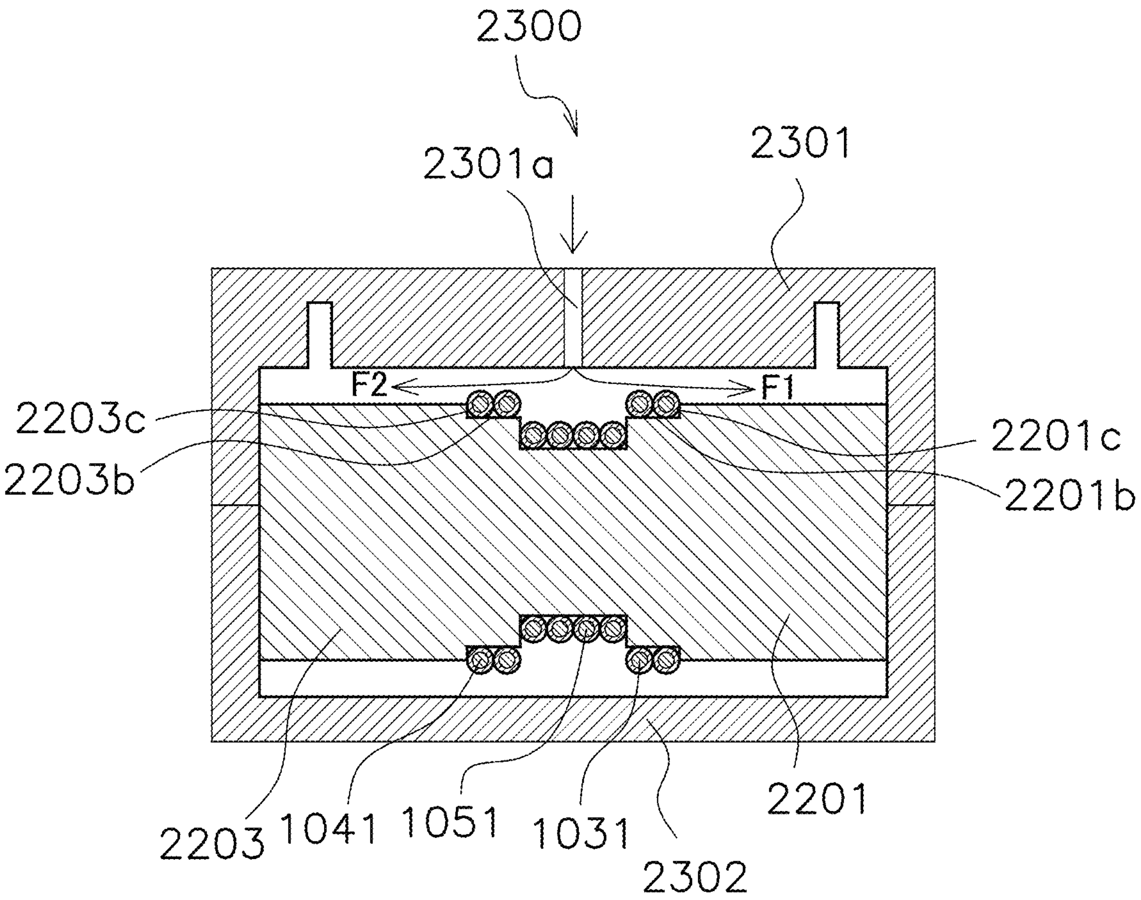
FIG. 30 is a view showing a state in which a winding core is disposed in a mold when manufacturing of the electrofusion joint according to the embodiment 3 according to the present disclosure.

After winding the heating wire around the winding core 2200, in step S2002, as shown in FIG. 29, the winding core 2200 in the state where the heating wire is wound is inserted into the mold 2300. As shown in FIGS. 29 and 30, the mold 2300 is divided into a first mold 2301 and a second mold 2302, and a winding core 2200 is inserted into the mold 2300. The gate 2301*a* for injecting the resin into the mold 2300 is arranged so as to face the outer peripheral surface 2202*a* of the second member 2202.

Next, in step S2003, as shown in FIG. 30, the resin is injected from the gate 2301*a* formed in the first mold 2301 to form the electrofusion joint 2001. Therefore, the resin flowing in from the gate 2301*a* spreads to the side of the first member 2201 and the side of the second member 2202 (left-right direction). At this time, the heating wires 1031 and 1041 are pushed by the flow of the resin (see arrows F1 and F2), but since the heating wire arranging portions 2201*b* and 2203*b* are formed in a stepped shape, the heating wires 1031 and 1041 can be suppressed by the stepped surfaces

2201*c* and 2203*c*, and it is possible to suppress from the heating wires 1031 and 1041 flowing to the outside (arrows F1 and F2 side).

Figure 31B:
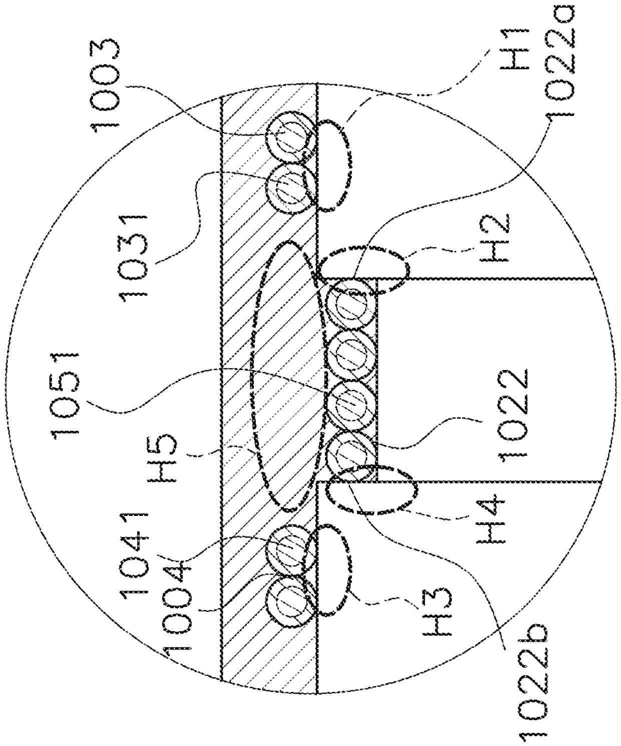
FIGS. 31(*a*) and (*b*) are views for explaining the influence on the temperature by the positional deviation.
Figure 31A:
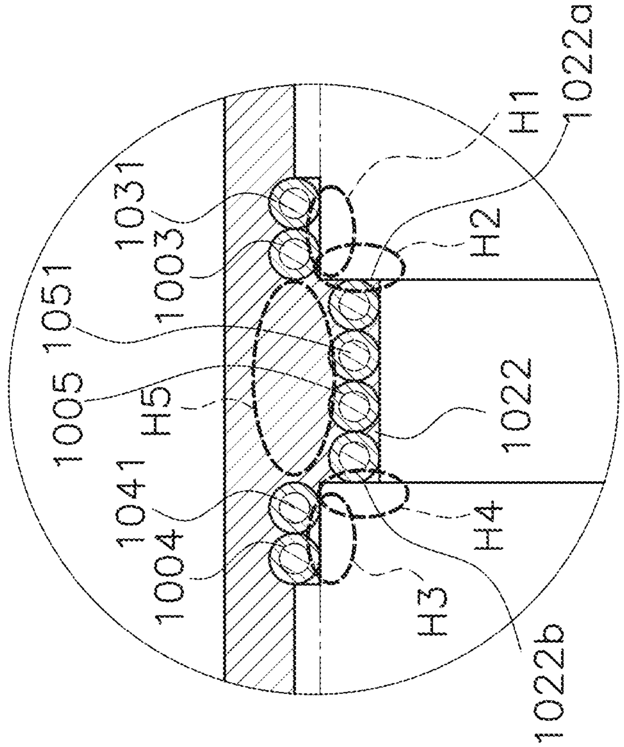

When the positions of the heating wires 1031 and 1041 move outward, the heating state of the stopper portion 1022 changes. FIG. 31(*a*) is a view showing a state in which the positions of the heating wires 1031 and 1041 are not displaced, and FIG. 31(*b*) is a view showing a state in which the positions of the heating wires 1031 and 1041 are displaced toward the outside. In this case, the regions where the temperature becomes high in FIG. 31(*a*) are shown by H1, H2, H3, H4, and H5. The region H1 is a region heated by the first heat generating section 1003. The region H2 is a region on the end face side of the stopper portion 1022 heated by the second heat generating section 1005. The region H3 is a region heated by the first heat generating section 1004. The region H4 is a region on the end face side of the stopper portion 1022 heated by the second heat generating section 1005. The region H5 is inside the stopper portion 1022 and is a region heated by the first heat generating sections 1003 and 1004 and the second heat generating section 1005.

When the heating wires 1031 and 1041 are displaced outward as shown in FIG. 31(*b*), the positions of the regions H1 and the region H3 are displaced, and the temperature of the region H5 is lower than that in the case of the configuration of FIG. 30(*a*). Further, the temperature of the outer peripheral edges of the first side surface 1022*a* and the second side surface 1022*b* of the stopper portion 22 is also lowered.

In this way, changes in temperature cause variations in fusion, but as in the electrofusion joint 2001 of the present embodiment, the position of the heating wire is stabilized by providing a stepped portion, and it is possible to improve the quality stability.

Next, in step S2004, after the resin is cooled, the molded electrofusion joint 2001 is taken out from the mold 2003.

As described above, the electrofusion joint 2001 can be manufactured.

In order to insert the resin pipes 1011 and 1012 into the electrofusion joint 1001' shown in FIG. 17, a clearance is required between the outer peripheral surfaces of the resin pipes 1011 and 1012 and the inner surface 1021*a* of the electrofusion joint. Therefore, the resin pipes 1011 and 1012 may be inserted diagonally with respect to the axis of the electrofusion joint 1001', and the fused portion may be slanted.

However, in the case of the electrofusion joint 2001 of the third embodiment, the following effects can be exhibited. Since the steps 2007 and 2008 are formed, the inner part is narrowed, and the resin pipes 1011 and 1012 are difficult to be inserted diagonally and the fused portion is hard to be slanted.

Embodiment 4

The electrofusion joint 3001 of the fourth embodiment according to the present disclosure will be described below.

(Overview of Electrofusion Joint 3001)

Figure 32:
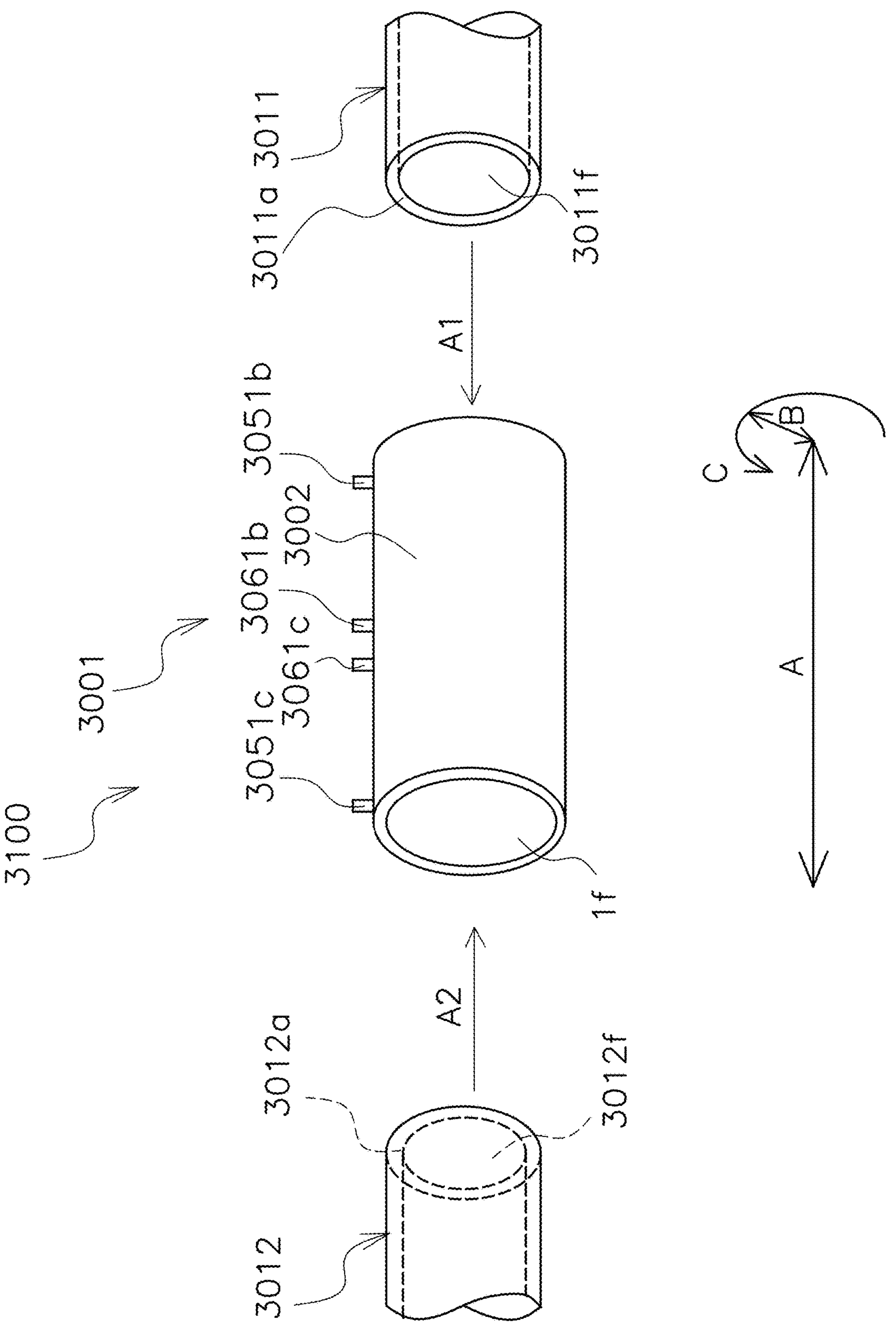
FIG. 32 is an external view showing an electrofusion joint and a resin pipe and a resin pipe connected to the electrofusion joint according to the embodiment 4 according to the present disclosure.

FIG. 32 is a view showing an electrofusion joint 3001 according to an embodiment of the present invention, and a resin pipe 3011 (an example of a pipe containing thermoplastic resin) and a resin pipe 3012 (an example of a pipe containing thermoplastic resin) that are connected by the electrofusion joint 3001. FIG. 32 could also be called an exploded view of a piping structure 3100. The piping structure 3100 includes, for example, the electrofusion joint 3001, the resin pipe 3011, and the resin pipe 3012.

As shown in the figure, the electrofusion joint 3001 is fused to the resin pipe 3011 and the resin pipe 3012, thereby connecting the resin pipe 3011 and the resin pipe 3012.

The resin pipe 3011 and the resin pipe 3012 are each made from a thermoplastic resin.

Flow paths 3011*f* and 3012*f* including a circular cross section extend through the inside of the resin pipe 3011 and the resin pipe 3012. A flow path 3001*f* including a circular cross section extends through the inside of the electrofusion joint 3001. In a state in which the resin pipe 3011 and the resin pipe 3012 are connected by the electrofusion joint 3001, the axes of the respective flow paths of the resin pipe 3011, the resin pipe 3012, and the electrofusion joint 3001 all fall along the same straight line.

The direction in which each axis extends in the flow paths of the electrofusion joint 3001, the resin pipe 3011, and the resin pipe 3012 is defined as the axial direction A. Also, the direction, which is orthogonal to the axes, of moving toward and away from the axes in the electrofusion joint 3001, the first resin pipe 3011, and the second resin pipe 3012 is defined as the radial direction B, and the direction around each axis is defined as the circumferential direction C.

The resin pipe 3011 is connected to the electrofusion joint 3001 by being moved in the direction of the arrow A1 relative to the electrofusion joint 3001. Also, the resin pipe 3012 is connected to the electrofusion joint 3001 by being moved in the direction of the arrow A2 relative to the electrofusion joint 3001. A state in which the first resin pipe 3011 and the second resin pipe 3012 have been connected by the electrofusion joint 3001 constitutes the piping structure 3100.

Figure 33:
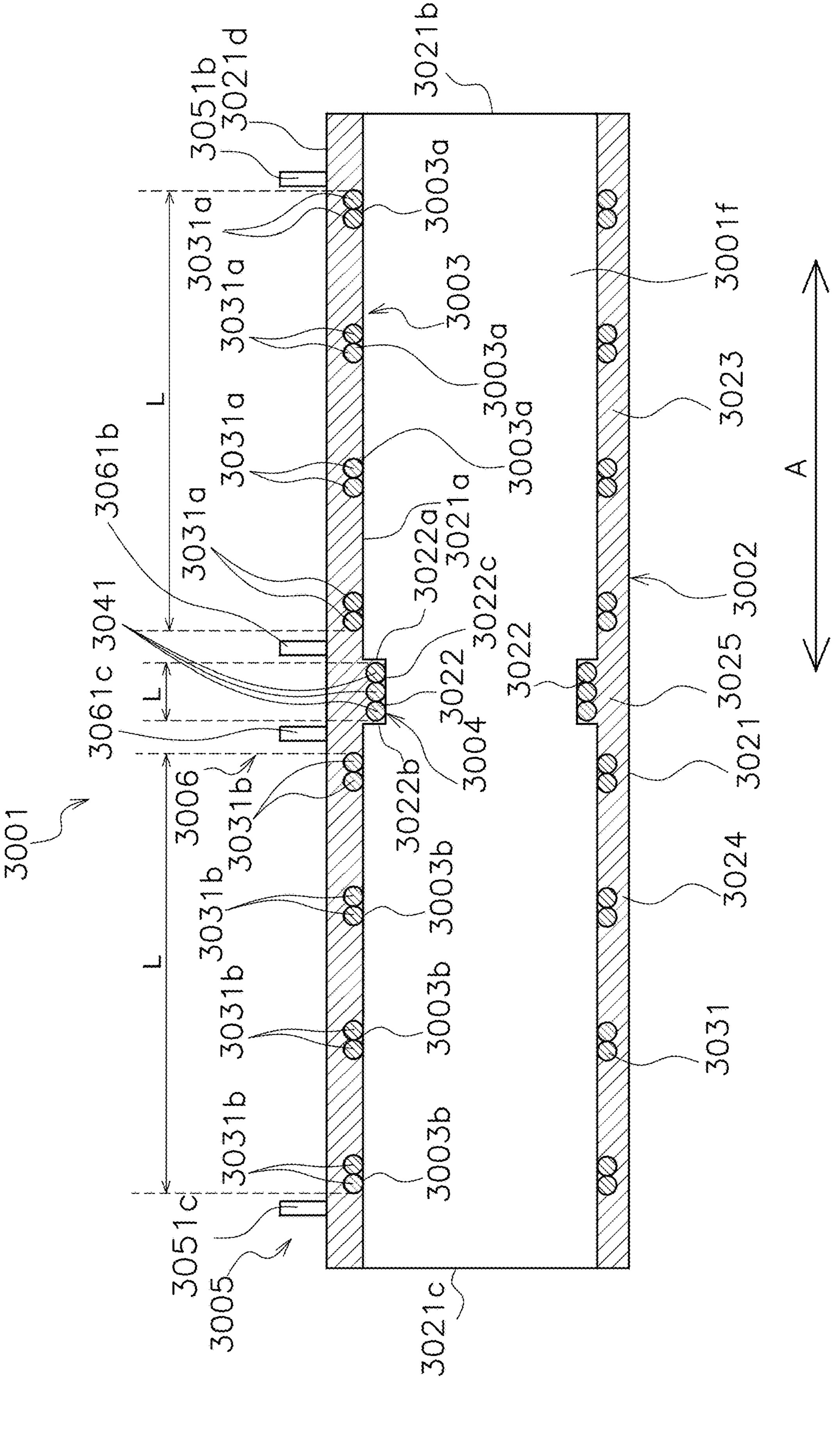
FIG. 33 is a cross-sectional configuration view showing the electrofusion joint of FIG. 32.

FIG. 33 is a view showing the cross-sectional configuration of the electrofusion joint 3001.

As shown in FIGS. 32 and 33, the electrofusion joint 3001 includes a main body 3002, a receiving heat generating section 3003, a stopper heat generating section 3004, and a first connector attachment portion 3005, and a second connector attachment portion 3006.

(Main Body 3002)

The main body 3002 is formed from a thermoplastic resin and has a tubular portion 21 and a stopper portion 22, as shown in FIG. 33. The tubular portion 3021 is tubular and includes a joint receiving portion 3023, a joint receiving portion 3024, and a continuous portion 3025. The resin pipe 3011 is inserted into the joint receiving portion 3023. The resin pipe 3012 is inserted into the joint receiving portion 3024.

There are no particular restrictions on the thermoplastic resin used in the main body 3002, but a resin having a melting point of less than 230° C. is preferable.

Figure 34:
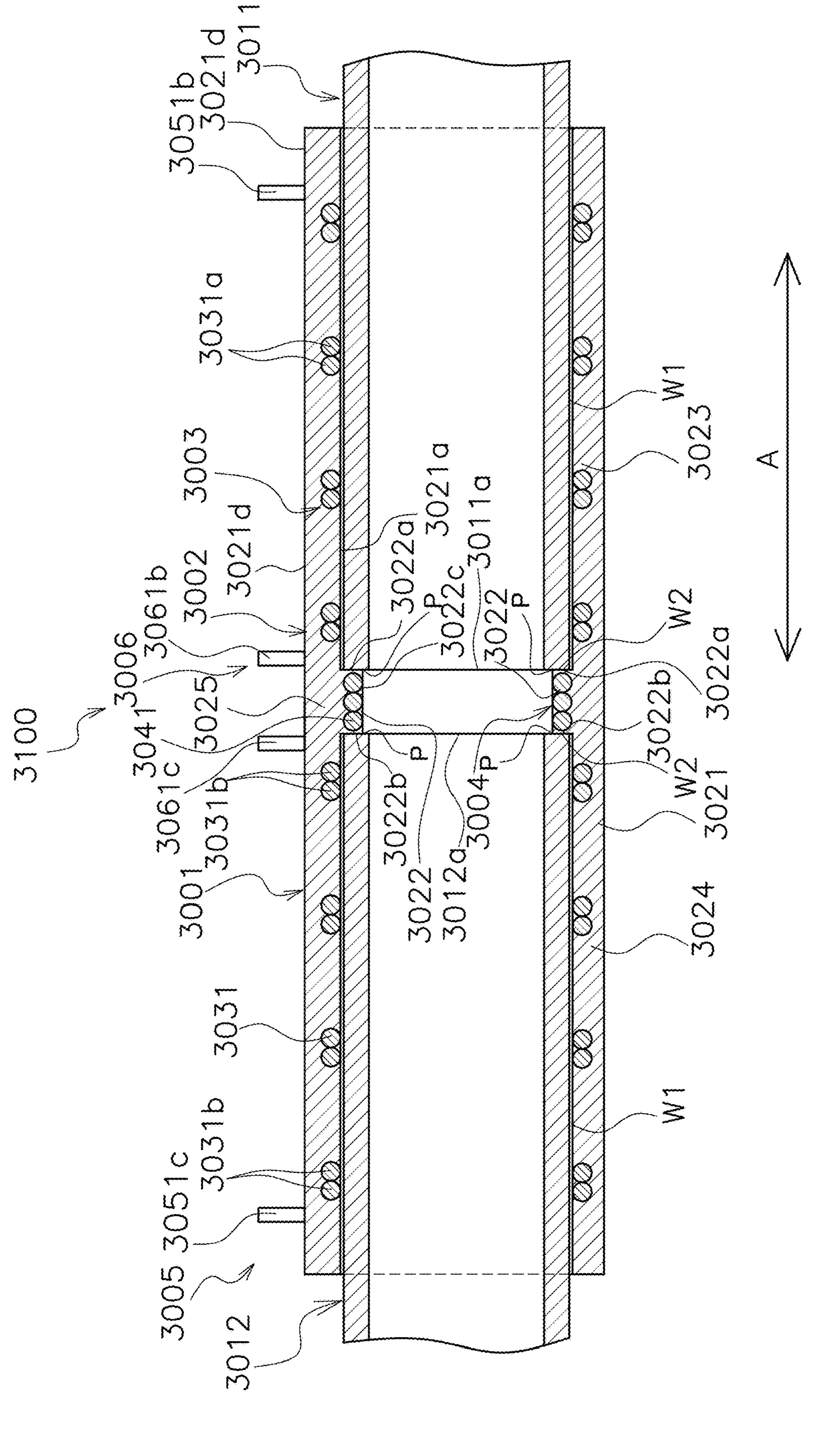
FIG. 34 is a cross-sectional configuration view showing a state in which the resin pipe and the resin pipe are inserted into the electrofusion joint of FIG. 32.

FIG. 34 is a cross-sectional configuration view showing a state in which the resin pipe 3011 has been inserted into the joint receiving portion 3023 of the electrofusion joint 3001 and the resin pipe 3012 has been inserted into the joint receiving portion 3024.

The inside diameter of the joint receiving portion 3023 equal to or larger than the outside diameter of the resin pipe 3011. The inside diameter of the joint receiving portion 3024 is equal to or larger than the outside diameter of the resin pipe 3012.

As shown in FIG. 33, the continuous portion 3025 is continuous with the joint receiving portion 3023 and the joint receiving portion 3024, and connects the joint receiving portion 3023 and the joint receiving portion 3024. The continuous portion 3025 is a portion that spans the joint receiving portion 3023 and the joint receiving portion 3024, and a stopper portion 3022 (discussed below) is provided inside the continuous portion 3025 in the radial direction B.

(Stopper Portion 3022)

The stopper portion 3022 is a portion having the shape of a circular ring. The stopper portion 3022 is formed on the inner surface 3021*a* of the tubular portion 3021, as a rib going all the way around in the circumferential direction C. The stopper portion 3022 also contains a thermoplastic resin, and is preferably formed from the same thermoplastic resin as that used in the tubular portion 3021.

As shown in FIG. 33, The stopper portion 3022 is formed so as to protrude inward in the radial direction from the inner surface 3021*a* of the tubular portion 3021. Also, the stopper portion 3022 is disposed inside the continuous portion 3025 of the tubular portion 3021 in the radial direction B. The stopper portion 3022 may be formed as a single member with the tubular portion 3021, or may be formed as a separate member apart from the tubular portion 3021.

The stopper portion 3022 includes a first side surface 3022*a*, a second side surface 3022*b*, and a peripheral surface 3022*c*. The peripheral surface 3022*c* is the end surface on the inner side of the stopper portion 3022 in the radial direction.

The first side surface 3022*a* is formed substantially perpendicular to the axial direction A, inward in the radial direction B from the inner surface 3021*a* of the tubular portion 3021.

The second side surface 3022*b* is formed substantially perpendicular to the axial direction A, inward in the radial direction B from the inner surface 3021*a* of the tubular portion 3021.

The peripheral surface 3022*c* connects the end on the inside in the radial direction of the first side surface 3022*a* to the end on the inside in the radial direction of the second side surface 3022*b*. The peripheral surface 3022*c* is formed substantially parallel to the inner surface 3021*a* of the tubular portion 3021.

When the resin pipe 3011 is inserted inside the joint receiving portion 3023, the stopper portion 3022 regulates the insertion position of the pipe end 3011*a* as shown in FIG. 34. As shown in FIG. 34 it should be noted that restricting the insertion position of the pipe end 3011*a* includes the case where the stopper portion 3022 directly regulates the insertion position by the pipe end 3011*a* coming into contact with the first side surface 3022*a* of the stopper portion 3022, and the case where the stopper portion 3022 indirectly regulates the insertion position by the pipe end 3011*a* coming into contact with the heating wire 3041 (described later) of the stopper heat generating section 3004.

When the resin pipe 3012 is inserted inside the joint receiving portion 3024, the stopper portion 3022 regulates the insertion position of the pipe end 3012*a* as shown in FIG. 34. As shown in FIG. 34, it should be noted that restricting the insertion position of the pipe end 3012*a* includes the case where the stopper portion 3022 directly regulates the insertion position by the pipe end 3012*a* coming into contact with the second side surface 3022*b* of the stopper portion 3022, and the case where the stopper portion 3022 indirectly regulates the insertion position by the pipe end 3012*a* coming into contact with the heating wire 3041 (described later) of the stopper heat generating section 3004.

In this embodiment, the occurrence of clevis is suppressed between the pipe end 3011*a* and the first side surface 3022*a* and between the pipe end 3012*a* and the second side surface 3022*b* (see position P).

(Receiving Heat Generating Section 3003)

Figure 35:
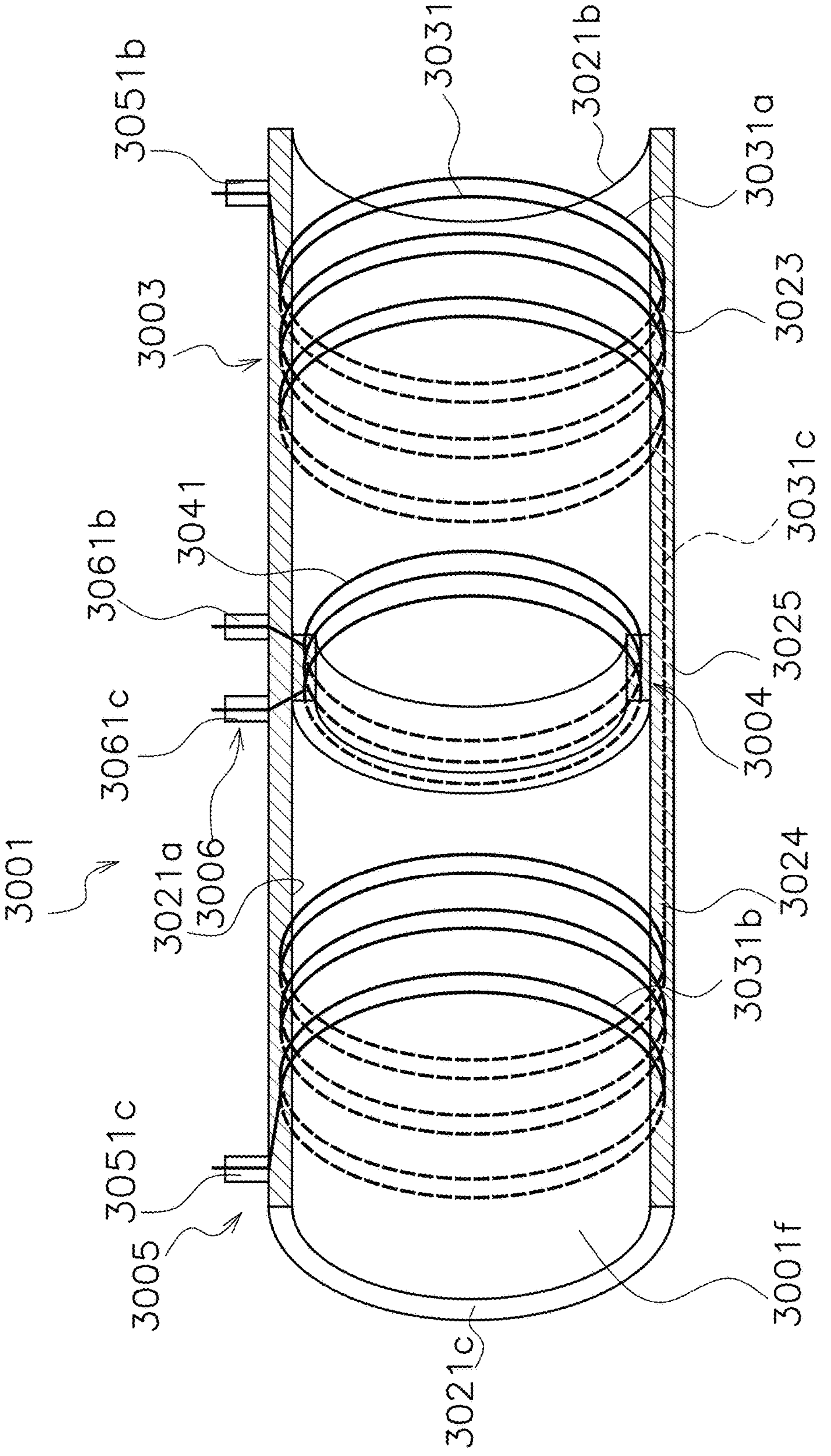
FIG. 35 is a schematic view of an electrofusion joint showing a connection relationship between a heat receiving portion and a stopper heat generating section and a first connector attachment portion and a second connector attachment portion in FIG. 34.

FIG. 35 is a schematic view of an electrofusion joint 3001 showing a connection relationship between the receiving heat generating section 3003 and the stopper heat generating section 3004 and the first connector attachment portion 3005 and the second connector attachment portion 3006. In FIG. 35, in order to facilitate understanding, the configuration of winding the heating wire 3031 in the receiving heat generating section 3003 is simplified.

As shown in FIGS. 33 and 35, the receiving heat generating section 3003 is provided in the joint receiving portion 3023 and the joint receiving portion 3024.

The receiving heat generating section 3003 includes a heating wire 3031 embedded in the inner surface 3021*a* of the joint receiving portion 3023 and the joint receiving portion 3024.

The heating wire 3031 is arranged so as to be wound in the circumferential direction along the inner surface 3021*a* in the joint receiving portion 3023 and the joint receiving portion 3024. The heating wire 3031 is arranged in the vicinity of the inner surface 3021*a*. The heating wire 3031 may be partially embedded in the tubular portion 3021 so as to be partially exposed on the flow path 3001*f* side, or may be completely embedded.

For the sake of clarity, the portion of the heating wire 3031 arranged at the joint receiving portion 3023 is referred to as the heating wire portion 3031*a*, and the portion of the heating wire 3031 arranged at the joint receiving portion 3024 is referred to as the heating wire portion 3031*b*.

The heating wire portion 3031*c*, which is a portion of the heating wire 3031, connecting the heating wire portion 3031*a* and the heating wire portion 3031*b* is embedded in the continuous portion 3025.

The heating wire portion 3031*c* is located on the outer peripheral side of the stopper heat generating section 3004. The heating wire portion 3031*c* is arranged so as not to come into contact with the heating wire 3041 provided in the stopper heat generating section 3004.

Although one heating wire 3031 is arranged over the joint receiving portion 3023, the joint receiving portion 3024, and the continuous portion 3025, each of the heating wire portion 3031*a*, the heating wire portion 3031*b*, and the heating wire portion 3031*c* may be composed of separate heating wires, to which the heating wires may be connected.

The heating wire 3031 may include, for example, a conducting wire and an insulating film. As the conducting wire, for example, a nichrome wire, an iron chromium type 2 wire, an iron chromium type 1 wire, a nickel chromium wire, or the like can be used. The insulating film is provided so as to cover the periphery of the conducting wire. The insulating film has a melting point of 230° C. or higher. It is preferable that this is set to a temperature at which the insulating film does not melt even at a temperature at which the thermoplastic resin melts (for example, in the case of polyethylene, the heating wire is heated to 220° C.) in the present embodiment. The insulating film can be formed of, for example, a fluorine-based resin or an imide-based resin, but it is more preferable to form the insulating film with a polyimide-based resin. For example, the thickness of the conducting wire may be set to 0.1 mm or more and 10 mm or less. Further, the heating wire 3031 generates heat at about 180 to 230° C.

The arrangement of the heating wire 3031 in the receiving heat generating section 3003 will be described. Since the receiving heat generating section 3003 is provided symmetrically with respect to the stopper portion 3022, the heating wire 3031 arranged in the joint receiving portion 3023 will be described.

The heating wire portion 3031*a* is arranged so that the heating wire density in the joint receiving portion 3023 is smaller than the heating wire density in the stopper heat generating section 3004 described later.

In the joint receiving portion 3023, the heating wire 3031 is wound around twice so that the wound parts of the heating wire come into contact with each other, and a predetermined interval is provided along the axial direction A, and the heating wire 3031 is wound around twice so that the wound parts of the heating wire 3031 come into contact with each other. Such a configuration is repeated. In the present embodiment, the heating wire 3031 is wound around eight turns.

The portion in which the heating wire 3031 is wound around twice so that the wound part of the heating wire 3031 comes into contact with each other in the joint receiving portion 3023 is referred to as a heat generating portion 3003*a*. It can be said that a portion of which the receiving heat generating section 3003 is arranged on the joint receiving portion 3023 includes a plurality of heat generating portions 3003*a*, and the heat generating portions 3003*a* are disposed along the axial direction A with a predetermined interval. The portion in which the heating wire 3031 is wound around twice so that the wound part of the heating wire 3031 comes into contact with each other in the joint receiving portion 3024 is referred to as a heat generating portion 3003*b*. It can be said that a portion of which the receiving heat generating section 3003 is arranged on the joint receiving portion 3024 includes a plurality of heat generating portions 3003*b*, and the heat generating portions 3003*b* are disposed along the axial direction A with a predetermined interval.

Further, defining that the length of the region where the heating wire 3031 is arranged along the axial direction A as L, in FIG. 33, in the present embodiment, eight lines of the heating wire 31 are arranged in the length L. The length L can be said to be the length of the receiving heat generating section 3003 along the axial direction A or the length of the heating wire 3031 along the axial direction A.

Here, assuming that the outer diameter of the heating wire 3031 is 1 mm and the predetermined interval is 5 mm, since there are eight lines of the heating wire at L=23 mm, the heating wire density in the first heat generating section 3 is 0.35 (lines/mm)≈8 (lines)/23 (mm).

In this way, the heating wire density is defined as the number of lines of the heating wire per unit length (for example, 1 mm). The heating wire density can be obtained as a value by dividing the number of lines of the heating wire 3031 disposed at the length L along the axial direction A of the region where the heating wire 3031 is disposed by the length L.

The clearance W1 (see FIG. 34) between the inner peripheral surface of the joint receiving portion 3023 and the outer peripheral surface of the resin pipe 3011 and the clearance W1 between the inner peripheral surface of the joint receiving portion 3024 and the outer peripheral surface of the resin pipe 3012 are filled with the molten resin, and the joint receiving portion 3023 and the resin pipe 3011, and the joint receiving portion 3024 and the resin pipe 3012 are fused.

(First Connector Attachment Portion 3005)

As shown in FIG. 33, the first connector attachment portion 3005 has two pins 3051*b* and 3051*c* (an example of a pair of first terminals). The two pins 3051*b* and 3051*c* are provided so as to project outward in the radial direction from the outer surface 3021*d* of the tubular portion 3021. As shown in FIG. 33, one pin 3051*b* of the two pins 3051*b* and 3051*c* is arranged near the end 3021*b* of the tubular portion 3021, and the other pin 3051*c* is arranged near the end 3021*c*.

As shown in FIG. 35, one end of the heating wire 3031 of the receiving heat generating section 3003 on the joint receiving portion 3023 side is connected to the pin 3051*b*. The end of the heating wire 3031 of the receiving heat generating section 3003 on the joint receiving portion 3024 side is connected to the pin 3051*c*. By attaching the first connectors 3081 of the electrofusion device 3008 to the pin 3051*b* and the pin 3051*c* and turning on electricity, the receiving heat generating section 3003 can generate heat.

The time to turn on electricity to the receiving heat generating section 3003 may be set to 1 minute when the nominal diameter is 50 mm, and may be set to 10 minutes when the nominal diameter is 300 mm.

(Stopper Heat Generating Section 3004)

The stopper heat generating section 3004 is provided in the stopper portion 3022. The stopper heat generating section 3004 includes a heating wire 3041. The heating wire 3041 is provided on the stopper portion 3022 so as to be wound in the circumferential direction C along the axial direction A. In the present embodiment, the heating wire 3041 is wound around the stopper portion 3022, for example, three turns. In the stopper heat generating section 3004 of the present embodiment, the adjacent parts of the heating wires 3041 are all in contact with each other.

As the heating wire 3041, the same material and structure as the heating wire 3031 can be used. The heating wire 3041 generates heat at about 180 to 230° C.

In the stopper heat generating section 3004, the heating wire 3041 is wound three times so that the wound parts of the heating wire 3041 comes into contact with each other. Therefore, three lines of heating wire 3041 are disposed in the length L (which can be said to be the length of the second heat generating section 3004) along the axial direction A of the region where the heating wire 3041 is disposed.

The diameter of the wound heating wire 3041 in the stopper heat generating section 3004 is set to be smaller than the diameter of the wound heating wires 3031 in the receiving heat generating section 3003.

Further, the diameter of the wound heating wire 3041 in the stopper heat generating section 3004 is set so that the position of the heating wire 3041 is within the pipe wall thickness of the resin pipes 3011 and 3012 inserted.

As described above, assuming that the diameter of the heating wire is 1 mm, the heating wire density in the stopper heat generating section 3004 is set to 1 (lines/mm)=3 (lines)/3 (mm).

As described above, the heating wire density in the receiving heat generating section 3003 is about 0.35. Therefore, in the present embodiment, the heating wire density in the receiving heat generating section 3003 is set smaller than the heat wire density in the stopper heat generating section 3004.

The arrangement of the heating wire 3041 in the stopper heat generating section 3004 is not limited to the configuration of this embodiment, and the wound parts of the heating wire 3041 may not be in contact with each other. Further, it is not necessary that three lines of the heating wire 3041 are arranged along the axial direction A, one portion in the middle of the three lines may not be provided, and that portion is filled with the resin forming the stopper portion 3022.

The heating wire density in the above-mentioned receiving heat generating section 3003 is not limited to the configuration shown in FIG. 33, and in the present embodiment, the heating wire 3031 is wound so that two wound parts of the heating wire 3031 are contact with each other, but this embodiment does not have to be limited to this. For example, the heating wire 3031 may be wound so that the three turns are in contact with each other, or the heating wire 3031 may be wound around at intervals so that turns of the heating wire 3031 do not come into contact with each other.

By generating heat from the stopper heat generating section 3004, the clearance W2 (see FIG. 34) between the first side surface 3022*a* of the stopper portion 3022 and the pipe end 3011*a* of the resin pipe 3011, and the clearance W2 between the second side surface 3022*b* of the stopper portion 3022 and the pipe end 3012*a* of the resin pipe 3012 are filled with the molten resin, and the stopper portion 3022, the resin pipe 3011 and the stopper portion 3022 are fused.

(Second Connector Attachment Portion 3006)

As shown in FIG. 33, the second connector attachment portion 3006 includes two pins 3061*b* and 3061*c* (an example of a pair of second terminals). The two pins 3061*b* and 3061*c* are provided so as to project outward in the radial direction from the outer surface 3021*d* of the tubular portion 3021. The two pins 3061*b* and 3061*c* are arranged side by side along the axial direction A near the center of the tubular portion 3021.

One pin 3061*b* of the two pins 3061*b* and 3061*c* is arranged on the end 3021*b* side, and the other pin 3061*c* is arranged on the end 3021*c* side.

As shown in FIG. 35, one end of the heating wire 3041 is connected to the pin 3061*b*, and the other end of the heating wire 3041 is connected to the pin 3061*c*. By attaching the connectors of the electrofusion device to the pin 3061*b* and the pin 3061*c* and turning on electricity to the pin 3061*b* and 3061*c*, the stopper heat generating section 3004 can be heated.

The energizing time of the stopper heat generating section 3004 is about one-fifth of the energizing time of the receiving heat generating section 3003. For example, when the nominal diameter is 50 mm, the energizing time is set to 20 seconds, and when the nominal diameter is 300 mm, it may be set to 2 minutes.

As described above, since the first connector attachment portion 3005 for generating heat of the receiving heat generating section 3003 and the second connector attachment portion 3006 for generating heat of the stopper heat generating section 3004 are separately provided, the energization timing of the receiving heat generating section 3003 can be shifted from the energizing timing of the stopper heat generating section 3004. That is, it is possible to start energizing the receiving heat generating section 3003 after starting the energization of the stopper heat generating section 3004, or to start energizing the stopper heat generating section 3004 after starting the energizing of the receiving heat generating section 3003.

(Electrofusion Device 3008)

Figure 36:
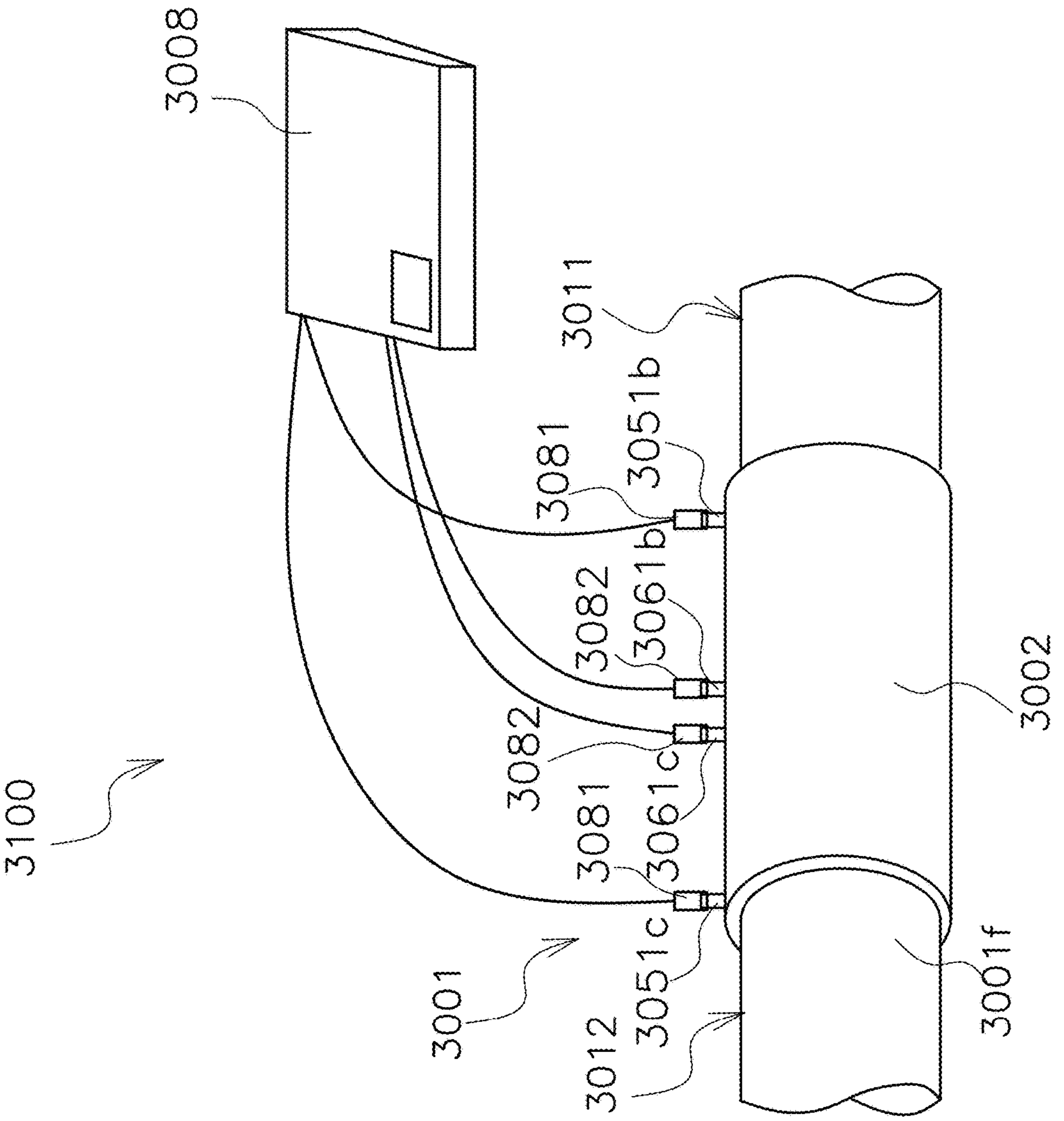
FIG. 36 is a schematic view showing a state in which the electrofusion joint is energized by an electrofusion device.

Next, the electrofusion device 3008 that energizes the electrofusion joint 3001 will be described. FIG. 36 is a schematic view showing a state in which the electrofusion joint 3001 is energized by the electrofusion device 3008.

The electrofusion device 3008 includes, for example, a pair of first connectors 3081 attached to pins 3051*b* and 3051*c*, and a pair of second connectors 3082 attached to pins 3061*b* and 3061*c*.

The electrofusion device 3008 may be provided with, for example, a first energization switch that energizes the pair of first connectors 3081 and a second energization switch that energizes the pair of second connectors 3082. In this case, after operating the second energizing switch to start energizing the stopper heat generating section 3004, the first energizing switch can be operated to start energizing the receiving heat generating section 3003. Further, after operating the first energization switch to start energizing the receiving heat generating section 3003, the second energizing switch may be operated to start energizing the stopper heat generating section 3004.

The time from the start of energization to one heat generating portion of the stopper heat generating section 3004 and the receiving heat generating section 3003 to the start of energizing the other heating portion is preferably time after the clearance on the side where one of the heat generating portions is provided is filled with resin. It should be noted that the term "filled with resin" may be filled with molten resin, or it may not be limited to be filled with solidified resin. Further, although it depends on the performance of the electrofusion joint 3001, the coil and the nominal diameter, the energization to the other heat generating section may be started about 10 to 20 seconds after the start of energization to the one heat generating section. Further, after the resin has hardened on one heat generating section side, energization to the other heat generating section may be started.

Further, the electrofusion device 3008 may automatically energize the first connector 3081 and the second connector 3082 based on a preset program. When the control is started, energization to one of the heat generating sections of the stopper heat generating section 3004 and the receiving heat generating section 3003 is started, and after a preset time, energization to the other heat generating section is started. Then, the electrofusion device 3008 stops energization when a preset energization time for each heat generating section elapses.

In this case, the electrofusion device 3008 includes a processor and a storage device. The processor is, for example, a CPU (Central Processing Unit). Alternatively, the processor may be a processor different from the CPU. The processor executes a process for controlling energization according to a program. The storage device includes a non-volatile memory such as ROM (Read Only Memory) and a volatile memory such as RAM (Random Access Memory). The storage device may include a hard disk or an auxiliary storage device such as an SSD (Solid State Drive). A storage device is an example of a non-transitory computer-readable recording medium. The storage device stores programs and data for controlling the electrofusion device 3008. The storage device stores, for example, data of a terminal range described later and a predetermined threshold value of the operation speed.

<Connection Method>

Figure 37:
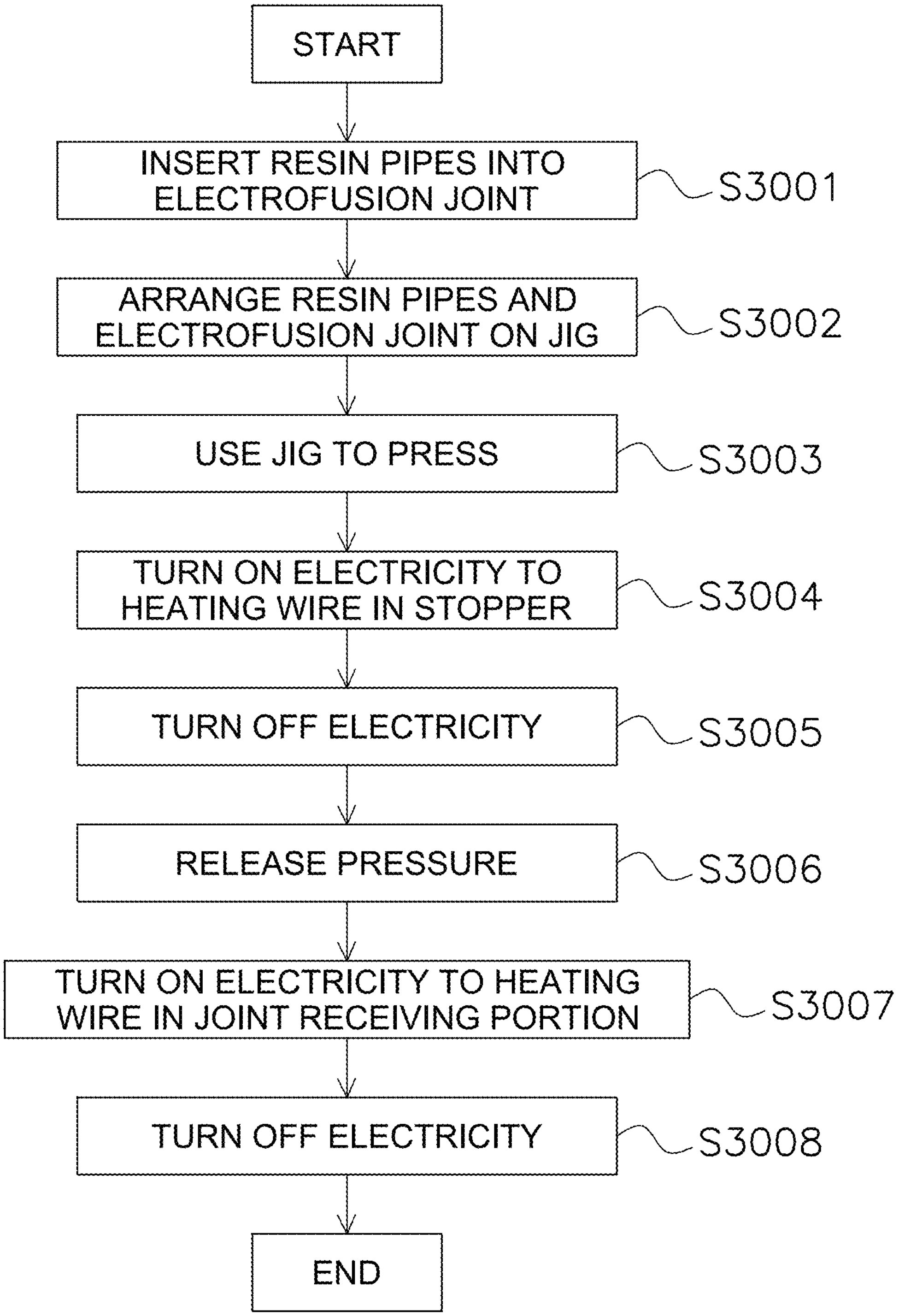
FIG. 37 is a flow chart for explaining a fusion method using the electrofusion joint of FIG. 32.

Next, the connection method of the embodiment according to the present disclosure will be described. FIG. 37 is a flow chart for explaining the connection method of the present embodiment.

In the present embodiment, the end face of the resin pipe is fused by energizing the stopper heat generating section 3004, and then the side surface of the resin pipe is fused by energizing the receiving heat generating section 3003. In the connection method of the present embodiment, the jig 1200 described in the second embodiment is used.

First, in step S3001, the resin pipe 3011 is inserted inside the joint receiving portion 3023 of the electrofusion joint 3001 until the relative movement of the pipe end 3011*a* of the resin pipe 3011 is restricted by the stopper portion 3022.

Further, the resin pipe 3012 is inserted inside the joint receiving portion 3024 of the electrofusion joint 3001 until the stopper portion 3022 restricts the relative movement of the pipe end 3012*a* of the resin pipe 3012. FIG. 34 shows a state in which the resin pipe 3011 and the resin pipe 3012 are inserted into the electrofusion joint 3001. Step S3001 corresponds to an example of the insertion step.

Next, in step S3002 (an example of the arrangement step), the electrofusion joint 3001 and the resin pipes 3011 and 3012 are fixed to the jig 1200, and in step S3003 (an example of the pressurizing step), a load is applied to the first clamp portion 1210 toward the second clamp portion 1220 by the urging force of the pressing portion 1240. By applying a load to the first clamp portion 1210 toward the second clamp portion 1220, the pipe end 3011*a* of the resin pipe 3011 is pressed against the first side surface 3022*a* of the stopper portion 3022, and the pipe end 3012*a* of the resin pipe 3012 is pressed against the second side surface 3022*b* of the stopper portion 3022.

Next, in step S3004, the second connectors 3082 of the electrofusion device 3008 are attached to the two pins 3061*b* and 3061*c* of the second connector attachment portion 3006, and energization is started. The heating wire temperature at the time of energization may be any temperature as long as it can melt the main body 3002, and in the case of polyolefin, it is preferably 220° C. or less. This energization causes the heating wire 3041 to generate heat. Step S3003 corresponds to an example of a first energization step.

Since the stopper portion 3022 is melted by energization and the width in the axial direction A becomes smaller and the applied load becomes smaller, by moving the nut 1242 toward the second clamp portion 1220 side, the load applied to the first clamp portion 1210 by the spring 1241 can be secured. It is desirable that the load does not change even when the pipe ends 3011*a* and 3012*a* melt, but it may change.

Next, in step S3005, the energization of the pins 3061*b* and 3061*c* is stopped. As a result, the pipe ends 3011*a* and 3012*a* and the stopper portion 3022 are fused. After the energization is stopped, the next step S3006 may be executed after a cooling time or the next step S3006 may be executed immediately. Further, the pressurization by the pressing portion 1240 may be performed after the energization in step S3004.

Next, in step S3006, the position of the nut 1242 is adjusted so that the urging force by the pressing portion 1240 is not generated. The pressurization by the pressing portion 1240 may be released at the same time as the energization of the pins 3061*b* and 3061*c* is stopped, or may be released shortly before the energization is stopped, and when a cooling time is provided, the pressurization may be released after the end of the cooling time.

Next, in step S3007, the first connectors 3081 of the electrofusion device 3008 are attached to the two pins 3051*b* and 3051*c* of the first connector attachment portion 3005, and energization is performed for a predetermined time. This energization causes the heating wire 3031 to generate heat. Step S3006 corresponds to an example of a second energization step. In this way, when the heating wire 3031 is heated, the pressing pressure by the pressing portion 1240 is set so as not to be applied.

Next, after the predetermined time has elapsed from step S3007, in step S3008, energization of the two pins 3051*b* and 3051*c* by the electrofusion device 3008 is completed.

Figure 38A:
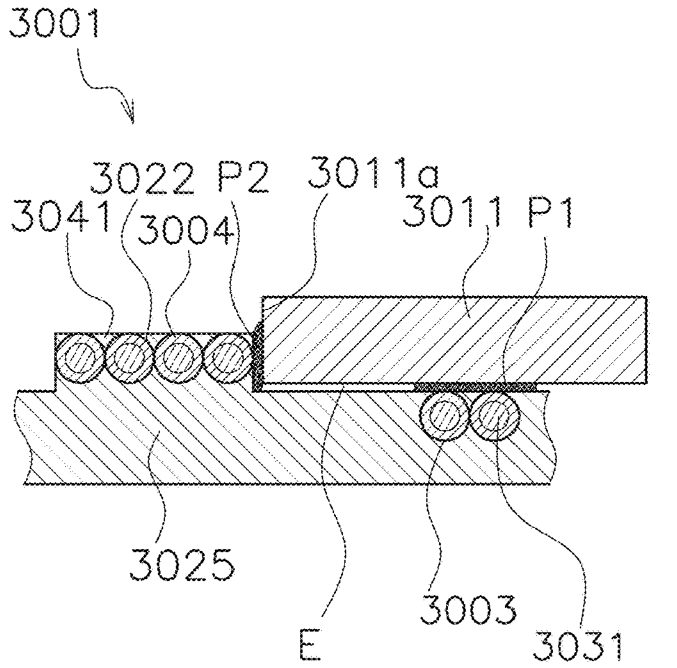
FIGS. 38(*a*) and (*b*) are views for explaining the effect by the connection method between the electrofusion joint and the resin pipe according to the embodiment 4 according to the present disclosure.
Figure 38B:
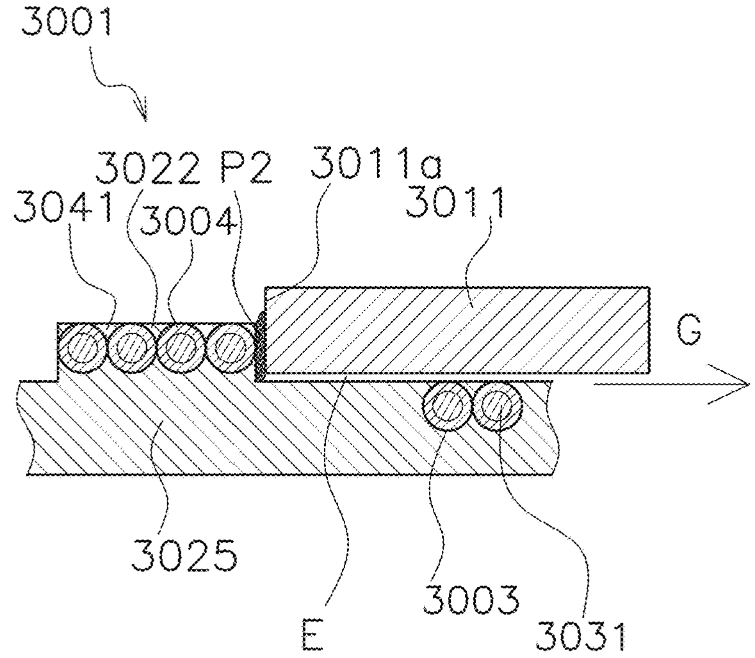

FIG. 38(*a*) is an enlarged view of the vicinity of the stopper portion 3022. As shown in FIG. 38(*a*), in the portion (cold zone) between the stopper heat generating section 3004 and the receiving heat generating section 3003, there is air in the clearance (indicated by E in the figure) between the inner surface of the electrofusion joint 3001 and the outer surface of the resin pipe 3011. When the heating of the stopper heat generating section 3004 and the heating of the receiving heat generating section 3003 is started at the same time, the fusion (the fused portion is indicated by P2 in the figure) between the stopper portion 3022 provided with the stopper heat generating section 3004 and the pipe end 3011*a* of the resin pipe 3011 and the fusion (the fused portion is indicated by P1 in the figure) between the inner surface of the portion of the joint receiving portion 3023 where the receiving heat generating section 3003 is provided and the outer surface of the resin pipe 3011 proceeds at the same time. Therefore, air in the clearance E may be expanded by heat in a state of being confined between the fused portions P1 and P2, and the bead R may be ejected and a depression is generated (see also FIG. 11).

On the other hand, as shown in FIG. 38(*b*), in the present embodiment, by fusing the pipe end 3011*a* and the stopper portion 3022 in the first fusion, air can escape from the receiving heat generating section 3003 side (see arrow G). By creating an escape route for air in this way, it is possible to suppress the ejection of beads and the occurrence of bubble cracking.

Example 1

The electrofusion joint with the following changes to the electrofusion joint 3001 of the fourth embodiment and the resin pipes 3011 and 3012 are fused.

- The number of turns of the heating wire 3041 in the stopper heat generating section 3004 is changed to 4 turns.
- the number of heat generating portions 3003*a* and 3003*b* of the receiving heat generating section 3003 along the axial direction A is changed to 2, and the number of turns of each heating wire 3031 of each of the heat generating portions 3003*a* and 3003*b* is changed to 4 turns.

Further, when the electrofusion joint and the resin pipe are connected, the stopper heat generating section 3004 and the receiving heat generating section 3003 are heated at the same time.

Example 2

The electrofusion joint with the following changes to the electrofusion joint 3001 of the fourth embodiment and the resin pipes 3011 and 3012 are fused.

- The number of turns of the heating wire 3041 in the stopper heat generating section 3004 is changed to 4 turns.
- the number of heat generating portions 3003*a* and 3003*b* of the receiving heat generating section 3003 along the axial direction A is changed to 2, and the number of turns of each heating wire 3031 of each of the heat generating portions 3003*a* and 3003*b* is changed to 4 turns.

The connection between the electrofusion joint and the resin pipe is performed by the procedure shown in the flow chart of FIG. 37.

As shown in (Table 6) below, in the electrofusion joint of Example 1 in which heating is performed at the same time, bead ejection may occur or the bead may be dented, although it is within the permissible range. In the electrofusion joint of Example 2, the generation of bead ejection and the depression of the bead could be suppressed.

TABLE 6

| | Example 1 | Example 2 |
|---|---|---|
| Number of turns of the receiving heat generating section | 2 × 4 line (dispersion) | 2 × 4 line (dispersion) |
| Number of turns of the stopper heat generating section | 4 | 4 |
| Presence or absence of pressing pressure during fusion | Presence | Presence |
| Timing of applying pressing pressure | Simultaneously with the start of fusion | Simultaneously with the start of fusion |
| Bead erupt or Depression judgment Visual confirmation after cutting | Δ | ○ |

Embodiment 5

Hereinafter, the embodiment according to the present disclosure will be described with reference to the drawings.

<Structure>

(Overview of Piping Structure 4100)

Figure 39:
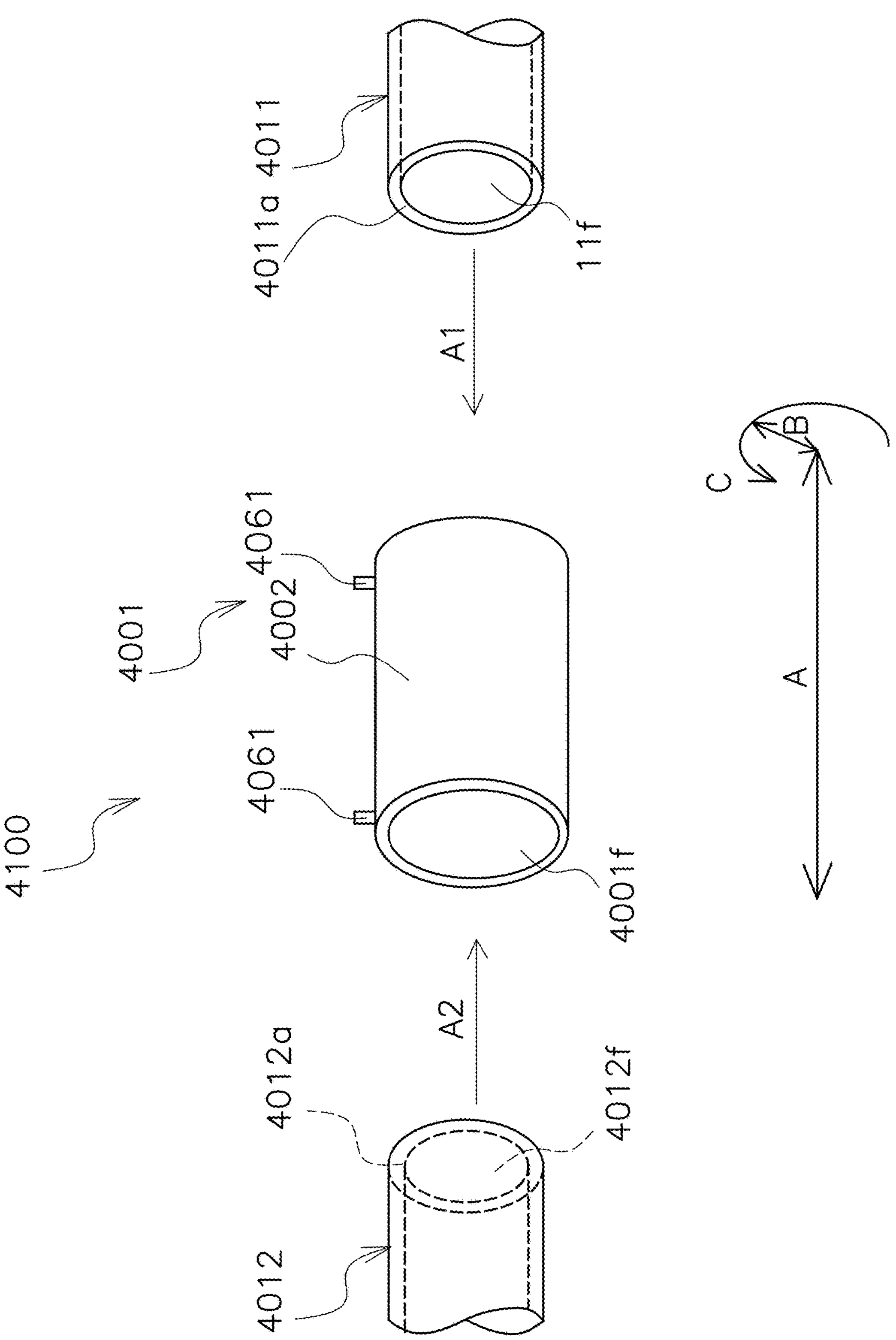
FIG. 39 is an external view showing an electrofusion joint, and a resin pipe and a resin pipe connected to the electrofusion joint according to the embodiment 5 according to the present disclosure.

FIG. 39 is a view showing an electrofusion joint 4001 according to an embodiment of the present disclosure, and a resin pipe 4011 (an example of a pipe) and a resin pipe 4012 (an example of a pipe) that are connected by the electrofusion joint 4001. FIG. 39 could also be called an exploded view of a piping structure 4100. The piping structure 4100 includes, for example, the electrofusion joint 4001, the resin pipe 4011, and the resin pipe 4012.

As shown in the figure, the electrofusion joint 4001 is fused to the resin pipe 4011 and the resin pipe 4012, thereby connecting the resin pipe 4011 and the resin pipe 4012.

The resin pipe 4011 and the resin pipe 4012 are each made from a thermoplastic resin. Specifically, the resin pipe 4011 and the resin pipe 4012 are made from a polyolefin such as polyethylene.

Flow paths 4011*f* and 4012*f* including a circular cross section extend through the inside of the resin pipe 4011 and the resin pipe 4012. A flow path 4001*f* including a circular cross section extends through the inside of the electrofusion joint 4001. In a state in which the resin pipe 4011 and the resin pipe 4012 are connected by the electrofusion joint 4001, the axes of the respective flow paths of the resin pipe 4011, the resin pipe 4012, and the electrofusion joint 4001 all fall along the same straight line.

The direction in which each axis extends in the flow paths of the electrofusion joint 4001, the resin pipe 4011, and the resin pipe 4012 is defined as the axial direction A. Also, the direction, which is orthogonal to the axes, of moving toward and away from the axes in the electrofusion joint 4001, the first resin pipe 4011, and the second resin pipe 4012 is defined as the radial direction B, and the direction around each axis is defined as the circumferential direction C.

The resin pipe 4011 is connected to the electrofusion joint 4001 by being moved in the direction of the arrow A1 relative to the electrofusion joint 4001. Also, the resin pipe 4012 is connected to the electrofusion joint 4001 by being moved in the direction of the arrow A2 relative to the electrofusion joint 4001. A state in which the resin pipe 4011 and the resin pipe 4012 have been connected by the electrofusion joint 4001 constitutes the piping structure 4100.

(Electrofusion Joint 4001)

Figure 40:
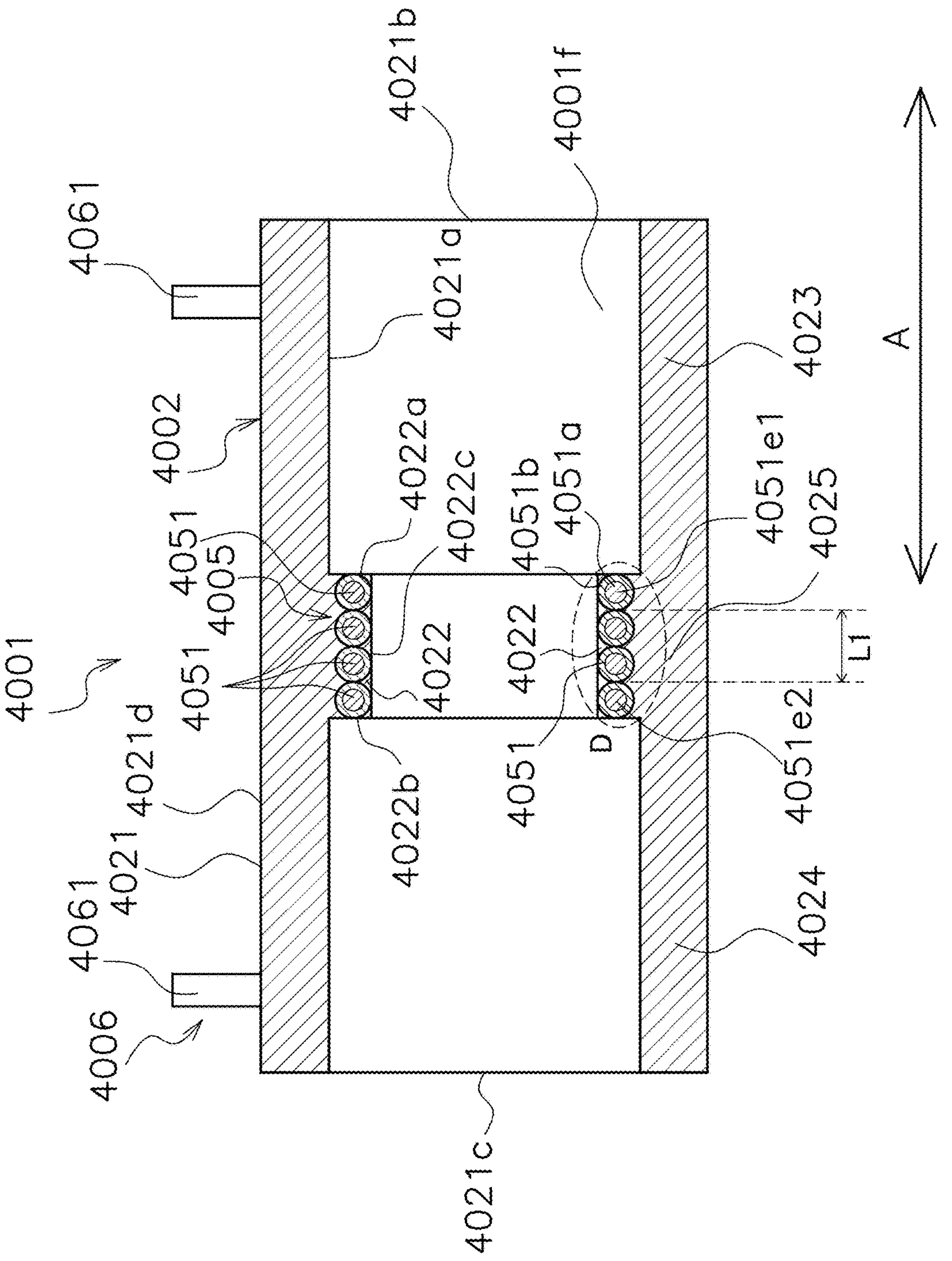
FIG. 40 is a cross-sectional configuration view showing the electrofusion joint of FIG. 39.

FIG. 40 is a view showing a cross-sectional configuration of the electrofusion joint 4001.

As shown in FIGS. 39 and 40, the electrofusion joint 4001 includes a main body 4002, a heat generating section 4005, and a connector attachment portion 4006.

(Main Body 4002)

The main body 4002 is formed from a thermoplastic resin and includes a tubular portion 4021 and a stopper portion 4022, as shown in FIG. 40. The tubular portion 4021 is tubular and includes a joint receiving portion 4023, a joint receiving portion 4024, and a continuous portion 4025. The resin pipe 4011 is inserted into the joint receiving portion 4023. The resin pipe 4012 is inserted into the joint receiving portion 4024.

There are no particular restrictions on the thermoplastic resin used in the main body 4002, but a resin having a melting point of less than 230° C. is preferable.

Figure 41:
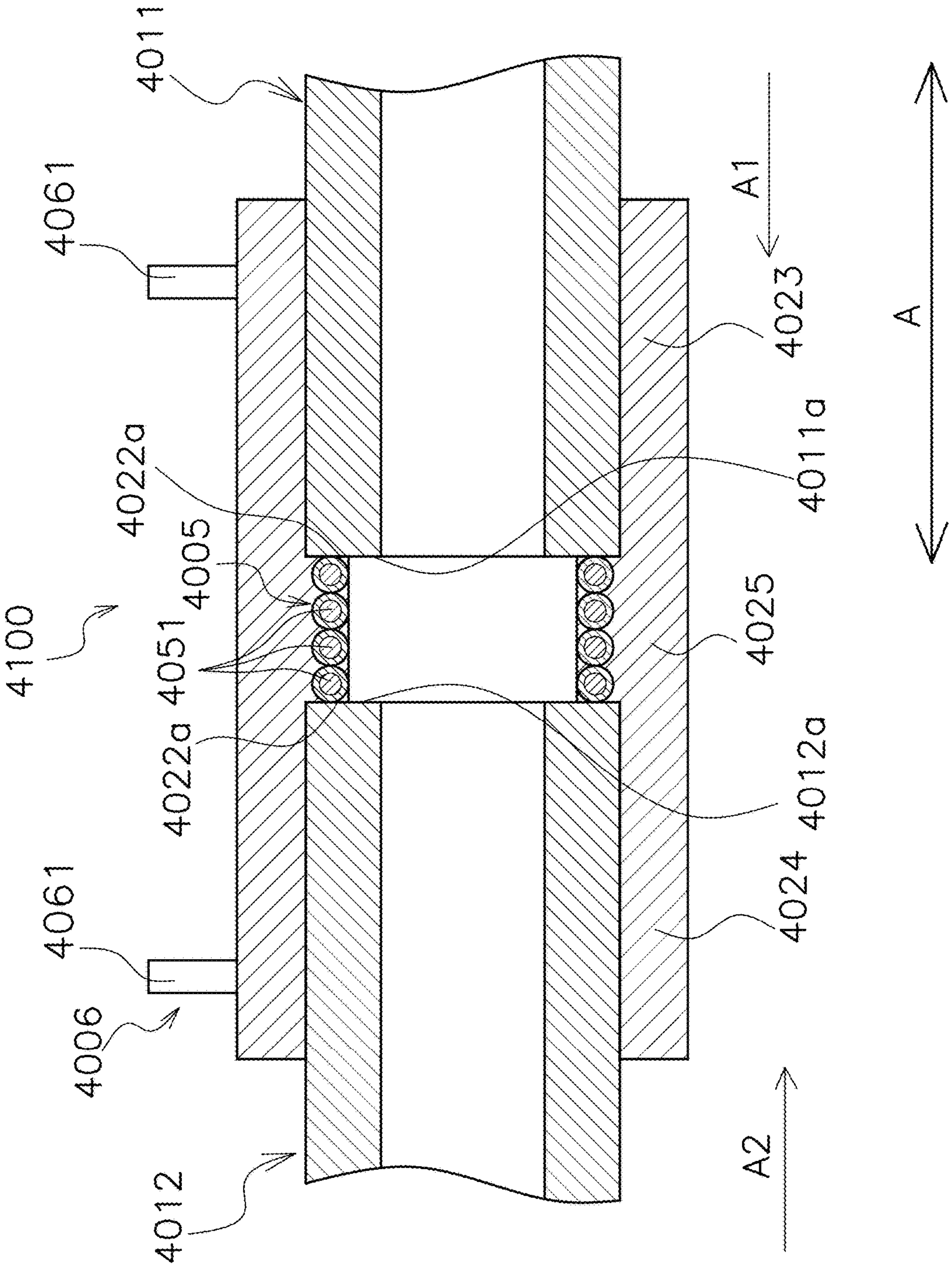
FIG. 41 is a cross-sectional configuration view showing a state in which a resin pipe and a resin pipe are inserted into the electrofusion joint of FIG. 39.

FIG. 41 is a cross-sectional configuration view showing a state in which the resin pipe 4011 has been inserted into the joint receiving portion 4023 of the electrofusion joint 4001 and the resin pipe 4012 has been inserted into the joint receiving portion 4024.

The inside diameter of the joint receiving portion 4023 equal to or larger than the outside diameter of the resin pipe 4011. The inside diameter of the joint receiving portion 4024 is equal to or larger than the outside diameter of the resin pipe 4012.

As shown in FIG. 40, the continuous portion 4025 is continuous with the joint receiving portion 4023 and the joint receiving portion 4024, and connects the joint receiving portion 4023 and the joint receiving portion 4024. The continuous portion 4025 is a portion that spans the joint receiving portion 4023 and the joint receiving portion 4024, and a stopper portion 4022 (discussed below) is provided inside the continuous portion 4025 in the radial direction B.

(Stopper Portion 4022)

The stopper portion 4022 is a portion having the shape of a circular ring. The stopper portion 4022 is formed on the inner surface 4021*a* of the tubular portion 4021, as a rib going all the way around in the circumferential direction C. The stopper portion 4022 also contains a thermoplastic resin, and is preferably formed from the same thermoplastic resin as that used in the tubular portion 4021.

The stopper portion 4022 is formed so as to protrude inward in the radial direction from the inner surface 4021*a* of the tubular portion 4021. Also, the stopper portion 4022 is disposed inside the continuous portion 4025 of the tubular portion 4021 in the radial direction B. The stopper portion 4022 may be formed as a single member with the tubular portion 4021, or may be formed as a separate member apart from the tubular portion 4021.

As shown in FIG. 40, the stopper portion 4022 includes a first side surface 4022*a*, a second side surface 4022*b*, and a peripheral surface 4022*c*. The peripheral surface 4022*c* is the end surface on the inner side of the stopper portion 4022 in the radial direction.

The first side surface 4022*a* is formed substantially perpendicular to the axial direction A, inward in the radial direction B from the inner surface 4021*a* of the tubular portion 4021.

The second side surface 4022*b* is formed substantially perpendicular to the axial direction A, inward in the radial direction B from the inner surface 4021*a* of the tubular portion 4021.

The peripheral surface 4022*c* connects the end on the inside in the radial direction of the first side surface 4022*a* to the end on the inside in the radial direction of the second side surface 4022*b*. The peripheral surface 4022*c* is formed substantially parallel to the inner surface 4021*a* of the tubular portion 4021.

When the resin pipe 4011 is inserted into the joint receiving portion 4023, as shown in FIG. 41, the pipe end 4011*a* of the resin pipe 4011 comes into contact with the first side surface 4022*a* of the stopper portion 4022, which restricts the insertion position of the pipe end 4011*a*. The concept of the pipe end 4011*a* coming into contact with the first side surface 4022*a* encompasses both when the pipe end 4011*a* comes into direct contact with the first side surface 4022*a*, and when the pipe end 4011*a* comes into contact with the side surface 4022*a* indirectly via the heating wire 4051 (discussed below) of the heat generating section 4005.

When the resin pipe 4012 is inserted into the joint receiving portion 4024, as shown in FIG. 41, the pipe end 4012*a* of the resin pipe 4012 comes into contact with the second side surface 4022*b* of the stopper portion 4022, and insertion position of the pipe end 4012*a* is restricted. The concept that the pipe end 4012*a* comes into contact with the second side surface 4022*b* encompasses both when the pipe end 4012*a* comes into direct contact with the second side surface 4022*b*, and when the pipe end 4012*a* comes into indirect contact with the side surface 4022*b* via the heating wire 4051 (discussed below) of the heat generating section 4005.

(Heat Generating Section 4005)

The heat generating section 4005 is provided in the stopper portion 4022. The heat generating section 4005 includes a heating wire 4051. The heating wire 4051 is provided in the stopper portion 4022 so as to be wound in the circumferential direction C along the axial direction A. In the present embodiment, the heating wire 4051 is wound around, for example, four times in the stopper portion 4022. In the heat generating section 4005 of the present embodiment, the adjacent wound parts of the heating wire 4051 are all in contact with each other.

The heating wire 4051 is embedded in the stopper portion 4022, but the heating wire 4051 may be embedded in the stopper portion 4022 so that a part of the heating wire 4051 is exposed from the first side surface 4022*a*, the second side surface 4022*b* or the peripheral surface 4022*c* to the flow path 4001*f* side.

The heating wire 4051 may have a conducting wire 4051*a* and an insulating film 4051*b* (an example of an insulator), for example, as shown in FIG. 40. As the conducting wire 4051*a*, for example, a nichrome wire, an iron chromium type 2 wire, an iron chromium type 1 wire, a nickel chromium wire, or the like can be used. The wire diameters of the conducting wires 4051*a* can be set to, for example, @0.3 to 0.8 mm. If it is less than φ0.3 mm, a wire may expand due to the tension during winding and the resistance value may become unstable. The wire diameter of the conducting wire 4051*a* is set to a maximum of 0.8 mm due to the equipment for forming the insulating film 4051*b*. The resistance value of the unit length of the conducting wire 4051*a* is about 2 to 2102/m depending on the wire diameter.

The insulating films 4051*b* is disposed so as to cover the periphery of the conducting wire 4051*a*. The insulating film 4051*b* has a melting point of 230° C. or higher. It is preferable that this is set to a temperature at which the insulating film does not melt even at a temperature at which the thermoplastic resin melts (for example, in the case of polyethylene, the heating wire is heated to 220° C.) in the present embodiment. The insulating film 4051*b* can be formed of, for example, a fluorine-based resin or an imide-based resin, but it is more preferable to form the insulating film with a polyimide-based resin. For example, the thickness of the conducting wires 4051*a* may be set to 0.1 mm or more and 10 mm or less.

Figure 42:
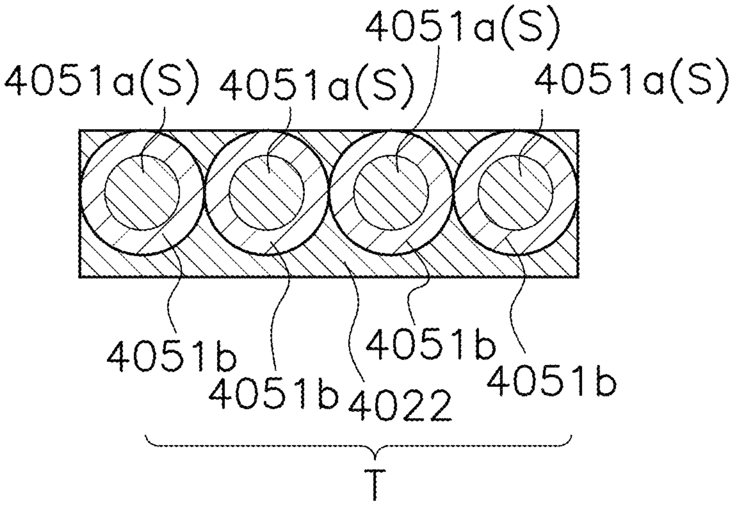
FIG. 42 is a view for explaining a volume ratio of a conducting wire and a resin in a stopper portion.

Further, the volume ratio of the conducting wire 4051*a* and the resin in the stopper portion 4022 is set to be 0.04 to 0.07. As shown in FIG. 42, when the cross-sectional area of one conducting wire 4051*a* is defined as S and the cross-sectional area of the stopper portion 4022 and the insulating film 4051*b* combined is defined as T, the volume of the conducting wire 4051*a*/(the volume of the stopper portion 4022 and the insulating film 4051*b*)≈4xS/T can be set. This 4S/T is set to be 0.04 to 0.07. FIG. 42 is an enlarged view of the D portion of FIG. 40.

In the present embodiment, the heating wire 4051 is wound around four times so that the adjacent wound parts of the heating wire 4051 are in contact with each other, but the present invention is not limited to this, and the heating wire 4051 is wound three times or less or five times or more. Further, the heat generating section 4005 may be formed by winding not only one heating wire but also two or more heating wires 4051. The heating wire 4051 may be wound so that all or part of the wound parts does not come into contact with the neighbor.

(Connector Attachment Portion 4006)

The connector attachment portion 4006 includes two pins 4061 as shown in FIG. 40. The two pins 4061 are provided so as to project outward in the radial direction from the outer surface 4021*d* of the tubular portion 4021. As shown in FIG. 40, one of the two pins 4061 is disposed in the vicinity of the end 4021*b* of the tubular portion 4021, and the other pin 4061 is disposed in the vicinity of the end 4021*c*. Although not depicted in the figures, the two pins 4061 are connected to the heating wire 4051 of the heat generating section 4005. When the connectors of the electrofusion device is attached to the pins 4061 and power is switched on, the heating wires 4051 generate heat.

<Jig 4200>

Figure 43:
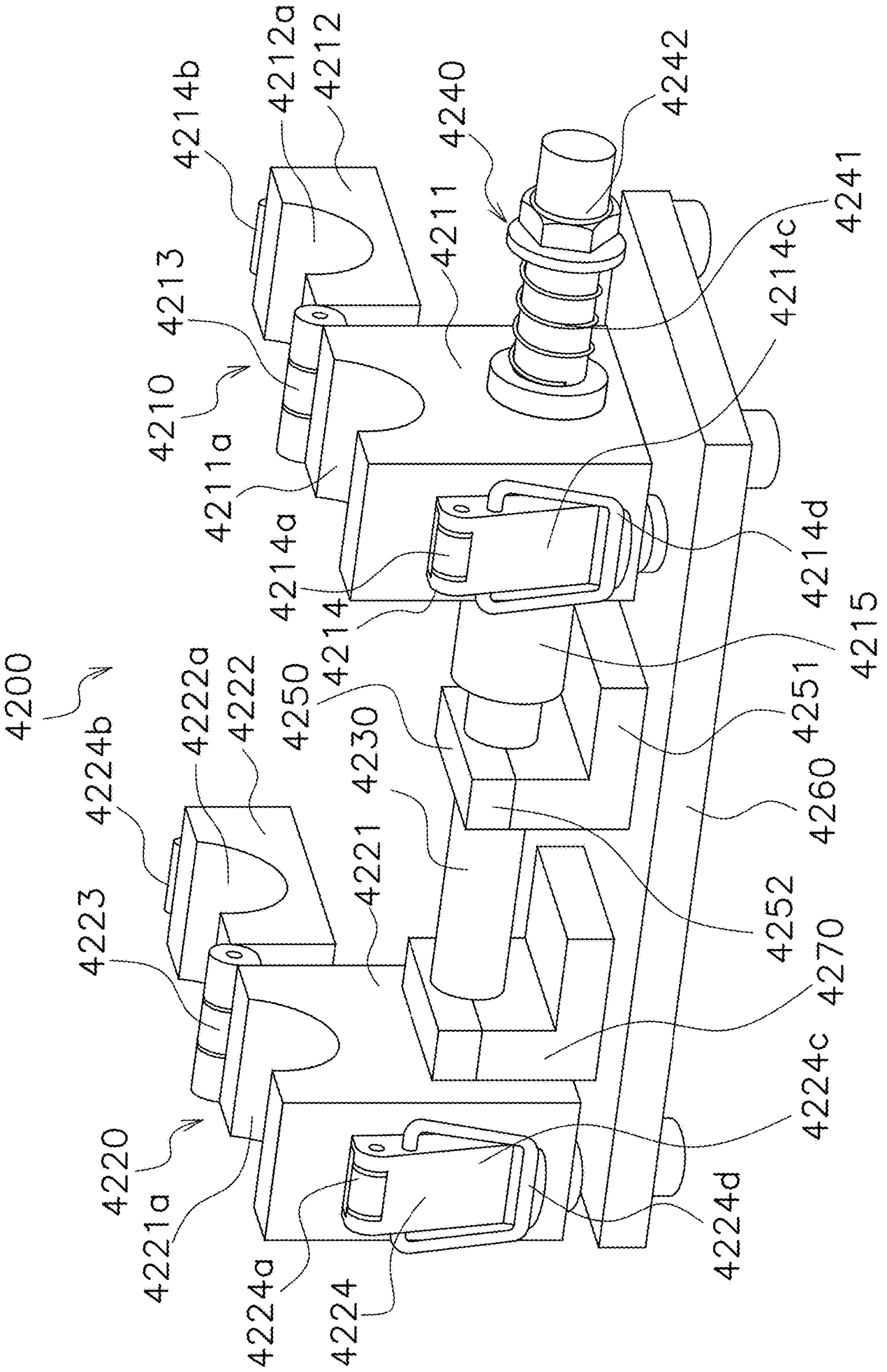
FIG. 43 is a perspective view showing a jig used in a connection method of the embodiment according to the present disclosure.
Figure 44:
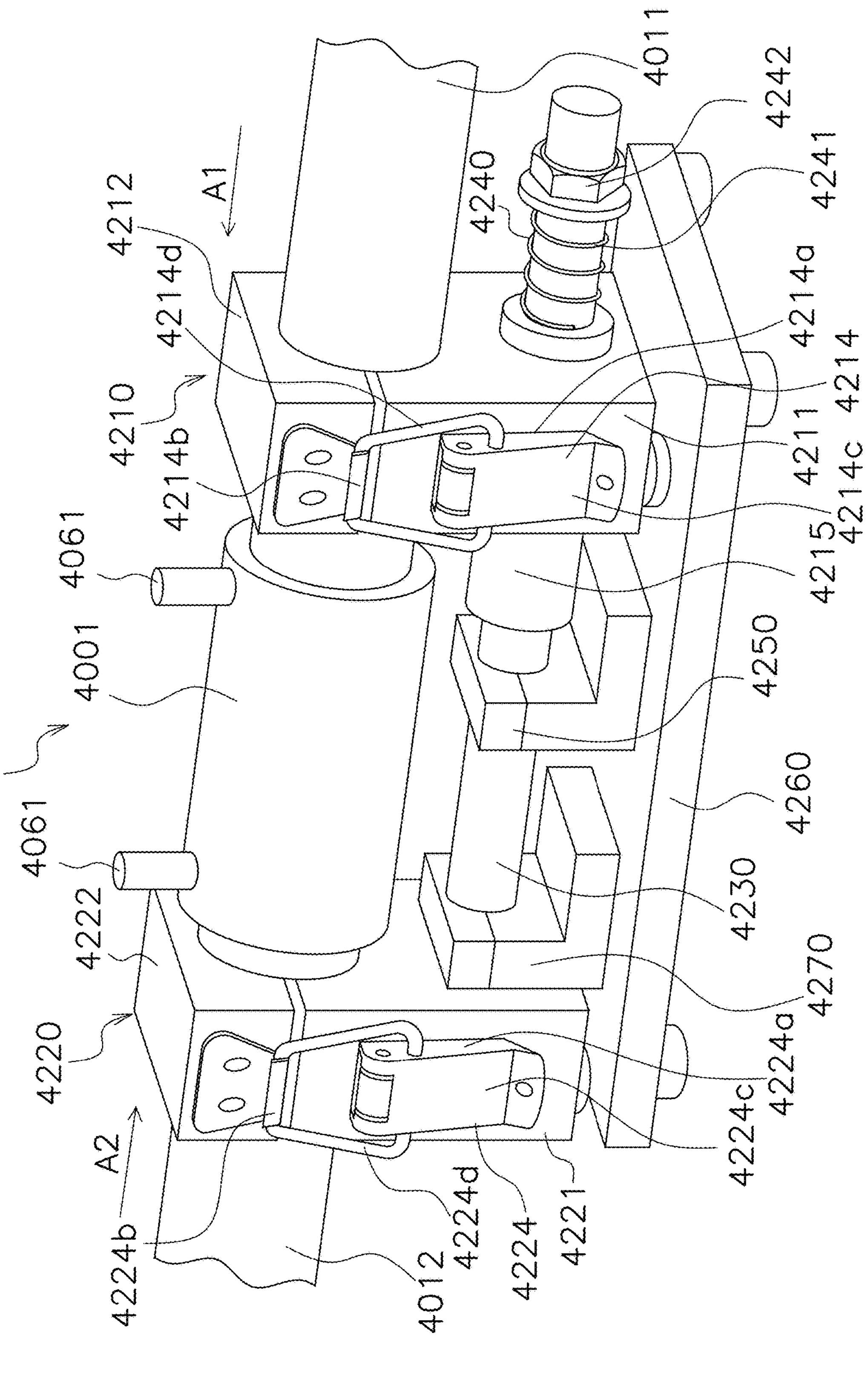
FIG. 44 is a view showing a state in which a resin pipe, an electrofusion joint, and a resin pipe are attached to the jig of FIG. 43.
Figure 45:
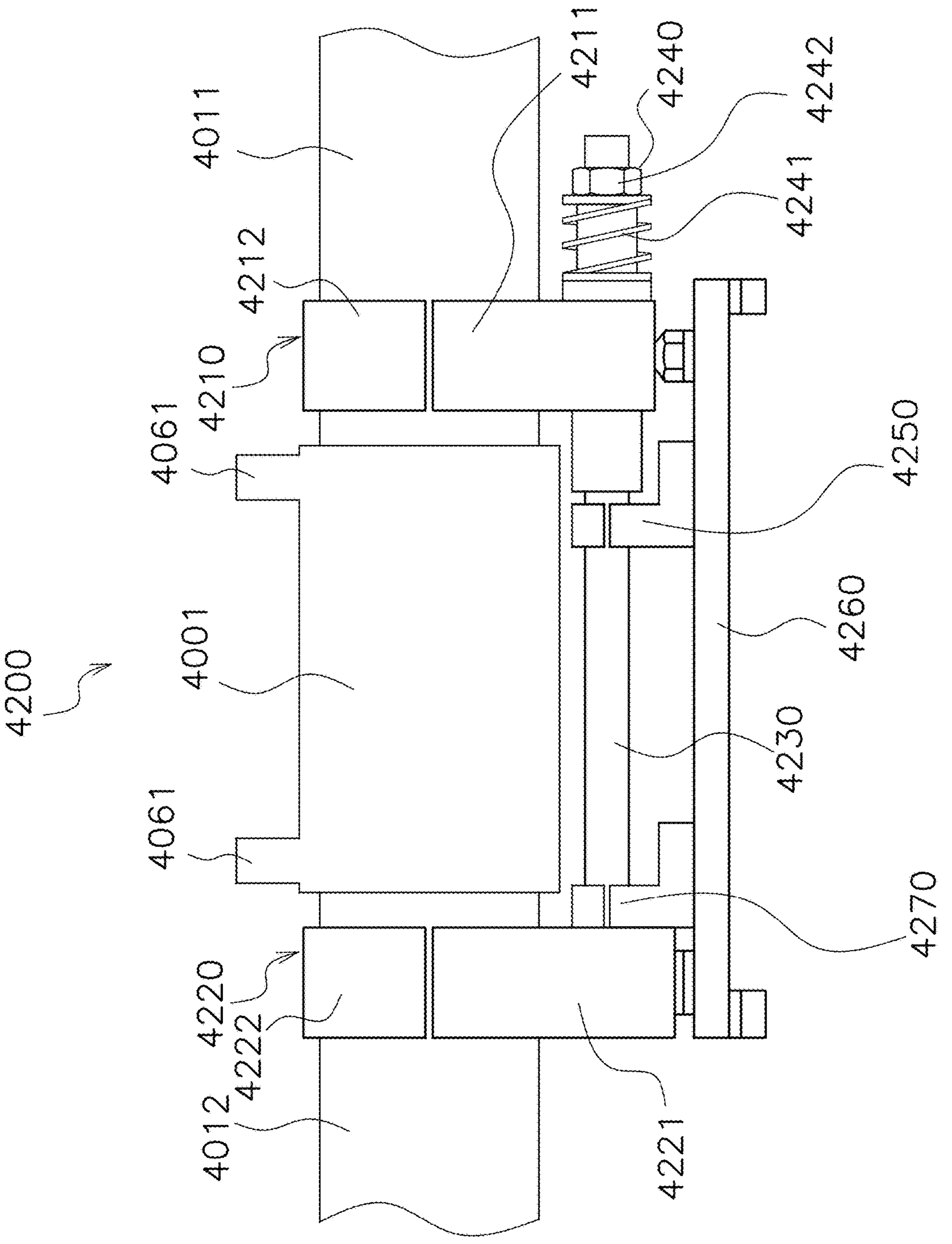
FIG. 45 is a side view of FIG. 44.

Next, the jig 4200 used in the connection method of the embodiment according to the present disclosure will be described. A resin pipe 4011, an electrofusion joint 4001 and a resin pipe 4012 are arranged on the jig 4200. FIG. 43 is a view showing a jig 4200. FIG. 44 is a view showing a state in which the resin pipe 4011, the electrofusion joint 4001, and the resin pipe 4012 are attached to the jig 4200. FIG. 45 is a side view of FIG. 44.

The jig 4200 includes a first clamp portion 4210, a second clamp portion 4220, a shaft portion 4230, a pressing portion 4240, a restricting portion 4250, and a pedestal 4260.

(Pedestal 1260)

The pedestal 4260 is a plate-shaped member. The pedestal 4260 supports the first clamp portion 4210, the second clamp portion 4220, the shaft portion 4230, the pressing portion 4240, and the restricting portion 4250 arranged on the upper surface side thereof.

(First Clamp Portion 4210)

The first clamp portion 4210 sandwiches and fixes the resin pipe 4011. The first clamp portion 4210 includes a lower clamp portion 4211, an upper clamp portion 4212, a hinge portion 4213, a fastening portion 4214, and a bearing portion 4215. The lower clamp portion 4211 is a member having a semicircular concave portion 4211*a* formed on the upper surface thereof. In the present embodiment, the lower clamp portion 4211 is a member having a substantially rectangular parallelepiped shape in which a semicircular concave portion is formed on the upper surface.

The bearing portion 4215 is provided on the lower clamp portion 4211. The bearing portion 4215 is inserted into a through hole formed in the lower clamp portion 4211. The bearing portion 4215 is arranged below the concave portion 4211*a*. A shaft portion 4230, which will be described later, is inserted inside the bearing portion 4215. The axial direction of the bearing portion 4215 is arranged parallel to the central axis of the concave portion 4211*a*. As a result, the first clamp portion 4210 can move along the shaft portion 4230. In the state in which the resin pipe 4011 and the resin pipe 4012 and the electrofusion joint 4001 are arranged on the jig, the axial direction of the bearing portion 4215 is parallel to the axial direction A.

The upper clamp portion 4212 is a member in which a semicircular concave portion 4212*a* is formed. In the present embodiment, the upper clamp portion 4212 is a member having a substantially rectangular parallelepiped shape in which a semicircular concave portion 4212*a* is formed on a predetermined one surface.

The upper clamp portion 4212 and the lower clamp portion 4211 can sandwich the outer periphery of the resin pipe 4011 between the concave portion 4212*a* and the concave portion 4211*a* formed therein. The central axes of the concave portion 4212*a* and the concave portion 4211*a* substantially coincide with each other in the state where the resin pipe 4011 is sandwiched. Further, in a state where the resin pipe 4011 is sandwiched, that central axis coincides with the above-mentioned axial direction A.

The hinge portion 4213 rotatably connects the ends of the lower clamp portion 4211 and the upper clamp portion 4212 to each other. The upper clamp portion 4212 is configured to be rotatable with respect to the lower clamp portion 4211 about the hinge portion 4213. The upper clamp portion 4212 is attached to the lower clamp portion 4211 via the hinge portion 4213 so that the concave portion 4212*a* faces the concave portion 4211*a* of the lower clamp portion 4211 when the upper clamp portion 4212 is rotated around the hinge portion 4213.

The resin pipe 4011 is arranged along the concave portion 4211*a* of the lower clamp portion 4211 in a state where the lower clamp portion 4211 and the upper clamp portion 4212 open around the hinge portion 4213. After that, the upper clamp portion 4212 is rotated about the hinge portion 4213, and is arranged so that the resin pipe 4011 fits into the concave portion 4212*a*.

The fastening portion 4214 is a so-called snap lock. The fastening portion 4214 includes a lock body 4214*a* and a protrusion 4214*b*. The fastening portion 4214 is provided on the side opposite to the hinge portion 4213 with the concave portions 4211*a* and 4212*a* of the lower clamp portion 4211 and the upper clamp portion 4212 interposed therebetween. The lock body 4214*a* is arranged on the side surface of the lower clamp portion 4211. The protrusion 4214*b* is arranged on the side surface of the upper clamp portion 4212. The lock body 4214*a* includes a lever 4214*c* and an annular portion 4214*d*. In a state where the upper clamp portion 4212 is rotated upward of the lower clamp portion 4211, the annular portion 4214*d* is hooked on the protrusion 4214*b* and the lever 4214*c* is tilted downward, whereby the upper clamp portion 4212 can be fastened with respect to the lower clamp portion 4211 in the closed state.

(Second Clamp Part 4220)

The second clamp portion 4220 sandwiches and fixes the resin pipe 4012. The second clamp portion 4220 fixes the resin pipe 4012 so that the central axis of the resin pipe 4012 coincides with the central axis of the resin pipe 4011.

The second clamp portion 4220 includes a lower clamp portion 4221, an upper clamp portion 4222, a hinge portion 4223, and a fastening portion 4224. The lower clamp portion 4221 is a member having a semicircular concave portion 4221*a* formed on the upper surface thereof. In the present embodiment, the lower clamp portion 4221 is a member having a substantially rectangular parallelepiped shape in which a semicircular concave portion is formed on the upper surface. The lower clamp portion 4211 is fixed to the pedestal 4260 via the bracket 4270.

The upper clamp portion 4222 is a member in which a semicircular concave portion 4222*a* is formed. In the present embodiment, the upper clamp portion 4222 is a member having a substantially rectangular parallelepiped shape in which a semicircular concave portion 4222*a* is formed on a predetermined one surface.

The upper clamp portion 4222 and the lower clamp portion 4221 can sandwich the outer periphery of the resin pipe 4012 between the concave portion 4222*a* and the concave portion 4221*a* formed therein. The central axes of the concave portion 4222*a* and the concave portion 4221*a* substantially coincide with each other when the resin pipe 4012 is sandwiched. Further, in a state where the resin pipe 4012 is sandwiched, that central axis coincides with the above-mentioned axial direction A.

The hinge portion 4223 rotatably connects the ends of the lower clamp portion 4221 and the upper clamp portion 4222 to each other. The upper clamp portion 4222 is configured to be rotatable with respect to the lower clamp portion 4221 about the hinge portion 4223. The upper clamp portion 4222 is attached to the lower clamp portion 4221 via the hinge portion 4223 so that the concave portion 4222*a* faces the concave portion 4221*a* of the lower clamp portion 4221 when the upper clamp portion 4222 is rotated about the hinge portion 4223.

The resin pipe 4012 is arranged along the concave portion 4221*a* of the lower clamp portion 4221 in a state where the lower clamp portion 4221 and the upper clamp portion 4222 open around the hinge portion 4223. After that, the upper clamp portion 4222 is rotated about the hinge portion 4223, and is arranged so that the resin pipe 4012 fits into the concave portion 4222*a*.

The fastening portion 4224 is a so-called snap lock. The fastening portion 4224 includes a lock body 4224*a* and a protrusion 4224*b*. The fastening portion 4224 is provided on the side opposite to the hinge portion 4223 with the concave portions 4221*a* and 4222*a* of the lower clamp portion 4221 and the upper clamp portion 4222 interposed therebetween. The lock body 4224*a* is arranged on the side surface of the lower clamp portion 4221. The protrusion 4224*b* is arranged on the side surface of the upper clamp portion 4222. The lock body 4224*a* includes a lever 4224*c* and an annular portion 4224*d*. In a state where the upper clamp portion 4222 is rotated upward of the lower clamp portion 4221, the annular portion 4224*d* is hooked on the protrusion 4224*b* and the lever 4224*c* is tilted downward, whereby the upper clamp portion 4222 can be fastened with respect to the lower clamp portion 4221 in the closed state.

With the resin pipe 4011 and the resin pipe 4012 inserted in the electrofusion joint 4001, the resin pipe 4011 is sandwiched with the first clamp portion 4210 and the resin pipe 4012 is sandwiched with the second clamp portion 4220, whereby the resin pipe 4011 and the resin pipe 4012 and the electrofusion joint 4001 can be arranged on the jig 4200.

(Shaft 4230)

The shaft portion 4230 is supported by the pedestal 4260. The shaft portion 4230 is arranged in parallel with the central axis of the concave portion 4211*a* and the concave portion 4212*a* of the first clamp portion 4210. The shaft portion 4230 is arranged parallel to the central axis of the concave portion 4221*a* and the concave portion 4222*a* of the second clamp portion 4220. Further, the shaft portion 4230 is arranged in parallel with the central axis of the resin pipe 4011 fixed to the first clamp portion 4210 and the resin pipe 4012 fixed to the second clamp portion 4220. The shaft portion 4230 is arranged along the above-mentioned axial direction A.

The shaft portion 4230 extends from the second clamp portion 4220 toward the first clamp portion 4210. The first clamp portion 4210 is attached to the shaft portion 4230 so as to be movable along the shaft portion 4230. The shaft portion 4230 is arranged from the lower clamp portion 4221 to the lower clamp portion 4211. The bearing portion 4215 is arranged in a portion below the concave portion 4211*a* of the lower clamp portion 4211 of the first clamp portion 4210, and the shaft portion 4230 is inserted through the bearing portion 4215.

(Pressing Portion 4240)

The pressing portion 4240 presses the first clamp portion 4210 toward the second clamp portion 4220 along the shaft portion 4230. The pressing portion 4240 includes a spring 4241 and a nut 4242.

The spring 4241 is disposed around the shaft portion 4230 on the side of the first clamp portion 4210 opposite to the second clamp portion 4220.

The nut 4242 is disposed on the shaft portion 4230 on the side opposite to the first clamp portion 4210 of the spring 4241. A male screw shape is formed around the end of the shaft portion 4230 opposite to the second clamp portion 4220, and is screwed with the female screw shape formed inside the nut 4242. The nut 4242 can be moved along the shaft portion 4230 by rotating it.

The spring 4241 is disposed between the nut 4242 and the first clamp portion 4210. Since the nut 4242 is screwed with the shaft portion 4230 and the position on the shaft portion 4230 is fixed, a load is applied to the first clamp portion 4210 toward the second clamp portion 4220 by the spring 4241. The load can be set, for example, in the range of 1 to 50 kgf, and more preferably in the range of 3 to 20 kgf. Further, when the nut 4242 is rotated and brought close to the first clamp portion 4210 in a state in which the resin pipes 4011 and 4012 and the electrofusion joint 4001 are arranged on the jig 4200, the spring 4241 is compressed, so that the load applied to the first clamp portion 4210 can be increased. On the other hand, when the nut 4242 is rotated and moved away from the first clamp portion 4210, the spring 4241 expands, so that the load applied to the first clamp portion 4210 can be reduced.

As shown in FIG. 45, a load is applied to the first clamp portion 4210 by the pressing portion 4240 in a state where the resin pipe 4011, the resin pipe 4012, and the electrofusion joint 4001 are arranged on the jig 4200. As a result, a load is applied to the pipe end 4011*a* of the resin pipe 4011 and the pipe end 4012*a* of the resin pipe 4012 so as to be pressed against the stopper portion 4022.

(Restricting Portion 4250)

The restricting portion 4250 regulates that the first clamp portion 4210 moves too much toward the second clamp portion 4220 by the pressing portion 4240.

The restricting portion 4250 is arranged between the first clamp portion 4210 and the second clamp portion 4220.

The restricting portion 4250 includes a fixing portion 4251 and a contact portion 4252. The fixing portion 4251 is fixed to the pedestal 4260. The contact portion 4252 is a portion extending upward from the fixing portion 4251 and is arranged around the shaft portion 4230. When the bearing portion 4215 of the first clamp portion 4210 abuts on the contact portion 4252, it is possible to restrict the movement of the first clamp portion 4210 to the second clamp portion 4220 side.

<Connection Method>

Figure 46:
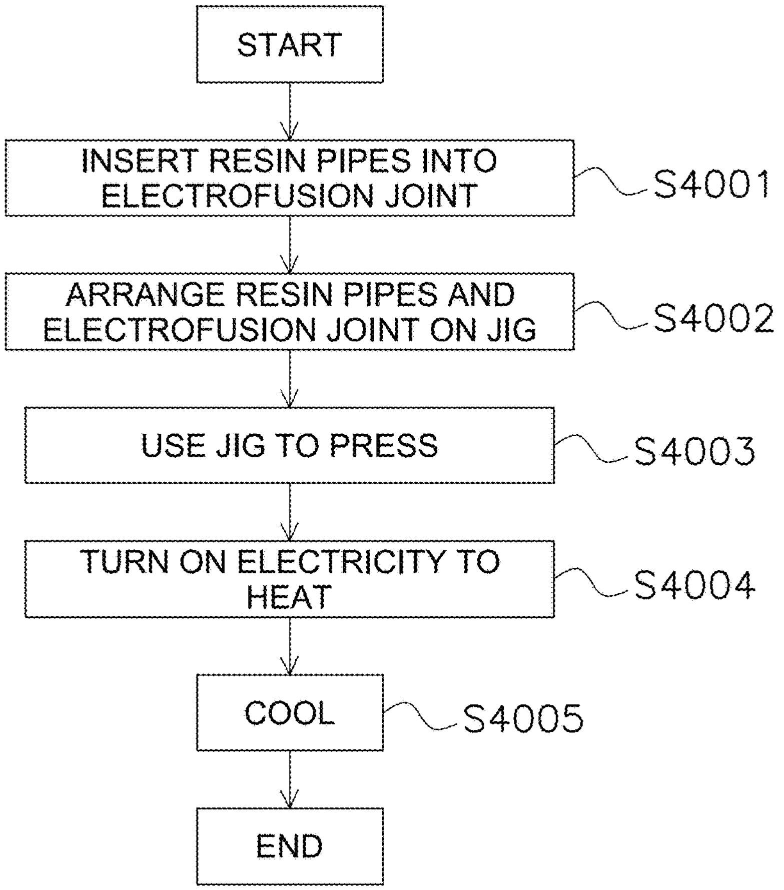
FIG. 46 is a flow chart showing a connection method of the embodiment 5 according to the present disclosure.

Next, a connection method using the above-mentioned jig 4200 will be described. FIG. 46 is a flow chart showing the connection method of the present embodiment.

First, in step S4001 (an example of an insertion step), the resin pipe 4011 and the resin pipe 4012 are inserted into the electrofusion joint 4001.

As shown in FIG. 41, the resin pipe 4011 is inserted inside the joint receiving portion 4023 of the electrofusion joint 4001 until the stopper portion 4022 restricts the relative movement of the pipe end 4011*a* of the resin pipe 4011. Next, the resin pipe 4012 is inserted inside the joint receiving portion 4024 of the electrofusion joint 4001 until the stopper portion 4022 restricts the relative movement of the pipe end 4012*a* of the resin pipe 4012. FIG. 41 shows a state in which the resin pipe 4011 and the resin pipe 4012 are inserted into the electrofusion joint 4001. It is more preferable to scrape the edge surface (the surface facing the stopper portion 4022) of the resin pipes 4011 and 4012 before step S4001 and insert the resin pipes 4011 and 4012 into the electrofusion joint 4001 because the strength of fusion is improved.

In this state, in step S4002 (an example of the arrangement step), as shown in FIGS. 44 and 45, the resin pipe 4011 is sandwiched and fixed by the first clamp portion 4210, and the resin pipe 4012 is sandwiched and fixed by the second clamp portion 4220, and the resin pipe 4011, the electrofusion joint 4001 and the resin pipe 4012 are arranged on the jig 4200.

By fixing the resin pipe 4011, the electrofusion joint 4001 and the resin pipe 4012 to the jig 4200, in step S4003 (an example of the pressurizing step), a load is applied to the first clamp portion 4210 toward the second clamp portion 4220 by the urging force of the pressing portion 4240. By applying a load to the first clamp portion 4210 toward the second clamp portion 4220, the pipe end 4011 a of the resin pipe 4011 is pressed against the first side surface 4022*a* of the stopper portion 4022, and the pipe end 4012*a* of the resin pipe 4012 is pressed against the second side surface 4022*b* of the stopper portion 4022. As the external force to be applied at this time, it is preferable to apply a force equal to or larger than the value calculated by the following formula.

Figure 47:
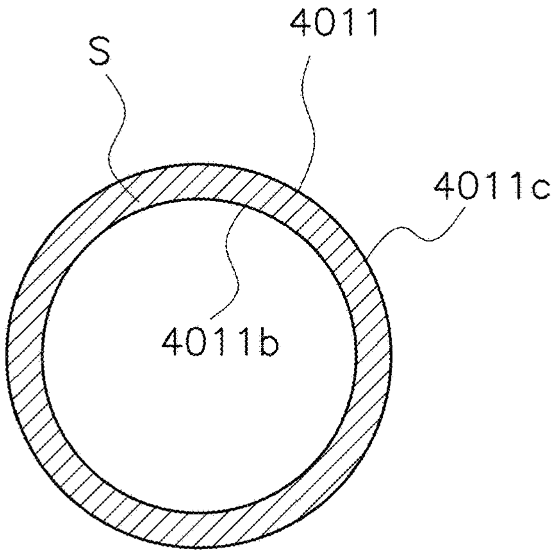
FIG. 47 is a view for explaining a cross-sectional area of the resin pipe.

In this embodiment, the resin pipe 4011 and the resin pipe 4012 have the same diameter. FIG. 47 is a cross-sectional view of the resin pipe 4011. When the cross-sectional area between the inner peripheral surface 4011*b* and the outer peripheral surface 4011*c* of the resin pipe 4011 is set as S, it is preferable that the surface pressure of 0.15 (MPa)×S ($mm^2$) or more is applied to the resin pipe 4011. For example, when the cross-sectional area of the 25A pipe is 140 $mm^2$, the formula is 0.15 (MPa)×140 ($mm^2$), and it is preferable to apply a load of 21N (2.1 kg) or more.

When the diameters of the resin pipe 4011 and the resin pipe 4012 are different, it is preferable to apply a surface pressure having a cross-sectional area S (of the resin pipe having a larger cross-sectional area)×0.15 MPa or more.

For example, a load meter can be installed on the pressing portion 4240 to adjust the position of the nut 4242 while checking the load. By moving the nut 4242 toward the second clamp portion 4220 side, the load applied to the first clamp portion 4210 by the spring 4241 can be increased. Further, by moving the nut 4242 toward the side opposite to the second clamp portion 4220, the load applied to the first clamp portion 4210 by the spring 4241 can be reduced.

Next, in step S4004 (an example of the heating step), the connectors of the electrofusion device are attached to the two pins 4061 of the connector attachment portion 4006 in a pressurized state, and energization is performed for a predetermined time.

This energization causes the heating wire 4051 to generate heat, and the stopper portion 4022, the pipe end 4011*a* of the resin pipe 4011, and the pipe end 4012*a* of the resin pipe 4012 are melted and the pipe end 4011*a* and the pipe end 4012*a* come into close contact with the stopper portion 4022.

Since the stopper portion 4022 is molten by energization and the width in the axial direction A becomes smaller and the applied load becomes smaller, the load applied to the first clamp portion 4210 by the spring 4241 can be secured by moving the nut 4242 toward the second clamp portion 4220 side. As the load applied to the first clamp portion 4210, a value of S×0.15 MPa or more described above is secured. For example, when the cross-sectional area S is 140 $mm^2$, it is preferable that a load of 2.1 kg or more is maintained. It is desirable that the load does not change even when the pipe ends 4011*a* and 4012*a* melt, but it may change. It is desirable to continue applying the load while the resin is melting, but no load may be applied if it is temporary.

The heating wire temperature at the time of energization may be any temperature as long as it melts the main body 4002, and in the case of polyolefin, it is preferably 220° C. or less.

By stopping the energization of the heating wire 4051, the heat generation is stopped and the heating process is completed.

Next, in step S4005 (an example of a cooling step), the molten resin pipe 4011, the molten electrofusion joint 4001 and the molten resin pipe 4012 are cooled for a predetermined time, the resin is solidified, and these are connected and integrated. After stopping the energization of the heating wire 4051, they are naturally cooled. It is preferable that the above-mentioned load of S×0.15 MPa or more is secured by the pressing portion 4240 until the heating step of step S4004 is completed. Of course, the load may be applied in the cooling step of step S4005, or the load may be stopped in the middle of step S4004. When a predetermined bead R, which will be described later, is formed, the load may be stopped.

By adjusting the nut 4242 as described above, the load by the spring 4241 is set so as not to fall below 2.1 kg.

When the same piping structure 4100 is repeatedly created, the load meter is installed only for the first time or multiple times from the first time, the position of the nut 4242 is recorded with the passage of time, the load meter is not installed in the later creation, and the recorded position with the passage of time may be used.

Figure 48:
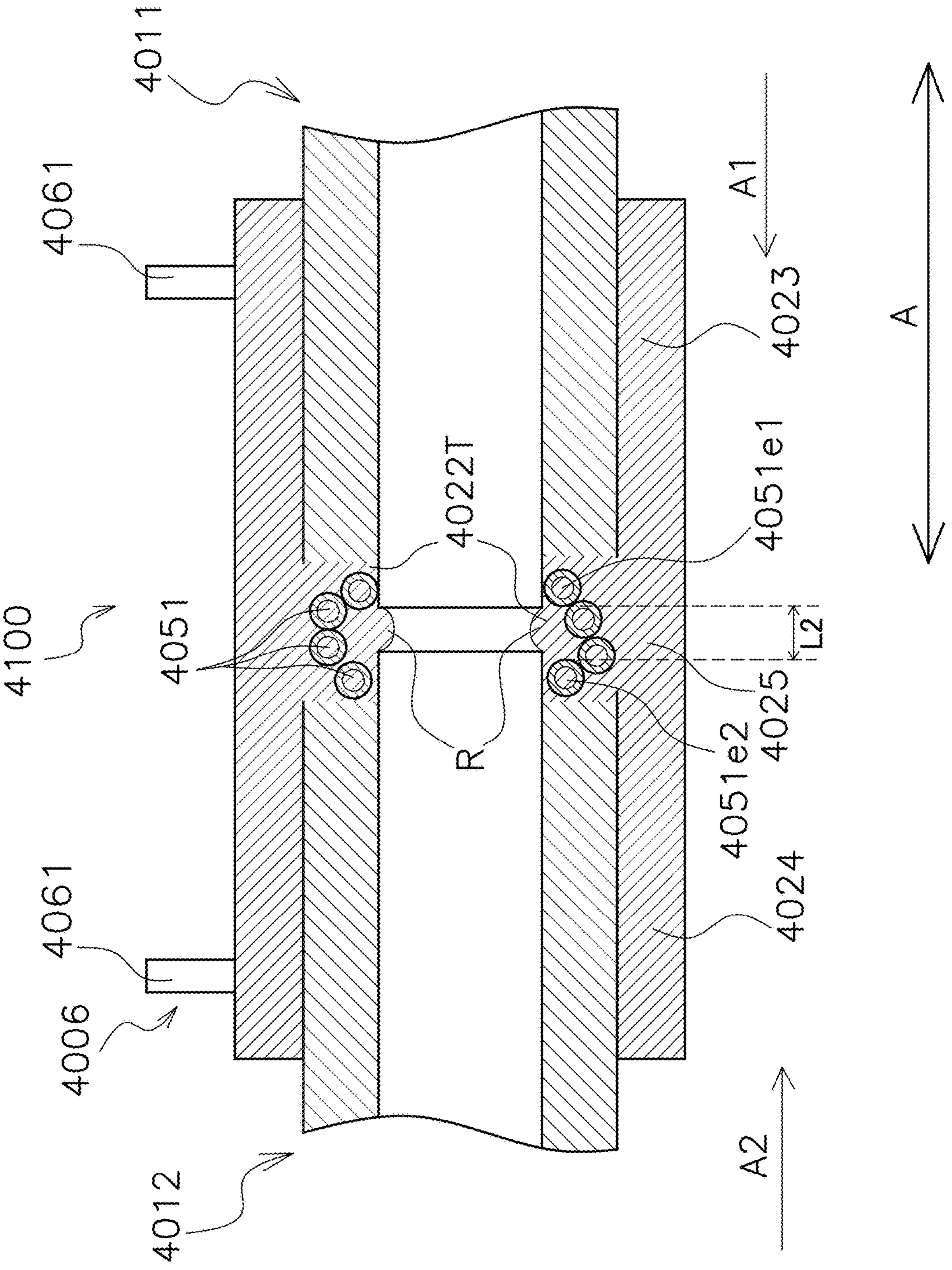
FIG. 48 is a cross-sectional configuration view showing the electrofusion joint and the resin pipes after fusion.
Figure 49A:
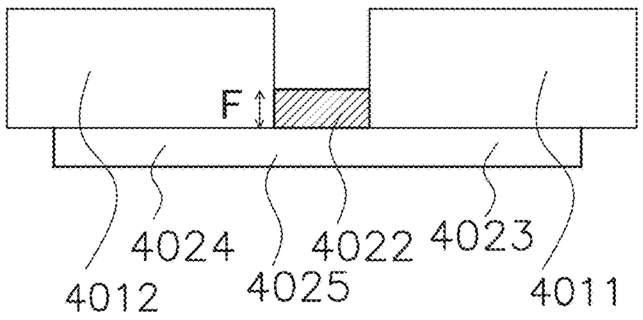
FIG. 49(*a*) to 49(*d*) are views for explaining the volume relationship between a filling portion of a stopper portion for forming a bead and a gap.
Figure 49B:
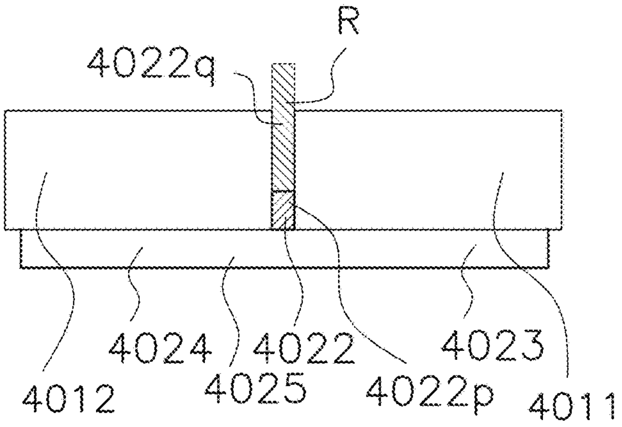
Figure 49C:
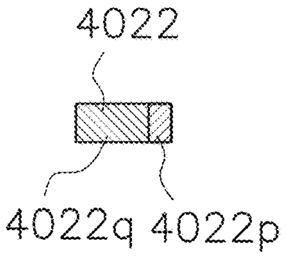
Figure 49D:
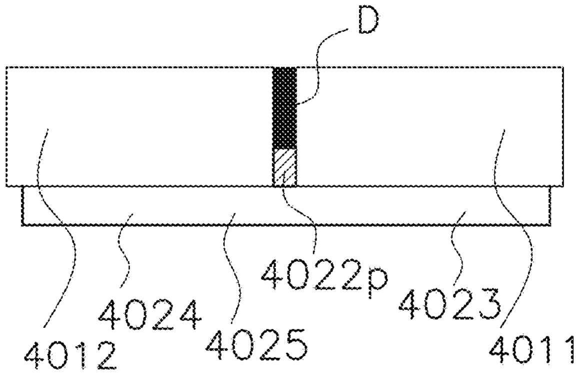

FIG. 48 is a view showing a state in which the resin pipe 4011, the electrofusion joint 4001 and the resin pipe 4012 are molten and connected. As shown in FIG. 48, the stopper portion 4022 is melted and pushed by the resin pipes 4011 and 4012 to be narrowed, and the resin portion 4022T is formed. The resin portion 4022T fills the space between the resin pipe 4011 and the resin pipe 4012, and forms a bead R protruding inward from the resin pipes 4011 and 4012. It is preferable that the bead R protrudes at a uniform height in the circumferential direction.

In FIG. 40, when the parts of the heating wire at both ends along the axis direction A of the heating wire 4051 wound adjacently in the stopper portion 4022 are set as 4051*e*1 and 4051*e*2, the distance along the axis line A between the heating wire part 4051*e*1 and the heating wire part 4051*e*2 is L1. In the configuration of FIG. 40, since the heating wires 4051 is wound so that the wound parts of the heating wire 4051 are adjacent to each other, two heating wire part 4051 are arranged at the distance L1. The distance L1 is approximately the product of the diameter of the heating wire 51 and 2 (two heating wire parts).

On the other hand, in the piping structure 4100 shown in FIG. 48, since the pressure is applied by the resin pipes 4011 and 4012, the heating wire parts 4051*e*1 and 4051*e*2 at both ends are moved to the center, and the distance L2 along the direction A between the part of heating wire parts 4051*e*1 and the heating wire parts 4051*e*2 is smaller than the distance L1 before fusion. Therefore, the distance L2 after fusion is smaller than the product of the diameter of the heating wire 4051 and 2 (two heating wire parts).

FIG. 49(*a*) is a schematic view showing the resin pipes 4011 and 4012 and the stopper portion 4022. FIG. 49(*b*) is a schematic view showing the resin pipes 4011 and 4012 and the stopper portion 4022 in a state after being melted and connected. In FIG. 49(*b*), the remaining portion remaining after melting of the stopper portion 4022 is shown by 4022*p*. FIG. 49(*c*) shows the remaining portion 4022*p* of the stopper portion 4022 and the other filling portion 4022*q*. As shown in FIG. 49(*c*), the filling portion 4022*q* other than the remaining portion 4022*p* of the stopper portion 4022 fills the gap D surrounded by the molten resin pipe 4011, the molten resin pipe 4012, and the molten remaining portion 4022*p*. The gap D is shown in FIG. 49(*d*). In FIG. 49(*d*), the gap D is shown by filling. Here, in order to form the bead R that rises inward from the inner peripheral surface of the resin pipes 4011 and 4012, the volume of the filling portion 4022*q* is set larger than the volume of the gap D. For example, it is preferable that the filling portion 4022*q*/gap D×100(%) is set to 130 to 300%. The length of the width of the remaining portion 4022*p* along the axial direction A is, for example, 1 mm.

<Use of Ultrapure Water for Piping Structure 4100>

The piping structure 4100 of the embodiment according to the present disclosure can be used, for example, for transporting ultrapure water. Specifically, the piping structure 4100 for ultrapure water according to the embodiment of the present disclosure can be used as a pipe in the ultrapure water production apparatus, a pipe for transporting ultrapure water from the ultrapure water production apparatus to a use point, and a pipe for returning ultrapure water from a use point.

Ultrapure water is extremely pure water, and is suitably used for cleaning electronic devices such as semiconductor devices. There are many indicators for expressing the grade of ultrapure water, but in this embodiment, the electrical resistivity of ultrapure water is 18.2 MΩ·cm or more, and the TOC is 50 ppb or less.

The piping structure 4100 of the embodiment according to the present disclosure is preferably used in a water piping for nuclear power generation, a manufacturing process of pharmaceuticals, a semiconductor element or a liquid crystal, in which the water quality required for ultrapure water is particularly strict. The piping structure 4100 of the embodiment according to the present disclosure is more preferably used in a transport pipe for ultrapure water used in a wet treatment step such as cleaning in a semiconductor element manufacturing step. The semiconductor device is preferably one having a higher degree of integration, and specifically, the piping structure is more preferably used in the manufacturing process of a semiconductor device having a minimum line width of 65 nm or less. As an examples of the standard regarding the quality of ultrapure water used in semiconductor manufacturing, SEMI F75 can be mentioned.

Further, since the piping structure 4100 of the embodiment according to the present disclosure includes a polyethylene-based resin layer, it is excellent in workability. For example, fusion construction such as EF (electric fusion) joining can be easily performed at a relatively low temperature.

<Characteristics>

In the connection method of the present embodiment, an external force is started to be applied to the resin pipes 4011 and 4012 (an example of the pipe) toward the stopper portion 4022 before the step S4004 (an example of the heating step) or in the middle of the step S4004, and the external force is continuously applied for a predetermined time. As a result, the fusion proceeds while the resin pipes 4011 and 4012 are pressed against the stopper portion 4022 of the electrofusion joint 1. Therefore, the occurrence of the clevis between the resin pipes 4011 and 4012 and the electrofusion joint 4001 can be suppressed. The predetermined time can be said to be at least the time when the bead R is formed.

In the connection method of the present embodiment, defining that the cross-sectional areas of the resin pipes 4011 and 4012 are S, by starting to apply an external force of 0.15 MPa×S or more in step S4003 (an example of a pressurizing step), the pipes can be started to be pressed against the stopper with an appropriate external.

In the connection method of the present embodiment, since an external force of 0.15 MPa×S or more is continuously applied for a predetermined time, the pipe can be continuously pushed against the stopper portion 4022 with an appropriate external force.

In the piping structure 4100 of the present embodiment, by the bead R (an example of the resin portion) protruding inward from the inner surface of the resin pipes 4011 and 4012 is formed, the occurrence of clevis can be suppressed between the resin pipes 4011 and 4012 and the electrofusion joint 1.

Other Embodiments

Although one embodiment of the present disclosure has been described above, the present disclosure is not limited to the above embodiment, and various changes can be made without departing from the gist of the invention.

(A)

In the above embodiment, the spring 4241 and the nut 4242 are used as the pressing portion for applying the load to the first clamp portion 4210, but the present invention is not limited to this, and a motor, a cylinder, or the like may be used. Further, pressing the pipe ends 4011*a* and 4011*b* against the stopper portion 4022 may be due to either the application of a load to the first clamp portion 4210 or the amount of movement of the first clamp portion 4210.

Further, when a load is applied using a motor or a cylinder, it may be controlled in conjunction with an electrofusion device. For example, when applying a load using a motor or cylinder, the motor or cylinder may be controlled according to the passage of heating time by the electrofusion device so that the load above a predetermined value is maintained according to a preset program.

(B)

Figure 50:
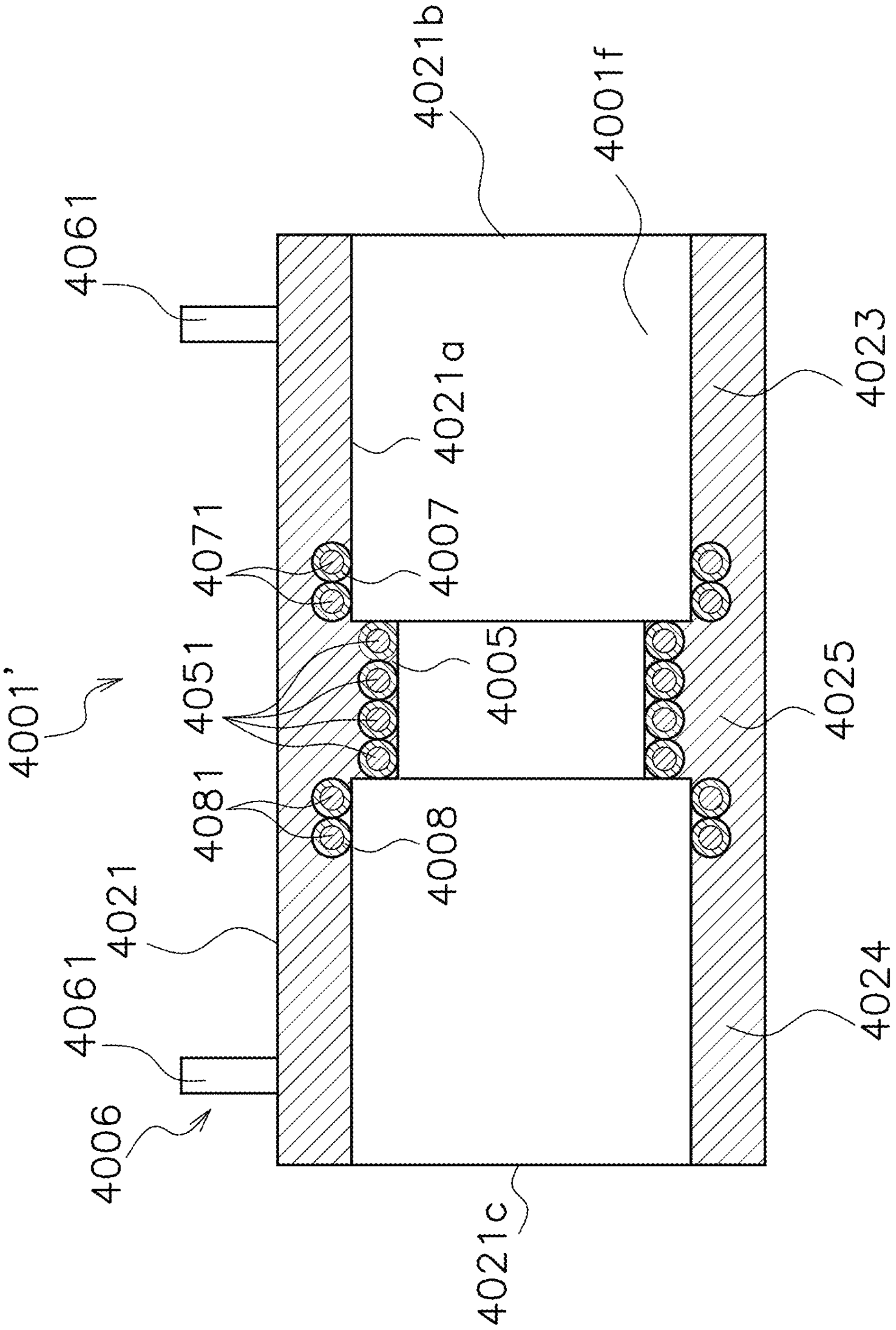
FIG. 50 is a cross-sectional view showing an electrofusion joint of a modified example of the embodiment 5 according to the present disclosure.

In the above embodiment, the heat generating section 4005 is provided only on the stopper portion 4022, but the heat generating sections 4007 and 4008 may be provided on the joint receiving portions 4023 and 4024. FIG. 50 is a cross-sectional view showing an electrofusion joint 4001 ‘in which heat generating sections 4007 and 4008 are provided in joint receiving portions 4023 and 4024.

In the electrofusion joint 4001'shown in FIG. 50, the heat generating section 4007 includes a heating wire 4071 embedded in the inner surface 4021*a* at the joint receiving portion 4023 which is one end of the tubular portion 4021.

The heating wire 4071 is arranged so as to be wound twice along the circumferential direction along the inner surface 4021*a*. The heating wire 4071 is arranged in the vicinity of the inner surface 4021*a*. The heating wire 4071 may be partially embedded in the tubular portion 4021 so as to be partially exposed on the flow path 4001*f* side, or may be completely embedded.

As shown in FIG. 50, the heat generating portion 4008 includes a heating wire 4081 embedded in the inner surface 4021*a* at the joint receiving portion 4024 which is the other end of the tubular portion 4021. The heating wire 4081 is arranged so as to be wound twice along the circumferential direction along the inner surface 4021*a*. The heating wire 4081 is arranged in the vicinity of the inner surface 4021*a*. The heating wire 4081 may be partially embedded in the tubular portion 4021 so as to be partially exposed on the flow path 4001*f* side, or may be completely embedded.

The heating wires 4071 and 4081 may have the same configuration as the heating wire 4051.

The configuration of the heat generating sections 4007 and 4008 may not be limited to the configuration shown in FIG. 50, one heating wire may not be wound twice or may be wound three or more times, and two heating wires may be wound around. Further, although the heat generating sections 4007 and 4008 are provided symmetrically in FIG. 50, the configuration is not limited to the left-right symmetry. Although the heat generating sections 4007 and 4008 are provided next to the stopper portion 4022, they may be provided at predetermined intervals from the stopper portion 4022.

Further, in the configuration of FIG. 50, the wound parts of the heating wire 4071 and the wound parts of the heating wire 4081 are in contact with each other, but all or part of them may not be in contact with each other.

(C)

In the above embodiment, the outer diameter of the stopper portion 4022 is circular when viewed along the axial direction A, but it is not limited to a circle and may be a polygonal shape.

(D)

In the above embodiment, the flow paths of the electrofusion joints 4001 and 4001' are both formed in a straight line, but an elbow joint in which the flow path is curved may be used.

(E)

In the above embodiment and (B), since the same heating wires 4051, 4071 and 4081 are used for the heat generating sections 4005, 4007 and 4008, all the heating wires 4051, 4071 and 4081 are provided with an insulating film but the present disclosure does not have to be limited to this. However, it is preferable that at least the heating wire 4051 is provided with an insulating film. This is because the parts of the heating wire 4051 are easily in contact with each other under pressure by the resin pipe 4011 and the resin pipe 4012.

(F)

In the above embodiment, the resin pipe 4011 and the resin pipe 4012 are pressed against the electrofusion joint 4001 by the pressing portion 4240 before the heat generating section 4005 is energized, but pressurization may be performed from the middle of energization after energizing the heat generating section 4005.

Example

Hereinafter, the present embodiment will be described in detail with reference to examples.

As shown in (Table 7) below, the number of lines of the heating wire 4051 in the stopper portion 4022 of the electrofusion joint used in the examples is set to four as in FIG. 40. Further, the pressing pressure at the start of fusion in step S4004 is set to 3.2 kg, the pressing pressure at the time of fusion in step S4004 is maintained at 2.1 kg, and the pressing pressure at the end of step S4004 is set to 2.1 kg.

Specifically, a load meter is installed, and the pressure by the spring 4241 is first set to 3.2 kg. As the fusion progresses, the stopper portion 4022 melts in the middle of the fusion and the pressure drops to, for example, 2.5 kg. Then, in the latter half of the fusion, the stopper portion 22 further melts and the pressure drops to, for example, 2.1 kg. Therefore, by moving the nut 4242 to the second clamp portion 4220 side, adjustment has been made so that the pressure due to the spring 4241 does not fall below 2.1 kg.

On the other hand, in the comparative example, as shown in (Table 7), the same electrofusion joint as in the embodiment is used, but fusion is performed without pressurizing in step S4003. Therefore, in the following (Table 7), both the pressing pressure at the start of fusion and the pressing pressure at the end of fusion became zero.

TABLE 7

| | Comparative example 1 | Example 1 |
|---|---|---|
| The number of the wire lines on the side surface | 0 | 0 |
| The number of the wire lines on the stopper portion | 4 | 4 |
| The pressing pressure (kg) at the start of Fusion | 0 | 3.2 |
| The pressing pressure (kg) at the end of Fusion | 0 | 2.1 |
| Presence or absence of pressing pressure adjustment during Fusion | absence | Presence: keep 2.1 |
| Fusion strength (pass/fall of original pipe tensile test) | X | ○ |
| Judgement of the presence or absence of clevis (Apply ink to the cross-section with magic and judge whether it seeps or not) | X | ○ |

Using the piping structures of Example 1 and Comparative Example 1, the fusion strength is confirmed and whether or not clevis occurs is determined.

Figure 51:
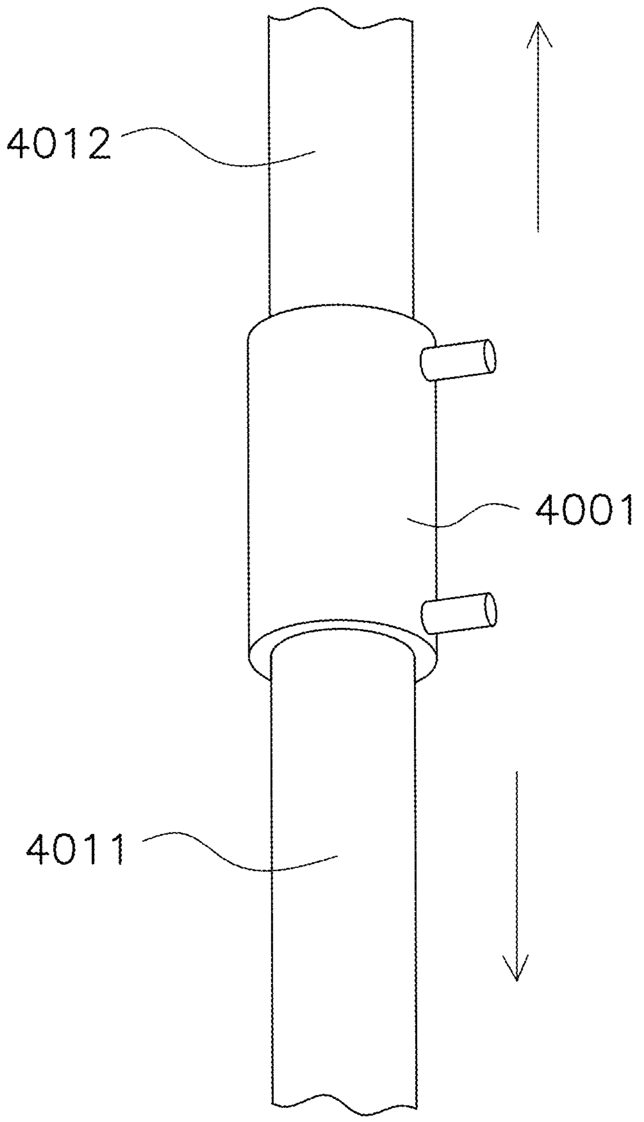
FIG. 51 is a view for explaining a tensile test of a pipe structure.

To confirm the fusion strength, the piping structure is arranged along the vertical direction as shown in FIG. 51, and the resin pipes 4011 and 4012 fused are pulled in the vertical direction (see the arrow). JIS standard is used for the tensile speed. As a result of pulling as shown in FIG. 51, the resin pipe is stretched, but the case where the electrofusion joint and the resin pipes are connected is passed. For example, when the resin pipe is 25A, it is judged as passing when 5000N or more is achieved. Further, as a result of pulling as shown in FIG. 51, when the electrofusion joint and the resin pipes are disengaged, the result is rejected. For example, when the resin pipe is 25A, it is rejected when the resin pipes come off from the electrofusion joint at less than 5000N.

Figure 52A:
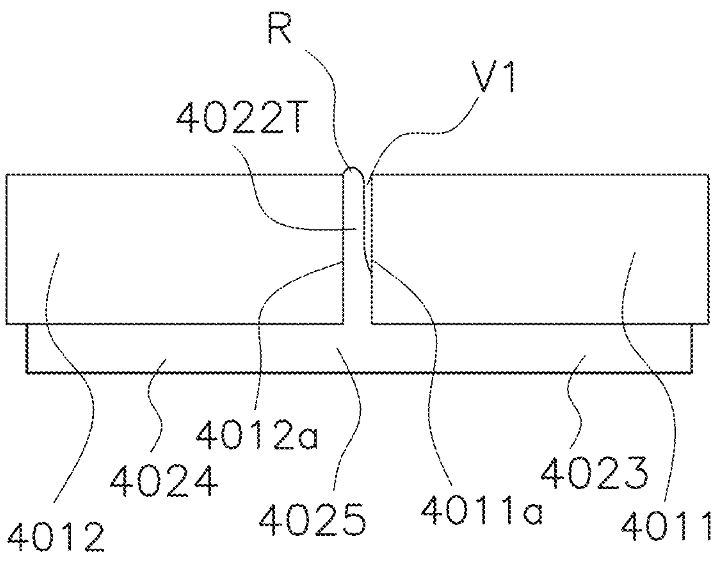
FIG. 52(*a*) is a cross-sectional view showing a piping structure in which clevis is generated, and (b) is a cross-sectional view showing a state in which ink has permeated into a portion where clevis is generated.
Figure 52B:
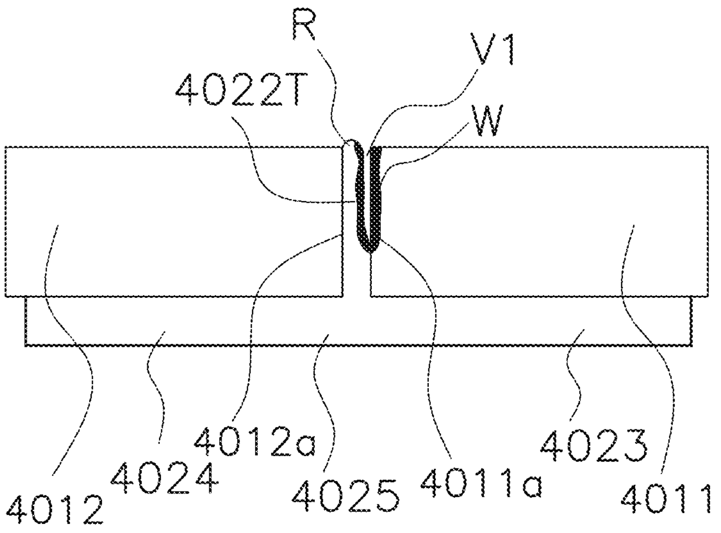

Ink is applied to the cross section with magic to determine whether or not clevis occurs, and the determination is made based on whether or not the ink seeps. For example, as shown in FIG. 52(*a*), when the clevis V1 is present between the resin portion 4022T in which the stopper portion 4022 is melted and deformed and the pipe end 4011*a* of the resin pipe 4011, by applying ink, as shown in W of FIG. 52(*b*), the ink seeps into the resin portion 4022T and the pipe end 4011*a*. When the ink seeps in, the result is rejected because of the presence of clevis. When the ink does not seep in, it is judged that no clevis occurs and the result is accepted.

In the piping structure 4100 of the example, both the confirmation of the fusion strength and the confirmation of the occurrence of clevis are passed. On the other hand, in the piping structure of the comparative example, both the confirmation of the fusion strength and the confirmation of the occurrence of clevis failed.

From the above, it can be seen that the occurrence of clevis can be suppressed and the fusion strength can be ensured by the piping structure and connection method of this embodiment.

Electrofusion joints are often used when connecting conventional resin pipes or pipes in which a resin is used, such as a metal-reinforced composite pipe having a resin layer and a metal reinforcing layer (for example, JP-A 2016-194340, JP-A H5-318596).

For example, the electrofusion joint shown in Patent Literature 1 has a joint body that is made from a thermoplastic resin and in both ends of which are formed the joint receiving portions into which the pipes to be connected are inserted, and a heating wire that is embedded on the inner peripheral surface side of the joint body. Also, a stopper portion that protrudes inward so as to restrict the position of the pipe is provided on the inner peripheral surface of the joint body.

A heating element is made to generate heat in a state in which the pipes to be connected have been inserted into the insertion openings of the electrofusion joint, the result being that the resin on the inner peripheral part of the insertion openings and the resin on the outer peripheral part of the pipe are fused around the heating element, and the pipes are connected to each other via this electrofusion joint.

JP-A H5-318596 discloses an electrofusion joint having a structure in which a heating wire is provided in the stopper portion.

However, according to the examination by the inventors, when a piping structure using an electrofusion joint having the configuration shown in Patent Documents 1 and 2 is used for the piping in the plant, it has been found that some water and chemical solution retains in the pipe due to turbulent flow generated by the flow of water or the flow of chemical solution hitting the gap (clevis) between the stopper portion of the electrofusion joint and the end surface of the resin pipe.

Microorganisms propagate in the water and the chemical solution that have retained in this way, causing deterioration of water quality, and deterioration of the chemical solution causes deterioration of purity. Therefore, in semiconductor manufacturing pipes and the like, product yield may deteriorate.

It is an object of the present disclosure to provide a connection method and a piping structure capable of suppressing the occurrence of clevis.

In order to achieve the above object, the connection method according to the first disclosure is a connection method for connecting an electrofusion joint containing a thermoplastic resin and a pipe and includes an insertion step, a heating step, and a pressurizing step. The electrofusion joint includes a main body having tubular shape and having a joint receiving portion into which a pipe containing a thermoplastic resin can be inserted inside, and a stopper portion that projects inward on the inner surface of the main body so as to regulate the position of the pipe end of the pipe when the pipe is inserted inside the joint receiving portion, and a heat generating section including a heating wire provided with an insulator arranged in the stopper portion. In the insertion process, the pipe is inserted inside the joint receiving portion of the electrofusion joint. In the heating step, the heating wire of the heat generating section is energized. In the pressurizing step, an external force is applied to the pipe toward the stopper portion for a predetermined time before the heating step or from the middle of the heating step.

In this way, by applying an external force to the pipe toward the stopper portion for a predetermined time before the heating process or from the middle of the heating process, fusion proceeds while the pipe is pressed against the stopper portion of the electrofusion joint. Therefore, the occurrence of clevis can be suppressed between the pipe and the electrofusion joint.

The connection method according to the second disclosure is the connection method according to the first disclosure, in the pressurizing step, adding an external force of 0.15 (MPa)×S ($mm^2$) or more is started when a cross-sectional area of the pipe is set as S.

As a result, the pipe can be pressed against the stopper portion with an appropriate external force.

The connection method according to the third disclosure is the connection method according to the second disclosure, and an external force of 0.15 (MPa)×S ($mm^2$) or more is continuously applied for a predetermined time.

As a result, the pipe can be continuously pushed to the stopper portion with an appropriate external force. The external force does not have to be constant.

The piping structure according to the fourth disclosure is a piping structure in which an electrofusion joint and a pipe are fused, and includes a pipe, a tubular portion, a resin portion, and a plurality of heating wires. The pipe contains a thermoplastic resin. The tubular portion has a joint receiving portion in which the pipe is inserted and contains a thermoplastic resin. The resin portion connects the pipe and the tubular portion, and protrudes inward from the inner surface of the pipe along the circumferential direction. The plurality of heating wires are arranged in the resin portion and provided with the insulator. The distance between both ends of the heating wires along the axial direction of the pipe is shorter than the product of the number of the heating wire arranged between the both ends and a diameter of the heating wire.

In this way, the resin portion forms a bead protruding inward from the inner surface of the pipe, so that the occurrence of clevis can be suppressed between the pipe and the electrofusion joint.

According to the present disclosure, it is possible to provide a connection method capable of suppressing the occurrence of clevis and a piping structure.

The connection method and the piping structure using the electrofusion joint that achieves the above object described in the embodiment can be described as the following inventions.

(1)

A connection method is a connection method for connecting an electrofusion joint containing a thermoplastic resin and a pipe, the electrofusion joint including a main body having tubular shape and having a joint receiving portion into which a pipe containing a thermoplastic resin can be inserted inside, and a stopper portion that projects inward on an inner surface of the main body so as to regulate a position of a pipe end of the pipe when the pipe is inserted, and a heating wire provided with an insulator arranged in the stopper portion, the connection method comprising:

- an insertion step of inserting the pipe inside the joint receiving portion of the electrofusion joint;
- a heating step of energizing the heating wire of the heat generating portion; and
- a pressurizing step of applying an external force to the pipe toward the stopper portion for a predetermined time before the heating step or from a middle of the heating step.

(2)

The connection method according to (1) above, wherein, in the pressurizing step, when a cross-sectional area of the pipe is set as S, adding an external force of 0.15 (MPa)×S ($mm^2$) or more is started.

(3)

The connection method according to (2) above, wherein an external force of 0.15 (MPa)×S ($mm^2$) or more is continuously applied for a predetermined time.

(4)

A piping structure in which an electrofusion joint and a pipe are fused comprising:

- a pipe containing thermoplastic resin,
- a tubular portion including a joint receiving portion into which the pipe is inserted, the tubular portion containing a thermoplastic resin;
- a resin portion connecting the pipe and the tubular portion, the resin portion protruding inward from an inner surface of the pipe along a circumferential direction; and
- a plurality of parts of a heating wire arranged in the resin portion, the heating wire being provided with an insulator, wherein a distance between both ends of the parts of the heating wires along an axial direction of the pipe is shorter than a product of a number of the parts of the heating wire arranged between the both ends and a diameter of the heating wire.

Embodiment 6

Next, a method of connecting the electrofusion joint and the resin pipe according to the sixth embodiment according to the present disclosure will be described. In the connection method of the sixth embodiment, the timing of pressurizing is different from that of the fifth embodiment. Therefore, this difference will be mainly explained. Since the configurations of the electrofusion joint, the resin pipe, and the jig are the same as those in the fifth embodiment, the description thereof will be omitted.

Figure 53:
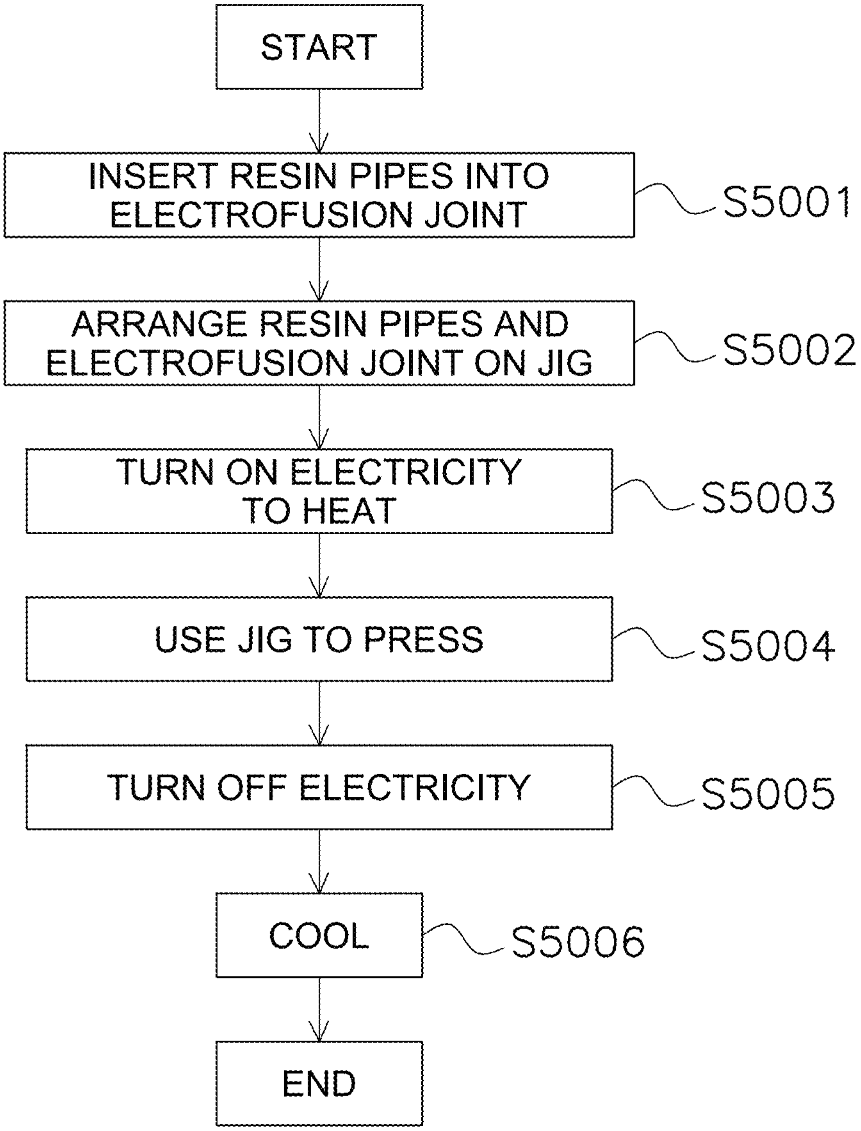
FIG. 53 is a flow chart showing a connection method of the embodiment 6 according to the present disclosure.

FIG. 53 is a flow chart showing the connection method of the sixth embodiment.

First, in step S5001 (an example of the insertion step), the resin pipe 4011 and the resin pipe 4012 are inserted into the electrofusion joint 4001.

As shown in FIG. 41, the resin pipe 4011 is inserted inside the joint receiving portion 4023 of the electrofusion joint 4001 until the stopper portion 4022 restricts the relative movement of the pipe end 4011*a* of the resin pipe 4011. Next, the resin pipe 4012 is inserted inside the joint receiving portion 4024 of the electrofusion joint 4001 until the stopper portion 4022 restricts the relative movement of the pipe end 4012*a* of the resin pipe 4012. FIG. 41 shows a state in which the resin pipe 4011 and the resin pipe 4012 are inserted into the electrofusion joint 4001. It is more preferable to scrape the edge surface (the surface facing the stopper portion 4022) of the resin pipes 4011 and 4012 before step S5001 and insert the resin pipes 4011 and 4012 into the electrofusion joint 4001 because the strength of fusion is improved.

In this state, in step S5002 (an example of the arrangement step), as shown in FIGS. 44 and 45, the resin pipe 4011 is sandwiched and fixed by the first clamp portion 4210, and the resin pipe 4012 is sandwiched and fixed by the second clamp portion 4220, and the resin pipe 4011, the electrofusion joint 4001 and the resin pipe 4012 are arranged on the jig 4200.

Next, in step S5003 (an example of the heating step), the connectors of the electrofusion device is attached to the two pins 4061 of the connector attachment portion 4006 in a pressurized state, and energization is performed for a predetermined time. When the step S5003 is started, the position of the nut 4242 is adjusted so that the pressing portion 4240 does not apply a load.

As described above, in the initial state of starting energization, the load by the pressing portion 4240 is set to 0 kg. A load meter may be provided on the pressing portion 4240 for measurement.

This energization causes the heating wire 4051 to generate heat, and the stopper portion 4022, the pipe end 4011*a* of the resin pipe 4011, and the pipe end 4012*a* of the resin pipe 4012 are melted and the resin pipe 4011 and the resin pipe 4012 come into close contact with the stopper portion 4022.

By energizing in step S5003, the stopper portion 4022 melts, and at the timing when the resin temperature exceeds 160° C., in the step S5004 (an example of the pressurizing step), the nut 4242 is moved toward the second clamp portion 4220 side so that the load is applied to the first clamp portion 4210 with the spring 4241.

In this way, by applying a load after the resin is sufficiently melted and pushing the resin pipes 4011 and 4012 into the electrofusion joint 4001, it is possible to reduce the occurrence of disturbance of the bead R.

In step S5004, it is preferable that the load applied to the first clamp portion 4210 secures a value of S×0.15 MPa or more described above. For example, when the cross-sectional area S is 140 $mm^2$, it is preferable that a load of 2.1 kg or more is maintained. It is desirable that the load does not change even when the pipe ends 4011*a* and 4012*a* melt, but it may change. It is desirable to continue applying the load while the resin is melting, but no load may be applied if it is temporary.

The heating wire temperature at the time of energization may be any temperature as long as it melts the main body 4002, and in the case of polyolefin, it is preferably 220° C. or less.

Next, in step S5005, the heat generation is stopped by stopping the energization of the heating wire 4051.

Next, in step S5006 (an example of a cooling step), the molten resin pipe 4011, the molten electrofusion joint 4001 and the molten resin pipe 4012 are cooled for a predetermined time, the resin is solidified, and these are connected and integrated. After stopping the energization of the heating wire 4051, they are naturally cooled. It is preferable that the above-mentioned load of S×0.15 MPa or more is secured by the pressing portion 4240 until the energization is stopped in step S5005. Of course, the load may be applied in the cooling step of step S5006, or the load may be stopped in the middle of step S5006. When a predetermined bead R, which will be described later, is formed, the load may be stopped.

Example

In the above-mentioned Example 1 of the fifth embodiment, pressurization is started at the same time as the heating step, and a load of 2.1 kg is maintained.

In example 2, at the start of the heating step, pressurization by the pressing portion 4240 is not performed, but after the resin temperature exceeded 160° C., a load of 2.1 kg is applied to maintain the load of 2.1 kg.

The table below shows the results of Example 2 together with Comparative Example 1 and Example 1 described above.

TABLE 8

| | Comparative example 1 | Example 1 | Example 2 |
|---|---|---|---|
| The number of the wire lines on the side surface | 0 | 0 | 0 |
| The number of the wire lines on the stopper portion | 4 | 4 | 4 |
| The pressing pressure (kg) at the start of fusion | 0 | 3.2 | 0 |
| The pressing pressure (kg) at the end of fusion | 0 | 2.1 | 2.1 |
| Presence or absence of pressing pressure adjustment during fusion | absence | Presence: keep 2.1 | Presence: keep 2.1 |
| Start timing to apply pressing force | — | Simultaneously with the start of fusion (start of heating) | After exceeding 160 degrees (50 seconds after the start) |
| Fusion strength (pass/fall of original pipe tensile test) | X | ○ | ◎ |
| Judgement of the presence or absence of clevis (Apply ink to the cross-section with magic and judge whether it seeps or not) | X | ○ | ○ |

As described above, it can be seen that it is more preferable to pressurize after the heating step is started and the temperature of the resin rises from the viewpoint of fusion strength and the presence or absence of clevis.

A connection method using an electrofusion joint that achieves the above object described in the embodiment can be described as the following invention.

(1)

A connection method is a connection method for connecting an electrofusion joint containing a thermoplastic resin and a pipe, the electrofusion joint including a main body having tubular shape and having a joint receiving portion into which the pipe containing a thermoplastic resin can be inserted inside, and a stopper portion that projects inward on an inner surface of the main body so as to regulate a position of a pipe end of the pipe when the pipe is inserted, and a heat generating section including a heating wire provided with an insulator arranged in the stopper portion, the connection method comprising:

an insertion step of inserting the pipe inside the joint receiving portion of the electrofusion joint;

a heating step of energizing the heating wire of the heat generating section; and a pressurizing step of continuing to apply an external force to the pipe toward the stopper portion for a predetermined time from the middle of the heating step.

Embodiment 7

Next, the electrofusion joint 5001 according to the seventh embodiment according to the present disclosure will be described. In the electrofusion joint 5001 of the seventh embodiment, the continuous portion 1025 on the outer side of the stopper portion 1022 is thinner than the electrofusion joint 1001'shown in FIG. 17 over the entire circumference in the circumferential direction.

Figure 54:
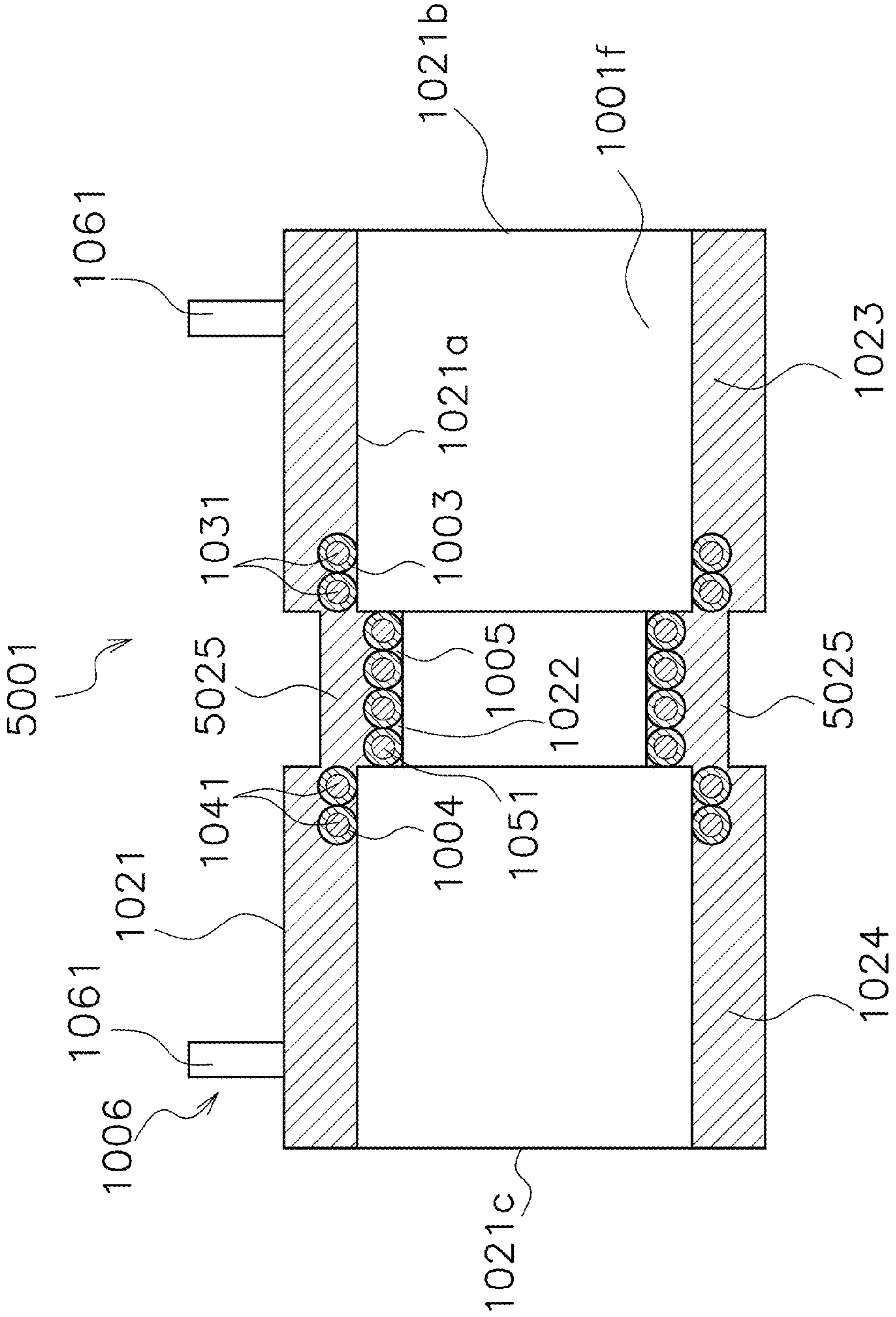
FIG. 54 is a cross-sectional view showing an electrofusion joint according to the embodiment 7 of the present disclosure.
Figure 55:
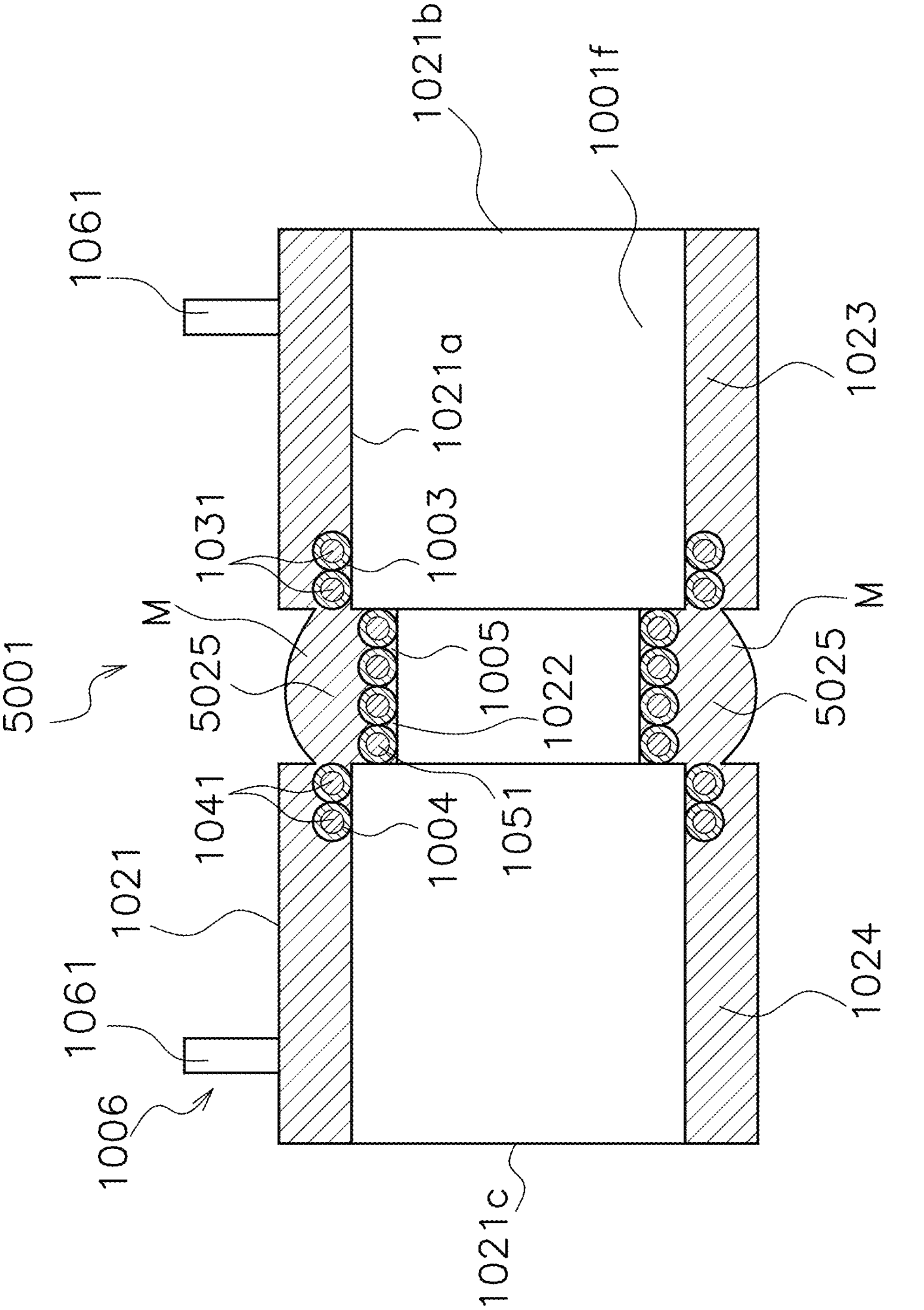
FIG. 55 is a view showing a swelling of a thin-walled portion at the time of fusion of the electrofusion joint of FIG. 54.

FIG. 54 is a cross-sectional view showing an electrofusion joint 5001 provided with a thinned continuous portion 5025. When the electrofusion joint 5001 is fused with the resin pipes 1011 and 1012, the resin expands as shown by M in FIG. 55, and the continuous portion 1025 swells. In FIG. 55, the resin pipes 1011 and 1012 are omitted, and only the state in which the outside of the continuous portion 1025 swells shown.

Figure 56A:
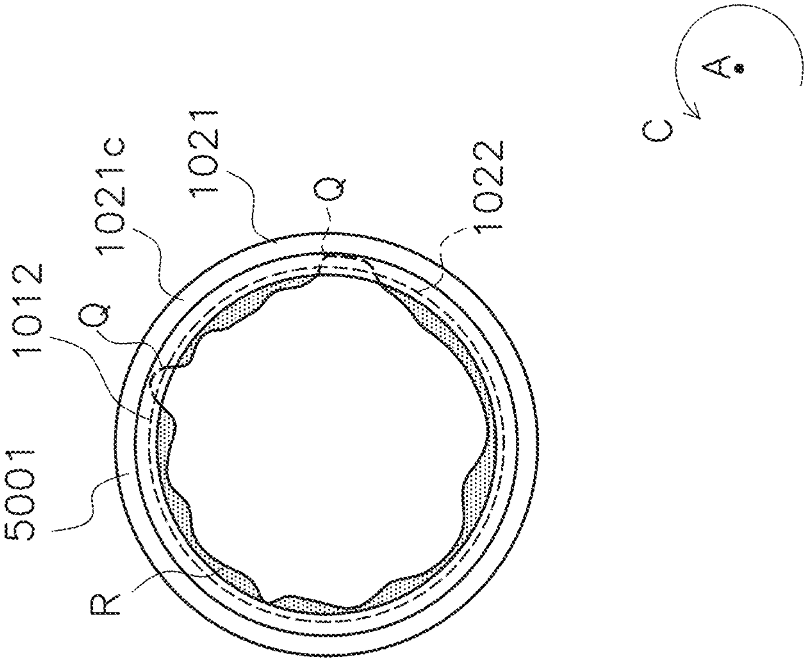
FIG. 56(*a*) is a view showing non-uniformly swelling beads, and (b) is a diagram showing uniform swelling beads.
Figure 56B:
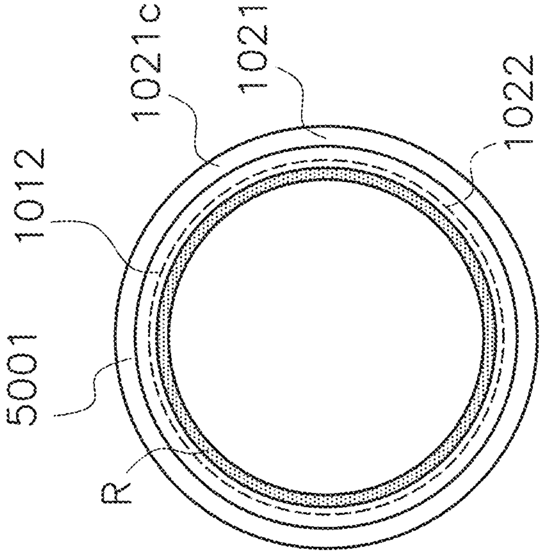

It is difficult to confirm the swelling of the inner bead R, but by visually observing the swelling of the resin, it can be confirmed that the entirety is uniformly heated and the bead R is uniformly formed. FIG. 56(*a*) shows a state in which the bead R is not formed by swelling uniformly, and FIG. 56(*b*) shows a state in which the bead R is formed by swelling uniformly. The resin raised inward from the inner peripheral surface of the stopper portion 5022 and the resin pipe 5011 is indicated by R, and the depression is indicated by Q.

Figure 57:
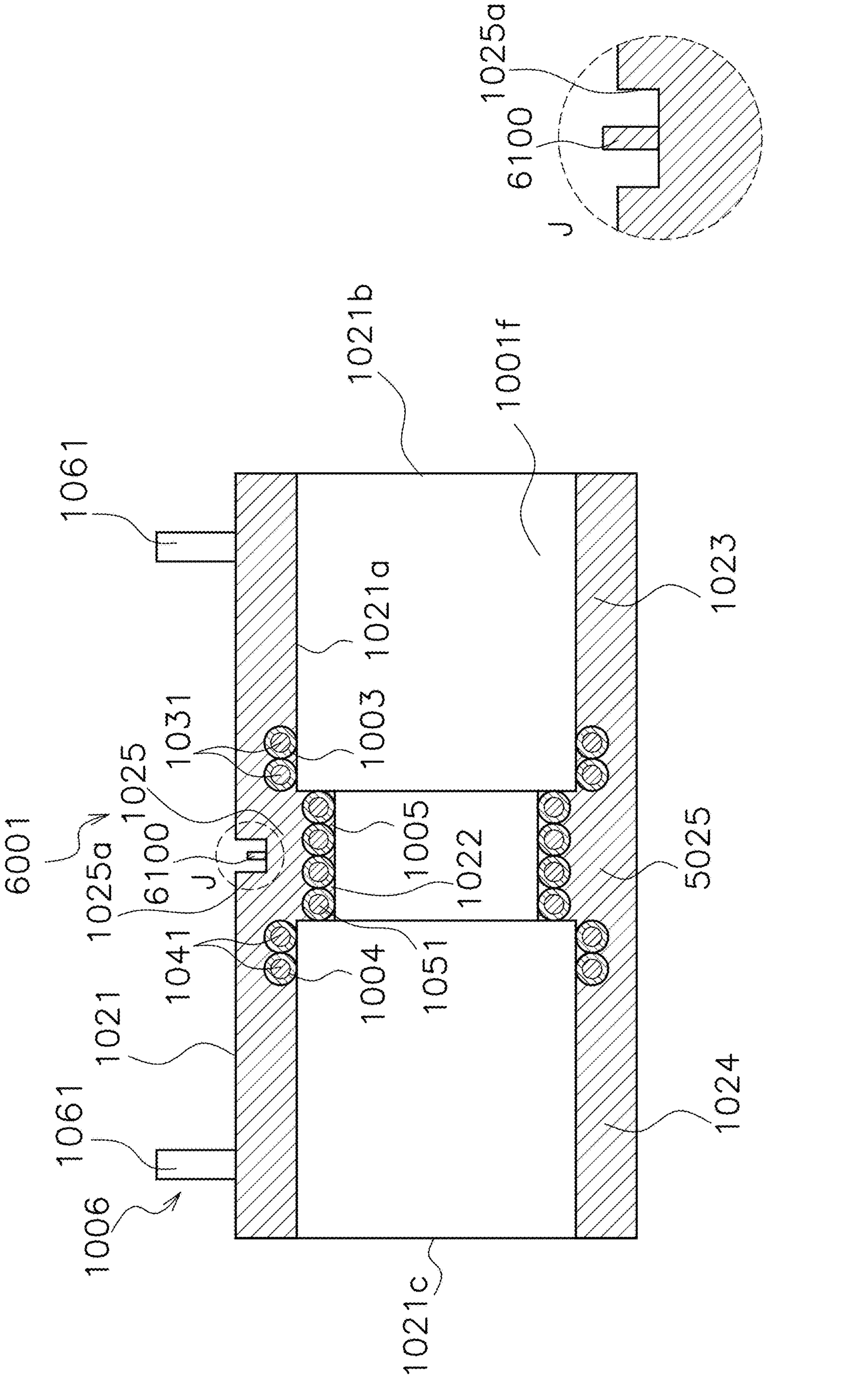
FIG. 57 is a cross-sectional view showing an electrofusion joint in a modified example of the embodiment 7 according to the present disclosure.

As a modification of the seventh embodiment, instead of providing the thinned continuous portion 5025, an indicator may be provided on the outer surface of the continuous portion 1025 as in the electrofusion joint 6001 shown in FIG. 57. The indicator 6100 is arranged in the concave portion 1025*a* formed on the outer surface of the continuous portion 1025. When the electrofusion joint 6001 is fused with the resin pipes 1011 and 1012, the indicator 6100 rises as shown in the enlarged view of the J portion. It is necessary that the stopper portion 1022 is sufficiently heated (200° C. or more) and the resin pipes 1011 and 1012 are pushed in in order for the pipe end fusion to be completed normally. When both are satisfied, the resin on the bottom surface of the pipe expands and tries to move to the outside of the joint and surface pressure is generated, so that the indicator 6100 rises. Only one indicator 6100 may be provided in the circumferential direction, but a plurality of indicators 6100 may be provided.

Conventionally, it was not possible to make a pass/fail judgment from the appearance of the product after fusion, but by installing the indicator 6100 or thinning the continuous portion 5025, it is possible to make a visual judgment on the appearance, and construction defects can be detected on the spot, and it is possible to confirm whether there is a part that has been forgotten to be fused after piping, and the same part is not accidentally fused twice because it is known that the fusion has been completed. The above effects can be demonstrated.

The thinned continuous portion 5025 or the indicator 6100 according to the seventh embodiment may be applied to any of the electrofusion joints according to the first to seventh embodiments described above.

Further, the contents described in the above-described embodiments 1 to 7 may be combined as appropriate.

INDUSTRIAL APPLICABILITY

The electrofusion joint of the present disclosure has an effect of suppressing the occurrence of clevis and convex portions on the inner surface, and is useful as, for example, a piping structure for ultrapure water.

LIST OF REFERENCE NUMERALS

1: Electrofusion joint
2: Main body
3: First heat generating section
4: First heat generating section
5: Second heat generating section
21*a*: Inner surface
22: Stopper portion
23: Joint receiving portion
24: Joint receiving portion

What is claimed is:

1. A connection method for connecting an electrofusion joint containing a thermoplastic resin and a pipe containing a thermoplastic resin, the electrofusion joint comprising a main body having a tubular shape and including a joint receiving portion into which the pipe can be inserted, a stopper portion projecting inward on an inner surface of the main body so as to regulate a position of an end of the pipe when the pipe is inserted, and a stopper heat generating section including a heating wire coated on an insulator arranged in the stopper portion, the connection method comprising:

an insertion step of inserting the pipe inside the joint receiving portion of the electrofusion joint;

a heating step of energizing the heating wire of the stopper heat generating section; and a pressurizing step of applying an external force to the pipe toward the stopper portion in the heating step, wherein, in the pressurizing step, the external force is started to be applied to the pipe after a temperature of the thermoplastic resin of the electrofusion joint or the thermoplastic resin of the pipe exceeds 160° C. in a middle of the heating step.

2. The connection method according to claim 1, wherein in the pressurizing step, the external force is continuously applied to the pipe toward the stopper portion for a predetermined time.

3. The connection method according to claim 2, wherein a cross-sectional area of the pipe is S, and the external force is 0.15 MPa×S ($mm^2$) or more.

4. The connection method according to claim 1, wherein a cross-sectional area of the pipe is S, and the external force is 0.15 MPa×S ($mm^2$) or more.

5. The connection method according to claim 1, wherein: the heating wire is a first heating wire; and the electrofusion joint further comprises a joint heat generating section including a second heating wire that is wound and arranged in the joint receiving portion.

6. The connection method according to claim 5, wherein: the joint heat generating section includes a heat generating portion in which the second heating wire is wound so that wound parts of the second heating wire are adjacent to each other along an axis of the main body; and a number of adjacent turns of the first heating wire in the stopper heat generating section is larger than a number of adjacent turns of the second heating wire in the heat generating portion which is adjacent to the stopper heat generating section.

7. The connection method according to claim 5, wherein:
the first heating wire in the stopper heat generating section and the second heating wire in the joint heat generating section are connected; and
in the pressurizing step, the second heating wire of the joint heat generating section is energized.

8. The connection method according to claim 5, further comprising
a joint heat generating section heating step of energizing the second heating wire of the joint heat generating section after stopping the pressurizing step.

9. The connection method according to claim 1, wherein
the stopper portion projects further inward than an inner circumferential surface of the pipe when the pipe is inserted.

10. The connection method according to claim 1, wherein
in the pressurizing step, the external force is started to be applied to the pipe after the temperature of the thermoplastic resin of the electrofusion joint and the thermoplastic resin of the pipe exceeds 160° C. in the middle of the heating step.

11. The connection method according to claim 1, wherein the heating wire includes an insulator.

* * * * *